United States Patent
Wilson

(10) Patent No.: US 11,657,384 B2
(45) Date of Patent: May 23, 2023

(54) APPARATUS AND METHOD FOR EMULATING TRANSACTIONAL INFRASTRUCTURE WITH A DIGITAL TRANSACTION PROCESSING UNIT (DTPU)

(71) Applicant: XARD GROUP PTY LTD, Southbank (AU)

(72) Inventor: Robert Wilson, Victoria (AU)

(73) Assignee: XARD GROUP PTY LTD, Southbank (AU)

(*) Notice: Subject to any disclaimer, the term of this patent is extended or adjusted under 35 U.S.C. 154(b) by 0 days.

(21) Appl. No.: 16/865,875

(22) Filed: May 4, 2020

(65) Prior Publication Data
US 2020/0380497 A1    Dec. 3, 2020

Related U.S. Application Data

(63) Continuation of application No. 16/073,545, filed as application No. PCT/AU2017/000026 on Jan. 28, 2017, now abandoned.

(30) Foreign Application Priority Data

Jan. 29, 2016    (AU) ................................ 2016900277

(51) Int. Cl.
*G06Q 20/34* (2012.01)
*G07F 7/08* (2006.01)
(Continued)

(52) U.S. Cl.
CPC ......... *G06Q 20/341* (2013.01); *G06Q 20/227* (2013.01); *G06Q 20/3278* (2013.01);
(Continued)

(58) Field of Classification Search
CPC ............... G06Q 20/341; G06Q 20/227; G06Q 20/3278; G06Q 20/352; G06Q 20/354;
(Continued)

(56) References Cited

U.S. PATENT DOCUMENTS 7,305,668 B2    12/2007  Kennedy et al.
9,466,060 B1    10/2016  Daniel
(Continued)

FOREIGN PATENT DOCUMENTS

WO    2009023384 A1    6/2009
WO    2010099473 A1    9/2010
(Continued)

OTHER PUBLICATIONS

International Search Report and Written Opinion from PCT/AU2017/00026 dated Apr. 5, 2017 (5 pages).
(Continued)

*Primary Examiner* — Michael G Lee
*Assistant Examiner* — David Tardif
(74) *Attorney, Agent, or Firm* — Calfee, Halter & Griswold LLP

(57) ABSTRACT

Digital transaction apparatus including a Data Assistance Device (DAD), including a user interface that is operable to at least select data, and a DAD transmitter, a Digital Transaction Card (DTC), including a Digital Transaction Processing Unit (DTPU), and a DTC receiver, wherein the DAD and DTC are operable to transfer data from the DAD to the DTC and when subsequently using the DTC to effect a digital transaction, the DTC operates in accordance with data selected and transferred from the DAD to the DTC, wherein the DTPU is configured to enable data communication with a digital transaction device during a digital transaction, the DTPU operable to receive and execute one or more commands that emulate commands received from the digital transaction device.

20 Claims, 21 Drawing Sheets

(51) Int. Cl.
  *G06Q 20/32* (2012.01)
  *G06Q 20/38* (2012.01)
  *G06Q 20/22* (2012.01)
(52) U.S. Cl.
  CPC ......... *G06Q 20/352* (2013.01); *G06Q 20/354* (2013.01); *G06Q 20/3552* (2013.01); *G06Q 20/3558* (2013.01); *G06Q 20/3574* (2013.01); *G06Q 20/385* (2013.01); *G07F 7/0853* (2013.01)
(58) Field of Classification Search
  CPC ........... G06Q 20/3552; G06Q 20/3558; G06Q 20/3574; G06Q 20/385; G07F 7/0853
  USPC ....................................................... 235/382.5
  See application file for complete search history.

(56) References Cited

U.S. PATENT DOCUMENTS

| | | | |
|---|---|---|---|
| 10,444,834 B2 | 10/2019 | Vescovi et al. | |
| 2004/0017180 A1 | 1/2004 | Cook | |
| 2004/0215964 A1 | 10/2004 | Barlow et al. | |
| 2005/0097049 A1 | 5/2005 | Writer | |
| 2005/0269402 A1 | 12/2005 | Spitzer et al. | |
| 2008/0162312 A1 | 7/2008 | Sklovsky et al. | |
| 2009/0287433 A1 | 11/2009 | Houston et al. | |
| 2011/0140841 A1 | 6/2011 | Bona et al. | |
| 2011/0244920 A1* | 10/2011 | Coppinger | G06Q 20/20 455/558 |
| 2012/0023567 A1 | 1/2012 | Hammad | |
| 2012/0028609 A1 | 2/2012 | Hruska | |
| 2012/0047071 A1 | 2/2012 | Mullen et al. | |
| 2012/0074232 A1 | 3/2012 | Spodak et al. | |
| 2012/0284194 A1 | 11/2012 | Liu et al. | |
| 2013/0140360 A1 | 6/2013 | Graylin | |
| 2013/0191279 A1 | 7/2013 | Calman et al. | |
| 2014/0002238 A1 | 1/2014 | Taveau | |
| 2014/0025322 A1 | 1/2014 | Yang | |
| 2014/0032419 A1 | 1/2014 | Anderson et al. | |
| 2014/0138435 A1 | 5/2014 | Khalid | |
| 2014/0149057 A1 | 5/2014 | Foster | |
| 2014/0172700 A1 | 6/2014 | Teuwen et al. | |
| 2014/0279509 A1* | 9/2014 | Khilnani | G06Q 20/227 705/44 |
| 2014/0350716 A1 | 11/2014 | Fly | |
| 2014/0379584 A1 | 12/2014 | Ward | |
| 2015/0073907 A1* | 3/2015 | Purves | G06Q 20/384 705/14.58 |
| 2015/0073983 A1 | 3/2015 | Bartenstein | |
| 2015/0150090 A1 | 5/2015 | Carroll | |
| 2016/0048460 A1* | 2/2016 | Kadi | H04W 4/80 713/193 |
| 2016/0210626 A1 | 7/2016 | Ortiz et al. | |
| 2016/0267486 A1 | 9/2016 | Mitra et al. | |
| 2016/0337810 A1 | 11/2016 | Nakagawa | |
| 2018/0115879 A1 | 4/2018 | Lindqvist | |

FOREIGN PATENT DOCUMENTS

| | | |
|---|---|---|
| WO | 2013112839 A1 | 8/2013 |
| WO | 2015061354 A1 | 4/2015 |

OTHER PUBLICATIONS

International Search Report and Written Opinion from PCT/AU2017/00022 dated Apr. 21, 2017 (6 pages).
EMV Card Personalization Specification v 1.1, Jul. 2007 [retrieved from Internet on Mar. 3, 2017] <URL:https://www.emvco.com/specifications. Aspx?id=20> pp. 80-82.
GlobalPlatform Card Specification v2.2, Mar. 2006 [retrieved from internet on Mar. 3, 2017] <URL: http://www.win.tue.nl/pinpasjc/docs/GPCardSpec_v2.2.pdf >.
Office Action from U.S. Appl. No. 16/073,545 dated Nov. 4, 2019.
Office Action from U.S. Appl. No. 16/073,561 dated Jun. 25, 2020.
Office Action from U.S. Appl. No. 16/073,561 dated Oct. 30, 2020.
Office Action from U.S. Appl. No. 16/073,561 dated Jun. 29, 2021.
Office Action from U.S. Appl. No. 16/073,561 dated Apr. 1, 2022.
Office Action from U.S. Appl. No. 16/874,329 dated Dec. 15, 2021.
Field, "No card, no problem: Pay with your ring, watch, bracelet" http://finance.yahoo.com/news/no-card-no-problem-pay-120000388.html?soc_src=social-sh&soc_trk=ma, Oct. 24, 2016 (4 pages).

* cited by examiner

APPARATUS AND METHOD FOR EMULATING TRANSACTIONAL INFRASTRUCTURE WITH A DIGITAL TRANSACTION PROCESSING UNIT (DTPU)

CROSS-REFERENCE TO RELATED APPLICATIONS

This application is a continuation of U.S. application Ser. No. 16/073,545, which is the U.S. national phase entry of PCT/AU2017/000026, with an international filing date of 28 Jan. 2017, which claims the benefit of Australian Application Serial No. 2016900277, with a filing date of 29 Jan. 2016, the entire disclosures of all of which are fully incorporated herein by reference.

FIELD OF THE INVENTION

The present invention relates generally to apparatus and methods for effecting digital transactions, including both financial and non-financial transactions. The apparatus and method may be particularly useful for transactions involving credit and/or debit cards.

BACKGROUND OF THE INVENTION

Credit cards, debit cards store cards and gift cards are examples of cards that are used for financial transactions throughout the world. Further, other types of cards such as passes, tags and small booklets (which may be referred to collectively as transaction documents) are used for various financial and non-financial transactions. For example, some jurisdictions require proof of age cards for transactions such as purchasing alcohol or entering into age restricted venues. Other examples of proof of age, or proof of identity, documents include driver licenses which are sometimes used for authentication in respect of transactions. In some countries, passports and/or other similar identification documents are issued in the form of a card, or a small booklet, and can be used for transactions where identification is required including, travel across borders or establishing a bank account.

Many transaction documents have a magnetic stripe, which can be encoded with information such as a unique identification number, expiry dates or other numerical or alphanumerical information. Other types of transaction documents include contactless stored value smart cards, for example, closed loop transport cards, such as Myki in Melbourne, Australia, and the Octopus Card in Hong Kong.

Transaction documents may include a chip, smart chip, or smart card chip (in this specification, such chips or devices and other similar types of microcircuit will be referred to generally as Digital Transaction Processing Units, or DTPUs). DTPUs typically include one or more of a Central Processing Unit (CPU), Read Only Memory (ROM), Random Access Memory (RAM), Electrically Erasable Programmable Read Only Memory (EEPROM), a crypto-coprocessor and an Input/Output (I/O) system. For example, credit cards often use an EMV device (where EMV is an abbreviation for Europay, MasterCard, and Visa). The EMV device (or other type of DTPU) contains encrypted data relevant to the type of transaction(s) for which the document will be used. The EMV device may be read by a scanner (for example, using contactless, close proximity communications according to ISO/IEC 14443 which is referred to as Near Field Communication (NFC throughout the specification)), by direct contact with chip connected electrodes, or by other means to obtain data from the chip. Such transaction documents enabled for use in digital transactions by means of a chip, a magnetic stripe, a chip and magnetic stripe, or Radio-Frequency IDentification (RFID) are referred to throughout this specification as digital transaction documents.

Digital transaction documents are configured to work with various components in a digital transaction system including terminals. For example, credit and debit cards work with EFTPOS (Electronic Funds Transfer at Point Of Sale) terminals for Point Of Sale (POS) transactions, and ATM (Automatic Teller Machine) terminals. Other digital transaction documents are configured to work with other types of terminals. Such terminals may be operably connected to financial institutions or other third party organizations to enable digital transactions to occur by authorizing the transaction or performing associated processing to enable the transaction.

In another example, identification cards, such as a proof of age cards, are implemented with a chip (or DTPU) containing some, or all, of the information of the card owner, along with verification information to confirm the authenticity of the card. Identification cards may be used in a digital transaction, whereby it is inserted into, swiped, or waived near, a terminal to confirm the age of the person holding the card. Other non-financial transactions can be implemented in a similar manner.

Terminals used for transactions with digital transaction documents are referred to throughout this specification as digital transaction system devices. For "Card-Present" transactions, the digital transaction system devices may include, for example, POS/EFTPOS terminals, ATMs, and network connected or stand-alone readers for reading other types of non-financial transaction documents. The digital transaction devices may also be suitable for "Card-Not-Present" transactions, for example, online transactions, Mail Order/Telephone Order (MOTO) transactions, and may include internet connected personal computers, smartphones, and tablets. Further, digital transaction system devices include telephones used to communicate with an operator who uses, for example, a network connected terminal to enter transaction document data.

Digital transaction documents have a unique IDentification (unique ID), typically having a number, an alphanumeric ID, or a unique name. The unique ID may be located on, or in, the digital transaction document, for example, printed or embossed on the document. The unique ID is also typically recorded on a database, controlled, for example, by the issuer of the digital transaction document, and accompanied by other information, such as name, address, age, and/or financial information relevant to the user/owner of the digital transaction document. Where a digital transaction document has a chip, an EMV device or other type of DTPU, the unique ID is typically stored on the chip, EMV device or DTPU, respectively.

Credit cards are typically embossed or printed with a Personal/Primary Account Number (PAN) to uniquely identify the account card holder. A standardized PAN has four fields, namely, a system number, a bank/product number, a user account number, and a check digit. This type of PAN typically has 16 digits, but may have between 13 and 19 digits (for example, an American Express PAN has 17 digits). The first digit is the card issuer type (for example, Visa, MasterCard or American Express), and the next 5 to 7 digits is generally referred to as a Bank Identification Number (BIN) and represents the card network, the bank and the product for this bank. The last digit is reserved for a checksum of the previous digits of the PAN. An expiration date is associated with the PAN and generally includes a month and year code having four digits, but with limited range. The card holder's PAN, name or business, and the card's expiry date typically appear embossed or printed on the face of a card. Previously, some types of credit card had a magnetic stripe encoding some or all of the card information.

More recently, financial transaction cards have carried a Card Verification Value (CVV) or Card Verification Code (CVC) on the magnetic stripe to make it more difficult to replicate a card for fraudulent purposes. The CVC is usually a unique cryptogram, created based on the card data, for example, including the card PAN and expiry date, and a bank's (or a personalization bureau's) master key, and printed on the card after personalization data is entered on the card. As a consequence, a person seeking to use a card for fraudulent purposes requires possession of the card for a sufficient period of time to make a copy of the magnetic stripe in order to duplicate the card, or to read the card and manually record the card number, expiry date, and other details printed on the card.

The same principle was subsequently adopted for a second CVC, sometimes called Card Verification Value 2 (CVV2), which is commonly printed in the signature panel on the back of the card. The CVV2 is used primarily to help secure e-Commerce and MOTO transactions. This is a second unique cryptogram created from card data and the bank's master key (although this is a different cryptogram as compared with the magnetic stripe CVC). The CVV2 is not present on the magnetic stripe.

Some credit cards also have an associated Personal Identification Number (PIN) code, which is primarily used for "Card-Present" transactions. The PIN must generally be kept confidential, and must be entered on secure and certified terminals to make sure that no-one can gain access to the PIN. Further, in modern credit cards, the PIN can be stored on the chip (for example, an EMV device) in an encrypted form within a cryptogram block.

There are two main classifications of transactions for which credit cards are used including: "Card-Not-Present" transactions, when using the Internet or MOTO; and "Card-Present" transactions, such as used with POS/EFTPOS and ATM terminals. Card-Present transactions involve EMV device readers (including physical contact readers using electrode pins on a card and contactless reading using, for example, Near Field Communications (NFC)) and/or magnetic stripe readers. These transactions generally use the full 13 to 19 digit PAN and the 4-digit expiration date. Card-Not-Present transactions generally require the user to read out to an operator, or enter into a computer, the PAN and expiration date digits. In some instances, the CVC/CVV2 number is also required.

Other types of digital transaction documents may use various forms of security, such as PINs, passwords, and the like. However, some other types of digital transaction documents do not use such external security, and rely only upon the authenticity of the document itself, for example, using holograms and other security devices that are difficult to copy. Further, some types of non-credit card digital transaction documents may use chips for security, including chips similar to EMV devices.

Cards (or other digital transaction documents) may have data stolen, for example, using a Radio Frequency (RF) signal to power the card's EMV internal microprocessor and related transmitter. Generally, the card data, such as the PAN, expiration date and cardholder's name are transferred to a wireless terminal. The terminal can be a portable or stationary wireless terminal, and once near a card, uses the RF signal to energize the card to firstly, extract the card data and copy some to a memory storage device, or to online storage, such as, the cloud, and secondly, use a portable terminal in close proximity to the card to extract monies as a contactless payment (for example, a PayWave and/or tap payment, such transactions being referred to by traders as tap-and-pay or tap-and-go), in accordance with a level of transaction that does not require any authorization. Subsequently, stolen card data can be uploaded to a duplicate "fake card" or used in online transactions to make fraudulent purchases. Yet another method used to steal card data for fraudulent use involves hacking into computer databases that store card data. This data is then used for transactions, and a card owner may only become aware of this when they see a statement detailing the transactions made with their card, or card data.

Other ways card data is stolen include phishing scams where the card holder is tricked into entering a security code along with other card details via a fraudulent website. Phishing therefore reduces the effectiveness of security codes as an anti-fraud means. However, merchants who do not use security codes are typically subjected to higher card processing costs for transactions, and fraudulent transactions without security codes are more likely to be resolved in favour of the cardholder, which increases costs for merchants. Yet other ways that security of transactions may be compromised is by skimming and man-in-the-middle attacks.

With the emergence of e-Commerce, an increasing number of transactions are Card-Not-Present type transactions. However, this type of transaction is subject to an increasing number of attacks from fraudsters including attacks that have resulted in increased verification that has caused a "failure positive" result where the card holder is legitimate but the transaction is rejected.

Several solutions have been developed to address this growing fraud, including use of virtual account numbers, authentication of cardholders separately from the transaction, and use of a hardware token to authenticate the user. Another proposed solution comprises an institution, such as a bank sending a code to the user, typically by SMS to the user's smartphone, which can then be used to authenticate a Card-Not-Present transaction. This arrangement is generally referred to as an Out-Of-Band (OOB) message which unfortunately has been recently hacked. In any event, many of these solutions require expensive infrastructure changes, which merchants prefer to avoid and may only provide protection for a limited time until the arrangement is hacked.

With the increasing number of Card-Not-Present transactions, a suggested means of conducting such transactions is the electronic wallet (e-wallet), also known as a digital wallet. An e-wallet provides users with a means to pay for purchases from enabled on-line merchants. Upon registration, a user can store their card, billing and shipping information on a site hosted by a suitable document, such as a bank, and can access that information to pay for goods or services. However, e-wallets on an NFC enabled device, such as a smartphone, do not operate in a large percentage of Card-Present transactions, for example, POS/EFTPOS or ATM transactions since these network transaction devices generally do not support contactless payments and amongst the presently available contactless payment arrangements, different back end processes and merchant agreements are involved. As a result, the establishment and use of e-wallets has experienced limited commercial success and whilst they remain available to consumers, only approximately 10% of consumers have elected to install an e-wallet although the take-up rate by consumers is now starting to drop.

A user may prefer to have, and to carry around with them, many of their available credit cards, debit cards, store cards, government agency cards and loyalty cards since they prefer to physically hold and control the possession of those cards. Further, a user may require an identity card, driver's license, age verification card or passport. Carrying around a large number of individual digital transaction documents can be very inconvenient. Moreover, the person, having so many physical transaction documents, may become confused regarding the location of a particular digital transaction document, for example, a particular credit card, among all the other digital transaction documents.

An alternative solution to e-wallets that addresses the problem of users carrying a large number of credit or debit cards has been developed, wherein a credit card sized device has a keyboard (or touch pad arranged as a simplified keyboard) and a small limited function Graphical User Interface (GUI), which are used to select one card amongst a number of cards stored on the device, and to enter data for various transactions. However, the keyboards are of limited functionality due to their limited number of keys in the relatively small space available on the card (being the area of an average credit card). The keyboards are also considered difficult to use because of their small size, and as a result a large number of keystrokes may be required to effect any particular function. Further, the keyboard on a credit card is not a solution for other types of digital transaction document such as those documents used for proof of identity or proof of age. Other attempted solutions include products, such as Plastc, Coin, Final, and Wocket. However, the Plastc solution has some operational limitations, and the Wocket solution requires a specific Wocket device. None of these solutions has gained wide commercial acceptance. Moreover, it has been found that cards including a keyboard have an unacceptably high failure rate when given to customers in view of the repeated, perhaps daily, usage. It is suggested that the high failure rate may be, at least in part, due to the complications of having the keyboard on a card, which has limited space for such a complex electronic device.

Another problem with attempting to accommodate multiple credit cards, debit cards or other digital transaction documents on a single card are the limitations caused by the use of proprietary or standardized chips. Such chips or DTPUs are configured to securely store information for one digital transaction document only. For example, a credit card chip, such as an EMVCo standard chip, securely holds information typically including the credit card PAN, the expiry date, a security code (such as the CCV2 number), and a PIN. Transaction devices, such as POS/EFTPOS terminals, securely communicate with the DTPU to obtain some, or all, of the information from the DTPU for a transaction to be authorized and verified. Many DTPUs are also configured to resist attempts to write to the DTPUs secure record memory (which may also be referred to as a secure element, or part of a secure element), as many such attempts are made by those seeking to use the card fraudulently. It will be understood that a secure element may comprise secure memory and an execution environment, and is a dynamic environment in which application code and application data can be securely stored and administered. Further, it will be understood that, in a secure element, secure execution of the application can occur. A secure element may be located in a highly secure crypto chip (otherwise known as a smart card chip). The security of the DTPU may also prevent legitimately introducing one or more new digital transaction documents (including PANs, tokens expiry dates, PINs and other data attributes of those documents) into the secure record memory (secure element) of the DTPU so that the DTPU cannot take on another document's personality (a term which is used herein to describe a digital transaction document (or logical digital transaction document) and its attributes).

Accordingly, it has been difficult to instigate use of single physical cards having multiple personalities (multiple credit and/or debit cards expressed or expressible on a single physical card), given the change in infrastructure required, including modified DTPUs (such as the EMVCo device), modified digital transaction devices (for example, modified POS/EFTPOS terminals), along with any other modification required in other parts of the credit/debit card payment infrastructure. Apart from the technical problems, Card Association Scheme providers such as Visa and MasterCard have various additional requirements including the presence of a hologram and logo of the Card Association Scheme on the physical card.

In this regard, it is desirable to provide a single EMV (or EMV type device), or other type of DTPU, on a Digital Transaction Card (DTC), for example, a credit card sized card, which is able to selectively assume the personality of a number of different digital transaction documents (or logical digital transaction documents). For example, a user may seek to use MasterCard account for one transaction, but to a use Visa account for a different transaction. Alternatively, a user may seek to use the DTC as a credit card, but to subsequently use it as an age identity card.

However, to-date, there has not been a sufficiently effective, efficient, and/or secure means and/or method for adapting a DTPU (such as an EMVCo specified device) to embody different personalities as compared with the personality of the DTPU that was initially installed.

Another problem with present digital transaction documents is the ability to obtain data from a credit card or other transaction document. Although devices such as EMV devices have been introduced in an attempt to limit data theft, such arrangements have not proved to be entirely successful in preventing this type of crime. Increasing credit card fraud may incur cost for a bank, a merchant, a user, or all three parties. Further, identity theft is an increasing concern for users since a stolen identity can be used to commit fraudulent financial transactions, and other types of crime.

For some digital transaction documents, such as credit cards, tokens are sometimes used to enhance security for transactions. For credit cards, tokens are typically numbers that are the same length as the credit card's PAN, and are substituted for the PAN in a transaction. The token should not be feasibly decryptable to obtain the original PAN by a person seeking to use the credit card fraudulently, and so that person is unable to mimic the credit card, and unable to use the credit cards PAN and a card holder's other personal details for on-line transactions. Accordingly, if using a credit card in a high risk, low security environment, tokens are a means of protecting sensitive data. The security of the token is based primarily on the infeasibility of determining the original PAN (or other data) whilst knowing only the surrogate token value. Tokenization may be used instead of, or in conjunction with, other encryption techniques in transactions with digital transaction documents.

A token (or digital token) may be generated by a third party, such as a credit card issuer, a financial institution, or a security provider for the credit card. Tokens are also used for securing other non-financial transactions, such as those involving drivers' licenses. The token may be generated as a cryptogram using inputs from a selection of, for example, the credit card's PAN (or some other unique ID of a digital transaction document), and/or the card's expiry date. The token for a transaction may be selected from a number of tokens in a pool based on the ID of the merchant or the terminal where the transaction is occurring, the date of the transaction, the time of the transaction, or various other criteria. De-tokenization to retrieve the original PAN typically occurs during the processing of a transaction, and is usually performed by the credit card issuer, financial institution, or security provider who issued the token.

Usually, tokens are generated during the process of creating and issuing a credit card to its owner/user. Each card may have one or more associated tokens. Where a card has multiple tokens, each token can be selectively used for different transactions or different transaction types.

Tokens have a number of problems, including not being selectable by the user to allow the user control over security and how tokens are used. For example, a user may seek to be able to select tokens for certain transactions or transaction types. Another problem is that the same token may need to be used for a number of different transactions, thus limiting the security afforded by the token. This is especially the case for a digital transaction document such as a credit card. Even if a digital transaction document has a number of associated tokens, those tokens will need to be reused or reissued after a number of transactions. It is difficult to issue new tokens, for example, to a credit card, since the infrastructure for issuing new tokens has been developed to issue those new tokens at a time of creation and issuance of a new credit card.

One way to prevent fraudulent use of a stolen or compromised credit card or other types of transaction document is to simply cancel the document, including cancellation of that document's unique identifier (for example, cancelling the account number of a credit card), and issue a new document with a new expiration date. Providers of the document may have a mechanism to invalidate old documents (for example, invalidating old account numbers), and to issue new numbers to existing users. However, it can sometimes take a substantial amount of time to deliver a new document (for example, delivering a credit card through the mail), and the delay greatly inconveniences the user. In the instance of a credit card, the issuance of a new card causes a temporary cessation of the user's ability to maintain payments by auto debit from credit accounts.

Further, document owners generally prefer instant or near instant ("real time") feedback of information regarding use of their card for financial transactions or other types of transaction, such as use of a card or other such documents for identification, traveling and other purposes. Card owners may also prefer real time feedback regarding account balances and other information related to their card, or other digital transaction documents. Further, owners of cards and other digital transaction documents may prefer the ability to block usage of a document in real time, or with minimal delay. This may be useful if the owner becomes aware of, or suspects, fraudulent transaction(s) with the use of one or more of their digital transaction document(s).

It is an object of the present invention to overcome, or at least ameliorate, at least one of the above-mentioned problems in the prior art, and/or provide at least a useful alternative to prior art devices, systems and/or methods.

Presently, Digital Transaction Cards (DTCs) such as credit/debit cards have been capable of communications with financial institutions (e.g. banks) via a predefined keypad typically located at a financial institution-approved ATM or card reader or reader/writer. The infrastructure currently in operation restricts any interaction between a financial institution-approved reader-writer and an EMV device outside of the approved external keypad.

Existing digital transaction terminals are not able to be operated using a device such as a smartphone. For example, Electronic Funds Transfer at Point Of Sale (EFTPOS) or Point of Sale (POS) terminals are only able to operate with suitably configured Digital Transaction Cards (DTCs) such as credit or debit cards. Such credit or debit cards will each have a single "personality", or express only a single document. For example, a given DTC can only have the personality of a MasterCard or a Visa card, but cannot selectively and serially take on the personality of both a MasterCard and a Visa card, at different times.

In addition, devices such as smartphones cannot communicate with known DTCs. For example, a smartphone cannot use existing communication protocols to communicate with a credit or debit card. Accordingly, it has not been possible to reprogram, rewrite or reconfigure a DTC to provide it with a different personality.

Furthermore, known DTCs such as credit or debit cards cannot be updated to express a desired personality (for example, changing a physical card from expressing a MasterCard to expressing a Visa card). Consequently, the DTC cannot be used with a POS/EFTPOS terminal using the desired personality for the transaction.

Digital Transaction Processing Units (DTPUs) embedded into a standard credit or debit card typically include contact electrodes presented on the surface of the card configured to make contact with corresponding contact electrodes in, for example, a POS/EFTPOS terminal. This physical contact allows the DTPU to communicate with the POS/EFTPOS terminal, and to connect with a payment infrastructure to complete a digital transaction. The DTPU is typically an EMV chip or a chip complying with one or more of EMV Co specifications.

Such current DTPUs or EMV chips may include an Integrated Circuit (IC), being part of the EMV chip typically formed from substances such as silicon. The EMV chip may further include Read Only Memory (ROM), Random Access Memory (RAM), and/or Electrically Erasable Programmable Read Only Memory (EEPROM). The DTPU may contain other kinds of memory. Further, the DTPU may include a Central Processing Unit (CPU) for controlling operations of the DTPU. The CPU may work in cooperation with a crypto-coprocessor, which handles the tasks of encrypting and decrypting data, thus freeing the CPU to perform other processing tasks. Communications between the DTPU and the electrodes are made via a system Input/Output (system I/O).

The IC of the EMV chip has an active side usually in some form of encapsulation, and is adhered to a substrate using adhesive. The contact electrodes, typically made of metal, are exposed for contact with external terminal devices and are connected to the IC with bond wires. The substrate is placed in a pit, which is made in the card body. The substrate, carrying the IC, the metal contact electrodes, the encapsulation, and the bond wires is fixed into the pit of the card body using hot melt, applied at the edges of the substrate.

Some known DTCs include a numeric keypad which is used for controlling operations of the EMV chip embedded in the card. Such cards may also include a numeric display and one or more buttons or keys to switch the card on and off. The card may use a specially built EMV chip which allows the keypad and any other elements of the card to operate the EMV chip for limited control of the chip and for operating the display. However, this type of card is difficult to operate, as the functionality afforded by the keypad is very limited. Additionally, the display can only show a very limited amount of data. Such cards have proved to be cumbersome and difficult to operate, resulting in a very low acceptance with customers.

Accordingly, devices such as smartphones and credit and debit cards have not been able to interoperate. Such cards may be designed to interact physically with an EMV access terminal in a POS/EFTPOS terminal, and such POS/EFTPOS terminals may include a terminal module for processing transactions and communicating via an EMV interface with a payment processing infrastructure including with institutions such as an EMV issuer back office.

Devices such as smartphones may also communicate wirelessly with a wireless access node in the POS/EFTPOS terminal. However, wireless communication between smartphones and the POS/EFTPOS terminals has had very low penetration into merchants, as replacing existing infrastructure to allow for this type of operation is expensive. Furthermore, direct communication between a smartphone and a POS/EFTPOS terminal may introduce a number of security issues for such transactions.

SUMMARY OF THE INVENTION

In one aspect, the present invention provides digital transaction apparatus including a Data Assistance Device (DAD) including a user interface that is operable to at least select data and a DAD transmitter, and a Digital Transaction Card (DTC), including a Digital Transaction Processing Unit (DTPU) and a DTC receiver, wherein the DAD and DTC are operable to transfer data from the DAD to the DTC and when subsequently using the DTC to effect a digital transaction, the DTC operates in accordance with data selected and transferred from the DAD to the DTC, wherein the DTPU is configured to enable data communication with a digital transaction device during a digital transaction, the DTPU operable to receive and execute commands that emulate commands received from the digital transaction device.

In another aspect, the present invention provides a Data Assistance Device (DAD) including a user interface that is operable to at least select data and a DAD transmitter that is operable to transfer data from the DAD to a receiver associated with a Digital Transaction Card (DTC) having a Digital Transaction Processing Unit (DTPU), wherein the data that is selected and transferred to the DTC causes the DTC to operate in accordance with the selected data when the DTC is subsequently used to effect a digital transaction, and wherein the DTPU is configured to enable data communication with a digital transaction device during a digital transaction, the DTPU operable to receive and execute commands that emulate commands received from the digital transaction device.

In another aspect, the present invention provides a Digital Transaction Card (DTC) including a Digital Transaction Processing Unit (DTPU) and a DTC receiver that is operable to receive user-selected data from a transmitter associated with a Data Assistance Device (DAD), wherein the user-selected data that is received causes the DTC to operate in accordance with the user-selected data when the DTC is subsequently used to effect a digital transaction, and wherein the DTPU is configured to enable data communication with a digital transaction device during a digital transaction, the DTPU operable to receive and execute commands that emulate commands received from the digital transaction device.

In another aspect, the present invention provides a digital transaction method including selecting data, by a user interface of a Data Assistance Device (DAD), transferring the selected data by a DAD transmitter associated with the DAD to a receiver associated with a Digital Transaction Card (DTC) having a Digital Transaction Processing Unit (DTPU), and effecting, by the DTC, a digital transaction wherein the DTC operates in accordance with the data selected and transferred from the DAD to the DTC, wherein the DTPU is configured to enable data communication with a digital transaction device during a digital transaction, the DTPU operable to receive and execute commands that emulate commands received from the digital transaction device.

In yet another aspect, the present invention provides a method of operating a Data Assistance Device (DAD), including selecting data, by a user interface of the DAD, and transferring the selected data, by a DAD transmitter associated with the DAD to a receiver associated with a Digital Transaction Card (DTC) having a Digital Processing Unit (DTPU), wherein the DTPU is configured to enable data communication with a digital transaction device during a digital transaction, the DTPU operable to receive and execute commands that emulate commands received from the digital transaction device, and wherein the DTC operates in accordance with the selected and transferred data when the DTC is subsequently used to effect a digital transaction.

In a further aspect, the present invention provides a method of operating a Digital Transaction Card (DTC) having a Digital Transaction Processing Unit (DTPU), including receiving, from a Data Assistance Device (DAD), data including user-selected data, effecting, by the DTC, a digital transaction, wherein the DTC operates in accordance with the user-selected data, wherein the DTPU is configured to enable data communication with a digital transaction device during a digital transaction, the DTPU operable to receive and execute commands that emulate commands received from the digital transaction device.

In a further aspect, the present invention provides a computer-readable medium storing one or more instructions that, when executed by one or more processors associated with a Data Assistance Device (DAD), cause the one or more processors to select data, by a user interface of the DAD, and transfer the selected data, by a DAD transmitter to a receiver associated with a Digital Transaction Card (DTC) having a Digital Transaction Processing Unit (DTPU), wherein the DTPU is configured to enable data communication with a digital transaction device during a digital transaction, and the DTPU is operable to receive and execute commands that emulate commands received from the digital transaction device, the DTC operating in accordance with the selected and transferred data when the DTC is subsequently used to effect a digital transaction.

In a further aspect, the present invention provides a computer-readable medium storing one or more instructions that, when executed by one or more processors associated with a Digital Transaction Card (DTC), cause the one or more processors to receive user selected data, from a Data Assistance Device (DAD), and subsequently effect a digital transaction wherein the DTC operates in accordance with the user-selected data, wherein the DTC includes a Digital Transaction Processing Unit (DTPU) configured to enable data communication with a digital transaction device during a digital transaction, the DTPU operable to receive and execute commands that emulate commands received from the digital transaction device.

In a further aspect, the present invention provides a method including receiving, from an issuing authority, a DTC configured to operate in accordance with any one or more of the statements above.

In a further aspect, the present invention provides a method including issuing, by an issuing authority, a DTC configured to operate in accordance with any one or more of the statements above.

In a further aspect, the present invention provides a method including receiving, from an issuing authority, a DTC configured to operate in accordance with the method of any one or more of the statements above.

In a further aspect, the present invention provides a method including issuing, by an issuing authority, a DTC configured to operate in accordance with the method of any one or more of the statements above.

In a further aspect, the present invention provides a method including issuing, by an issuing authority, operating code, including software and/or firmware, to a Data Assistance Device (DAD) and/or a Digital Transaction Card (DTC) to enable the DAD and/or DTC to operate in accordance with any one or more of the statements above.

In a further aspect, the present invention provides a method including issuing, by an issuing authority, operating code, including software and/or firmware, to a Data Assistance Device (DAD) and/or a Digital Transaction Card (DTC) to enable the DAD and/or DTC to operate in accordance with the method of any one or more of the statements above.

SUMMARY OF EMBODIMENT(S) OF THE INVENTION

In embodiments, the emulation may be of one or more functions that would otherwise be enacted with the DTC, or other types of transaction cards such as credit and/or debit cards, in operation with a digital transaction device such as an Point Of Sale/Electronic Funds Transfer at Point Of Sale (POS/EFTPOS) terminal when the digital transaction device is connected to a third party entity or organization, such as a financial institution or credit card provider. In this regard, it may be expressed that, in some embodiments, the apparatus and method emulate the actions of a financial institution with the DTC, or emulate actions of a digital transaction device during a digital transaction with such a device. In other embodiments, the emulation may occur outside of a digital transaction with a digital transaction device, so that the DAD and the DTC are operable for emulation.

It will be appreciated that the DTPU in many credit and debit cards (for example, an EMV chip, or a chip complying with one or more of the EMVCo specifications), is connected to electrodes which present on the surface of the credit or debit cards. These electrodes contact corresponding electrodes in a digital transaction device, such as an POS/EFTPOS terminal, or an Automatic Teller Machine (ATM). When respective electrodes are in contact, data communication is enabled between the card and the third party entity or organization controlling the digital transaction device. The third party entity or organization may perform or control one or more functions during a transaction, such as reading a credit card number (Personal/Primary Account Number (PAN)), expiry date and other information, which is located in the DTPU of the card, or sending the read data from the transaction device back to the third party (and/or some other third party) for processing. The processing may lead to an authorization being given for the transaction, and this is communicated back to the transaction device, so that the transaction can proceed. In the present invention, emulation is for mimicking one or more of the functions that are typically performed with, for example, a credit card or debit card. However, the functions provided by the emulation may extend beyond those provided on many digital transaction devices.

In some embodiments, the emulation includes functions that are not normally provided by many or any digital transaction devices. These functions may include providing a DTC with a new personality, such that the DTC can be used as, for example, a credit card, then, after change in personality, can be used as an identification card. Other possible emulation functions include, for example, setting spend limits on a DTC, enacting authorization requirements for a DTC, changing a Personal Identification Number (PIN) (for example changing digits 0000 to 1111, or changing the number of digits 0000 to 101010), changing a public key (which is used to create a cryptogram (transaction wrapper) when used in, for example, a POS/EFTPOS terminal), and assigning different personalities for different locations or times. The types of functions that can be used during an emulation process are not limited to those mentioned in the present specification, and the present invention is intended to include within its scope all such functions.

In some embodiments, the DTC processor (which may itself be a Central Processing Unit (CPU)), is connected to the DTPU or may be directly connected with the CPU of the DTPU via electrodes. The DTPU may be an EMV chip or a chip complying with one or more EMVCo specifications. Such EMV/EMVCo chips may be connected to the external (surface) electrodes of the DTC via wires which connect into a bottom part of the chip, the wires extending to the surface electrodes on a top surface of the DTC. Similarly, the DTC CPU may be connected via wires to a bottom part of the chip. It will be understood that chips have a number of input/output channels, and that the DTC CPU and the DTPU CPU may have corresponding input/output channels. In some embodiments, the surface electrodes of the DTC are connected to a selection of input/output channels of the DTPU CPU, and the corresponding input/output channels of the DTC CPU are also connected to the same selection of input/output channels of the DTPU CPU, thus allowing the emulation to be operated from the DAD via the DTC CPU. In other embodiments, a different selection of input/output channels may be used for connection between the DTC CPU and the DTPU CPU from the channels that are connected between the DTPU CPU and the surface electrodes of the DTC.

In some embodiments, the apparatus is operable to copy a selected one LDTDP from LDTDP storage memory to the DTPU thereby enabling the DTC to be operable as the digital transaction document associated with the selected one LDTDP. The selection may be performed using the interface of the DAD during an emulation, and in cooperation with the at least one program operating on the DTC and operated from the interface of the DAD.

It will be understood by skilled readers that in embodiments of the invention, a digital transaction apparatus including, and requiring both, a Data Assistance Device (DAD) and a Digital Transaction Card (DTC) for a digital transaction provides a multi-factor factor verification (including authorization, authentication, and both authorization and authentication) for the digital transaction, the factors being that the user (for example, someone seeking to pay for goods and/or services using a financial digital transaction)

requires two items, namely, the DAD and the DTC and also knowledge regarding how to effect a transaction with the two items. Accordingly, if a person has both a DAD and a DTC when seeking to conduct a digital transaction, the likelihood that the person has obtained both items by fraud, theft, or deception is significantly reduced. For example, if the DAD is a smartphone, then it is unlikely that a person seeking to conduct a fraudulent transaction would be able to steal a legitimate DTC and the owner's smartphone when compared with solely the theft of a legitimate credit card as presently used to conduct digital transactions. Further, if a person seeking to conduct a fraudulent transaction managed to steal a legitimate DTC, it would be very difficult for that person to emulate, or spoof, the DTC owner's smartphone, including any necessary additional hardware and software to operate with the DTC to conduct a digital transaction.

In embodiments, the DAD and DTC are operable to transfer data therebetween which may further assist to reduce the incidence of fraudulent digital transactions. For example, the DAD could be used to transmit a One Time PIN (OTP) to the DTC prior to each and every transaction, the OTP being requested by a digital transaction system device during a digital transaction and requiring entry of the PIN by the user to complete the transaction. In any event, it is expected that transferring data between the DAD and DTC will assist users to manage and monitor their digital transactions.

In embodiments, the present invention provides a method of conducting digital transactions using a digital transaction apparatus including a plurality of Logical Digital Transaction Document Packets (LDTDPs), each LDTDP representing a digital transaction document and including one or more of a unique Identification (unique ID) or a token associated with the unique ID for performing a digital transaction with at least one digital transaction device, the digital transaction apparatus further including, an LDTDP storage memory, a staging memory, a DAD, and a DTC, including a Digital Transaction Processing Unit (DTPU) and a secure record memory, the method including, operating the DAD to select one of the at least one LDTDPs stored in the LDTDP storage memory, copying the selected one LDTDP from LDTDP storage memory to staging memory, and copying the selected one LDTDP from staging memory to the secure record memory thus enabling the DTC to be operable as the digital transaction document associated with the selected one LDTDP. In other embodiments, a method of conducting digital transactions using a digital transaction apparatus that recognises a plurality of LDTDPs is provided, each LDTDP representing a digital transaction document and including one or more of a unique ID or a token associated with the unique ID for performing a digital transaction with at least one digital transaction device, the digital transaction apparatus further including, an LDTDP storage memory, a staging memory, a DAD, and a DTC, the DTC including a DTPU having a secure record memory, the method including, operating the DAD to select one of the at least one LDTDPs stored in the LDTDP storage memory, copying a selected one LDTDP from LDTDP storage memory to staging memory, copying the selected one LDTDP from staging memory to the secure record memory thus enabling the DTC to be operable as the digital transaction document associated with the selected one LDTDP. In these embodiments, the known operation of the existing DTPU, such as an EMV device, is exploited to place data pertaining to a particular personality in the memory location that will be accessed by the EMV device to establish the personality of the DTC.

In various embodiments, the digital transaction document may be a credit card, debit card, bank account, store card, passport, identity card, age verification card, loyalty card, government agency card, driver's license, and/or various other kinds and types of digital transaction document, which would be typically implemented as cards, documents or booklets, or implemented electronically. It will be understood that in this specification the term "logical" refers to a set of characteristics for each of the digital transaction documents, and those characteristics may be in part, or all, contained in an LDTDP representing the document or logical document. The characteristics may include data such as a unique ID for the digital transaction document, ownership information and expiry dates. The unique ID information may be a unique ID number. A change in the DTC parameters adopted by the DTPU from expressing one digital transaction document to expressing another digital transaction document may also be referred to as a change in the DTC "personality". In addition to changing parameters in a DTC such that it adopts a personality for the purpose of future transactions, in one particular embodiment, the DAD is operable to receive data pertaining to new personalities by accessing a website and is further operable to transmit relevant commands to the DTC to adopt the personality of the newly acquired personality obtained by the DAD.

In embodiments, an LDTDP may include the unique ID and a token associated with the unique ID, the unique ID and token both associated with the digital transaction document represented by the LDTDP. In other embodiments, the LDTDP may include only the unique ID associated with the digital transaction document. In yet other embodiments, the LDTDP may include only the token associated with a particular unique ID, the unique ID (and, therefore, the token) associated with the digital transaction document.

In some embodiments, each of a number of digital transaction documents may be associated with a single unique ID and a single token associated with the unique ID, each of some other digital transaction documents may be associated with a single unique ID and a number of different tokens associated with the unique ID, and each of yet other digital transaction documents may not be associated with any token (in which case such a digital transaction document will be associated only with a unique ID). In these embodiments, the unique ID and/or token for a digital transaction document (or logical digital transaction document) will be contained in an LDTDP. Where a document has a number of associated tokens, each token or token/unique ID pair, may be in a separate LDTDP. In embodiments, the unique ID for the digital transaction document contained in the LDTDP may be a Personal/Primary Account Number (PAN) if the document is a credit/debit type card, or similar kinds of unique IDs, such as unique alphanumeric ID's or unique names.

In some embodiments, the at least one of the plurality of LDTDPs is stored on the DAD, wherein the LDTDP storage memory is located on the DAD. In other embodiments, the at least one of the plurality of LDTDPs is stored in LDTDP storage memory located on the DTC, wherein selection of a LDTDP through the DAD is effected by an icon, name or other indicator associated with the LDTDP, although the LDTDP is not itself stored on the DAD. In this example, the selection of the LDTDP is communicated to the DTC by data indicating which LDTDP has been selected, and the DTC implements the selected LDTDP from its LDTDP storage memory based on the indicative data.

In yet other embodiments, a part of each of the at least one of the plurality of LDTDPs is stored on the DAD. Another part of each corresponding at least one LDTDP is stored on the DTC, wherein the selection is based on the part stored on the DAD. The part of the LDTDP selected is transmitted to the DTC, and the determination of which part of the LDTDP matches the selected part is made on the DTC. In this way, the two parts of the LDTDP can be combined to form the whole LDTDP, which can then be implemented by the DTC. In such an embodiment, the LDTDP storage memory is split between the DAD and the DTC.

In an embodiment, the DAD is enabled to store and provide for selection of an LDTDP, which is implemented as a digital transaction document on the DTC. The selection of the document associated with an LDTDP (or selection of the LDTDP) may occur before selection of a token associated with the LDTDP. Where a document has only one associated token, the selection of the document may be selection of the associated token, since a further selection process is not required. In some embodiments, selection of a token automatically indicates which LDTDP is to be selected, since the token is associated only with one document (or one LDTDP).

In another embodiment, the user may select an LDTDP and a predetermined token is selected based on context determined by the DAD. For example, if the DAD determines different locations, then a token can be automatically selected based on the determined location.

In various embodiments, some digital transaction documents contained in an LDTDP will have only one associated token and other digital transaction documents will have multiple associated tokens. It will be understood that embodiments described in this specification include both options, unless otherwise stated or unless the inclusion of both options results in an embodiment that is not possible to implement.

In various embodiments, some identifying information in respect of a digital transaction document contained in an LDTDP will not need to be stored in the apparatus LDTDP storage memory (either in the device memory or the card memory) since the token(s) stored in the apparatus will be sufficient to identify its (their) associated digital transaction document(s). For example, where the digital transaction document is a credit card, the card number (the PAN) is not contained in the LDTDP and instead, the tokens associated with the credit card are sufficient to identify the particular credit card. In such an example, the credit card PAN may include the typical 4 leading digits which identifies the card as being of a certain type or brand (MasterCard, Visa, etc.). A token for the particular credit card may have the same four leading digits, but with different remaining digits, so that the token identifies the card with which it is associated. It will be understood by skilled readers that not having a PAN, for example, contained in the respective LDTDP and stored in the apparatus LDTDP storage memory (either in the DAD memory or the DTC memory) should increase security for the associated digital transaction document. In such examples, only the digital token containing LDTDPs are selected by the DAD, with the associated digital transaction document being automatically identified and selected.

In one embodiment, the DTPU CPU operates to copy data from the staging memory (staging area) to the EEPROM, or a part of the EEPROM, which has been set aside for secure record memory (secure element). In other embodiments, the DTPU CPU operates to copy part of the data from the staging memory to a part of the EEPROM, which has been set aside for secure record memory, and another part of the data to part of the EEPROM which has not been set aside for secure record memory. When, for example, an LDTDP is copied into secure record memory (secure element), the DTPU uses the digital transaction document information from the LDTDP (unique ID, token, commencement date/time, expiry date/time, etc.) to attain a personality, such that the DTC operates as the associated digital transaction document with the document's associated characteristics, such as commencement date/time, expiry date/time, etc.

It will be understood by skilled readers that a particular digital transaction document may be represented by one or more LDTDPs. For example, a digital transaction document associated only with a unique ID will be represented by a single LDTDP including that unique ID. In this example, the LDTDP being copied to secure record memory (which may be referred to as a secure element, or a secure element area) causes the DTC to operate as the digital transaction document associated with the unique ID.

In another example, a digital transaction document associated with a unique ID and a single token may be represented by a single LDTDP including the unique ID and the token. In this example, the LDTDP being copied to secure record memory (secure element) causes the DTC to operate as the digital transaction document associated with the tokenized unique ID. Alternatively, a digital transaction document associated with a unique ID and a single token may be represented by two LDTDPs, one of which includes the unique ID, the other including the token. In this alternative example, the LDTDP including the unique ID being copied to secure record memory (secure element) causes the DTC to operate as the digital transaction document associated with the unique ID (untokenized), whereas the LDTDP including the token associated with the unique ID being copied to secure record memory (secure element) causes the DTC to operate as the digital transaction document associated with the tokenized unique ID.

In yet another example, a digital transaction document associated with a unique ID and multiple tokens may be represented by various LDTDPs including both the unique ID and one of the multiple tokens, or could be represented by one LDTDP containing the unique ID, and a number of other LDTDPs, each containing one of the multiple tokens associated with the unique ID associated with the digital transaction document represented by all the LDTDPs, wherein the one of the LDTDPs being copied to secure record memory causes the DTC to operate as either the digital transaction document associated with the tokenized unique ID, or the digital transaction document associated with the untokenized unique ID.

Other arrangements for the LDTDPs may be contemplated, depending on the nature of the digital transaction document represented by the LDTDP (or LDTDPs).

In some embodiments, an LDTDP may also contain further data associated with a digital transaction document, such as an expiry date for the document. It may also be desirable in some circumstances to have multiple expiry dates in an LDTDP, for example, one expiry date for the unique ID (or for the associated digital transaction document) and another expiry date for a token associated with the unique ID. It will be understood that, where a digital transaction document has a number of associated tokens, each token may have a different expiry date, which will be contained in the respective LDTDP.

Further, the LDTDP for some digital transaction documents may include a commencement date, so that the period between commencement of validity and expiry of validity of the document (and/or one or more tokens associated therewith) can be controlled. For example, it may be desirable to have the digital transaction document valid for only one day if the document is a door pass, or some other card or pass, with a short validity requirement. Moreover, the commencement and expiry in the LDTDP could include times as well as dates for finer control of the validity period of the digital transaction document (and/or one or more tokens associated therewith).

In other embodiments, the further data contained in an LDTDP may include a security code associated with the unique ID of the document, and may also include a number of other different security codes associated with one or more tokens also contained in the LDTDP. For example, where the digital transaction document is a credit card, the security codes may be Card Verification Value 2 (CVV2) security codes, or similar. In this example, the unique ID is a PAN, which has an associated CVV2 security code, and the PAN has, perhaps, five associated tokens, each token also having an associated CVV2.

In yet other embodiments, the LDTDP may contain a Personal Identification Number (PIN) for the digital transaction document. There may be one PIN associated with the unique ID of the document, and other (different) PINs, each associated with a token. In some embodiments, the PINs could be One-Time PINs (OTPs), which expire after being used for a single transaction. In other embodiments, the PINs may have a limited period of validity, for example, expiring one week after first use.

In other embodiments, the LDTDP may contain other data, such as name, date-of-birth, physical characteristics, and other personal data of a person who owns the digital transaction document. For example, if the digital transaction document is a passport, for certain transactions an LDTDP containing the passport unique ID and eye color of the owner may be desired for authentication and/or verification in such transactions.

The LDTDP may be described as including, containing, wrapping or embodying a unique ID, token and/or other data. Further, the LDTDP may be encrypted (or otherwise secured) to protect the data contained in the LDTDP. In yet other embodiments, the LDTDP may be secured by using a public/private key infrastructure. The public and private keys may be issued by, for example, the DTC's primary issuer. Alternatively, the public and private keys may be issued by a primary issuer of an LDTDP, for example, a credit card provider.

In some embodiments, the DTPU may include a System Input/Output (System I/O) for inputting and outputting data and/or encrypted data to and from the DTPU. The System I/O is a means by which the LDTDP can be copied into secure record memory (secure element), allowing the DTPU to operate with the personality of the logical digital transaction document contained in the LDTDP. The secure element could be located on one or more devices. It could also be located in a single device with a virtual partition, or a folder.

The DTPU may also include a processor, or Central Processing Unit (CPU), which operates to control the DPTU. Further, the DTPU may include a crypto-coprocessor for encrypting and decrypting data efficiently, thus allowing the DTPU CPU to operate more efficiently without having the burden of encryption and decryption tasks. In some embodiments, the DTPU CPU and crypto-processor co-operate to decrypt (unwrap, unpack, or otherwise deal with) a selected LDTDP, before or while being stored in secure record memory, such that the DTPU can operate with data from the LDTDP.

The DTPU may also include various different types of memory, such as Read Only Memory (ROM), Random Access Memory (RAM), and Electrically Erasable Programmable Read. Only Memory (EEPROM). In some embodiments, one of the types of memory can be used for the secure record memory (also known as a secure element), with one of the other types of memory used for the staging memory (which may also be referred to as a staging area). Any one of the abovementioned types of memory could be used as LDTDP storage memory.

In some embodiments, the DTPU is an EMV device, or a device that conforms with one or more EMVCo specifications. In other embodiments, the DTPU is an EMV device (otherwise conforming to one or more EMVCo specifications), which is constructed to read a secure storage area (staging memory/staging area) for the purpose of establishing the personality of the card in which the DTPU is installed. The secure storage area, or staging memory, may be within the constructed EMV device, within the constructed EMV device storage area (memory), or within some other secure memory.

In embodiments, the CPU of the DTPU and/or a CPU that is external to the DTPU but resident within the DTC (referred to as an external DTC processor) is activated only after the CPU or the external CPU securely identifies itself to a linked DAD, such as a smartphone. In some embodiments, linking between the DAD (for example, a smartphone) and the DTC uses strong encryption for the ID and transfer of data. Links may be unique to each set (smartphone and DTC).

In embodiments, the linking between the DAD and the DTC is wireless, and may be formed using respective transceivers of the DAD and DTC. In yet other embodiments, the DTC is linkable" (i.e. operable to establish communications) with the DAD using a physical connection, such as a data cable. In such embodiments, the data cable may be adapted at one end to plug in to a communications port, such as a USB port, on the DAD, with the other end adapted to clamp or clip on to a part of the DTC. The DTC may have electrodes, or metal plates at or towards an edge thereof to connect with the cable when clamping or clipping the other end of the data cable to the DTC. In some embodiments, the respective transceivers for the DAD and the DTC may be suitable for Bluetooth™, Low Energy Bluetooth™, Wi-Fi, NFC, ANT+, or other types of contactless, or wireless communication transceivers. In embodiments, the DTC may include a button, or a similar device, to activate linking with the DAD.

In various embodiments, the DAD is operable to transfer data to the DTC without the formation of a direct link between the DAD and DTC. In such embodiments, the DAD is used to transfer data, for example, via the internet to a (cloud) connected third party device. A link between the DAD and the third party device for the data transfer can be temporary, and that link can be terminated once the data has been completely transferred. The third party device is connected, for example, to a network (perhaps via another third party, such as a payment processor), which enables the third party device to form a link and communicate with a digital transaction system device, such as a Point Of Sale/Electronic Funds Transfer at Point Of Sale (POS/EFTPOS) terminal or Automatic Teller Machine (ATM), subsequent to forming a link with the network and thence to the digital transaction system device. The third party device is enabled to transfer the data previously received from the DAD to the digital transaction system device. A holder of a DTC (which may be a person different from the owner and/or operator of the DAD) can take the DTC to the digital transaction device, and by insertion, or placing the DTC proximal to the device, the DTC holder can obtain data from the digital transaction system device. In this way, data from the DAD can be transferred indirectly and asynchronously to the DTC. This indirect data communication between the DAD and the DTC can also be reversed such that the DTC indirectly and asynchronously transfers data to the DAD, perhaps using the same infrastructure of the digital transaction system device, the network including the payment processor, the third party device and the internet. It will be recognised that the indirect and asynchronous data transfer may be useful where a first person has a DAD and wants to send data to a DTC in the control of a second person who is geographically remote from the first person. For example, a mother operating her DAD may prefer to increase spending limits of a DTC operated by her son who is travelling in a foreign country.

In embodiments, the external DTC CPU controls the reading and re-reading of the DTPU (for example, an EMV device), and updating the memory contents of the DTPU.

In embodiments, a DTC includes a wearable payment device such as a watch but also includes payment devices that are incorporated into pieces of jewelry such as finger rings, bangles and pendants. The DTC could also comprise an implantable payment device, which includes chip and transceiver arrangements which may be suitably configured for subcutaneous implantation.

In other embodiments, the DAD may be a smartphone, or another suitable device such as a fob, or key fob, or a portable processing device with an internal/external wireless communications capability such as an NFC reader/writer which is configured to operate as a DAD. In some embodiments, the DAD may be, or may include a wearable device, such as a watch or other piece of jewelry. In this regard, some smartphones presently operate with wearable wrist (or watch-like) devices. It is envisaged that future smartphones may be wholly incorporated into a wearable device, and that the DAD can be such a device. In the circumstance that the DAD includes a smartphone operating with a wearable wrist (or watch-like) device, the wearable component may have its own unique ID, which can be used for securing linking and data transfer between the DAD and the DTC in cooperation with unique IDs, respectively, for a smart phone and the DTC.

In other embodiments, the DAD (smartphone), after securely connecting to the DTC, uploads correctly formatted data in an LDTDP to the nominated secure storage area (staging memory or staging area) and then transmits a command to either the DTPU CPU or the external DTC CPU to check if the nominated storage area contains the data in a specified format (e.g. a compliant LDTDP). If the data satisfies the specified format requirements and passes various checks, the DTPU CPU or the external DTC CPU copies or moves the data (LDTDP) to a specified area (secure record memory/secure element) within the DTPU (for example, within the EMV device). The DTPU CPU or the external DTC CPU then transmits a command to the DTPU (EMV device) to read the data (LDTDP) within the secure record memory and act according to the data (express the LDTDP as the associated digital transaction document) contained within this secure record memory (secure element). The DTPU CPU or the external DTC CPU can be programmed to search for specific headers and/or other data identifiers within a range of parameters before acting. In other embodiments, it is possible to copy all records of all LDTDPs to the staging memory, and to use an index to reference the selected LDTDP from those records. Copying all records in this manner reduces the requirement to write to and/or read from the staging memory, and therefore reduces risks of accessing that memory area, including security risks.

In some embodiments, the secure record memory (secure element) is located in the DTPU, the staging memory (staging area) is located external to the DTPU on the DTC, and the LDTDP storage memory (storage memory or a memory location) is located on the DAD. In other embodiments, the secure record memory (secure element) could be located within the external CPU on the DTC. Further, the LDTDP storage memory and/or the staging memory (staging area) could be located outside of the DTC, for example, as additional memory located on the DAD. Whilst the secure record memory (secure element) could be located outside of the DTPU, this arrangement could be considered less secure than locating the secure record memory within the DTPU. However, any security concerns could be mitigated by encrypting any data in a secure record memory located outside the DTPU. In yet other embodiments, the LDTDP storage memory could be located elsewhere other than the DAD or the DTC, and, for example, the LDTDP storage memory could be located in a cloud based storage system, or could be located on portable memory, which can be accessed from the DAD.

In embodiments, the DTC includes a card transceiver. In other embodiments, the DTC includes a Graphical User Interface (GUI) for displaying data associated with the digital transaction document or token associated with the selected or implemented LDTDP. For example, if the logical digital transaction document is a credit card, the GUI on the DTC may display the PAN, the selected token associated with the selected LDTDP containing the logical digital transaction document, the card brand logo, the expiry date of the credit card, and may also display a virtual, or mimicked, hologram of the credit card brand. In another embodiment, the DTC may only display the selected token, including the expiry data and/or the CVV2, and not the associated PAN. The DTC may also include a real hologram displayed somewhere on its surface.

The external DTC CPU (or external processor) may control operations external to the DTPU and/or control reading/writing and other input/output operations with the DTPU via the DTPU system I/O. The external DTC CPU may also accommodate security tasks external to the DTPU, and/or control the GUI. In some embodiments, the external DTC CPU may include firmware that is operable to write data (for example, LDTDP data) to staging memory, such that, when the DTPU is activated, the DTPU copies the data to secure record memory (secure element) in the DTPU. In embodiments, the firmware on the external DTC CPU may be updated and the DTC is provided with means for enabling firmware updates. The updates may include firmware that extends functionality of the DTC and any programs and/or applications running thereon. The updates may allow for correction or amendment of existing firmware functions that have been identified as faulty or sub-optimal. Other firmware updates may be issued to improve or extend security, or secure functioning of the DTC. The ability to update firmware may be contrasted with, for example, existing credit or debit cards using EMV devices, where there is no, or limited, ability to update the EMV firmware. Presently, firmware is "updated" by replacement of a credit card or debit card when it expires. In the circumstances that the DTC has a relatively long operational life, for example, 5 years or more, updating firmware during the operational file of a DTC enables the functionality of the DTC to be improved or enhanced without requiring return of the DTC to an issuing authority.

In embodiments, the DTC may only form a communications link with one DAD to the exclusion of all other DADs representing a secure communications link and transmission of data between the DAD and the DTC by respective transceivers (the DTC transceiver and the DAD transceiver). In some embodiments, the link is a secure/encrypted link. In other embodiments, each DAD may be linked with multiple DTCs. However, in this embodiment, each DTC may link with only one DAD, to the exclusion of all other DADs.

In embodiments, the linking between the DTC and the DAD may be implemented by using a unique identifier for the DTC and another unique identifier for the DAD. In some embodiments, the linking of the DTC and the DAD may occur (at least partially) before the DTC is sent to a user. For example, the linking may be implemented by a DTC issuer, including a bank, a card issuing facility, a card "personalization" facility, or other type of third party institution capable of implementing a "partial" linking. In one example, a partial linking may be implemented by the DTC issuer establishing the DTC and providing an application ready for download by a user to the users DAD (for example, a smartphone), wherein activating the application causes the smartphone to search for, and link to, the DTC issued to the user. In other embodiments, the linking may be implemented by the user, and may occur when the user receives the DTC.

In some embodiments, the linking between the DTC and the DAD is permanent, or semi-permanent, and cannot be unlinked, or re-linked without permission and required action from, for example, one of the previously-mentioned third parties. For example, to unlink a DTC and the DAD uniquely linked to it, a unique code may be entered on the DAD and uploaded to the DTC. This will reset the DTC to a default state. In the default state, the DTC could "look" for a new specified unique identifier for a different DAD (for example, an IMEI number, or another suitable unique ID, of a smartphone). This unlinking/re-linking may be useful when the user replaces their DAD, such as a smartphone. In yet other embodiments, the linking may be temporary, and performed by the user. For example, a user may form a link a short time before an intended transaction is to occur, and, may unlink after the transaction is completed and at a predefined short duration after the transaction.

In an embodiment where the DTC and the DAD are dynamically linked (that is, linked by the user at a chosen time), the linking and selecting of the desired LDTDP from the DAD can occur in any order.

In embodiments, in order to have secure communication between the DTC and the DAD, the security may be implemented by linking the transaction card and the DAD, or the security may be implemented for data transmission between the transaction card and the DAD. In other embodiments, the security may be implemented for both the linking and the data transmission.

In some embodiments, the DTC includes a battery or capacitor to provide electrical power for memory storage. For example, embodiments of the card may include non-static type memory storage or, some form of powered transceiver, such a as Bluetooth™ transceiver. A battery can also be used to power the DTC to process encryption, and for changing the LDTDP containing the digital transaction document and/or digital token expressed by the DTC by implementing changes in the LDTDP containing the logical digital transaction document and/or the associated digital token.

In some embodiments, the DAD includes a processor, a user interface, a device transceiver and device memory. In various embodiments, the DAD may be a smartphone, computer tablet, laptop, Personal Computer (PC), fob device, or other suitable equipment capable of operating to allow a user to select an LDTDP and transmit data representing that selected LDTDP. The DAD may also be a custom built device suitable for the purpose. In other embodiments, the DAD may be a wearable device, such as a smart watch, or could be enabled to operate with such a wearable device. In embodiments where the DAD has a user interfaces capable of displaying images, the user interface may display a Card Association Scheme logo along with the name or other alphanumeric indicator of a personality. In the instance of a credit card, the display of a Card Association Scheme logo on the DAD user interface should appease Card Association Scheme providers who would otherwise prefer a physical card displaying that logo permanently.

In an embodiment, a selection is made from the user interface, which may include selecting from a touch activated screen, for example, on a smartphone. The touch activated screen may operate by displaying lists, drop-down lists, or other screen designs, or may employ icons on the screen. In an alternate embodiment, the user interface may be a simple display with buttons, for example, on a fob, or a key fob. Where the DAD is a PC or laptop, it may employ a screen and keyboard to provide a user interface. However, the DAD is generally preferred by users to be a portable device. On the DAD screen, an LDTDP may be represented symbolically with an icon relevant to the associated (logical) digital transaction document, or could use names or nicknames for the LDTDP. The names or nicknames could be assigned by the user, or a service provider.

For example, the document might be a MasterCard credit card and the LDTDP associated with the MasterCard may be represented on the DAD screen by a MasterCard logo. Additionally, or alternatively, the LDTDP may be represented by a combination of icon and alphanumeric information. For example, where a MasterCard has one or more associated tokens, each token contained in a separate LDTDP, the LDTDP for each MasterCard token may be represented on the DAD screen by the MasterCard logo and at least a part of the respective token number.

In various embodiments, the digital transaction devices may include POS/EFTPOS terminals, ATMs, internet connected computers or personal computers, and other such electronic devices. The digital transaction device may also include infrastructure such as a telephone and call centre enabled for Mail Order/Telephone Order (MOTO) type transactions.

In embodiments, the DTC and the digital transaction device may interface with each other by various methods. In some embodiments, the interface may be effected by insertion of the DTC into the digital transaction device. In other embodiments, the interface between the transaction card and the transaction device may be effected by Near Field Communication (NFC), wherein the card and/or the device each have a transceiver and antenna for communication. In yet other embodiments, the DTC may include a magnetic stripe, wherein the digital transaction device includes a magnetic stripe reader. In yet other embodiments, the DAD may include a transceiver configured for communication with the digital transaction device, so that transactions can optionally be made directly through the DAD. In yet other embodiments, the DTC is configured to be inserted into a POS/EFTPOS terminal, or an ATM, and is approximately the same size as a credit/debit card.

In further embodiments, the DTC may have a magnetic stripe, and the DAD may have a magnetic stripe reader and/or writer.

In an embodiment, the DTC may be adapted to express a default "Null" personality, wherein the data in place of an LDTDP containing a logical digital transaction document requiring unique identification could be a predetermined series of digits, for example, all zeros. In one example, where the logical digital transaction document represented by an LDTDP is a credit card, the unique identification may be the credit card PAN or an associated digital token, and setting the DTC back to expressing a Null personality is performed by over-writing or replacing the PAN or the associated digital token with all zeros. This may occur by writing to the staging memory and copying into the secure record memory, or by having the DTPU itself write into secure record memory (secure element).

In an optional embodiment, the DTC may be configured to store an LDTDP for an associated logical digital transaction document and/or associated digital tokens for a chosen period. The period may be predetermined by the issuer of the DTC and/or issuer of the digital tokens (which may be a different issuer to that of the DTC). Alternatively, the storage period may be chosen by the user. In other variations, the period may be dynamically selectable, and could be chosen by the user for each transaction, or for each selection and storage of a single LDTDP for an associated logical digital transaction document and/or associated digital token(s) on the DTC. In other embodiments, the storage period for the LDTDP for an associated logical digital transaction document and/or associated digital token(s) on the DTC could be determined based on the LDTDP selected, the transaction type, or both.

In yet another embodiment, the DTPU of the DTC is configured to store/express the personality associated with only one LDTDP containing a logical digital transaction document and associated digital token(s) at any particular time. In this regard, to change the LDTDP in the DTPU, a user must overwrite or delete a previously-stored/expressed LDTDP containing a logical digital transaction document and its associated token(s) if there is one embodied in the DTC at that time. In another embodiment, the card may be configured to store/express more than one LDTDP (containing a logical digital transaction document and the associated token(s) for each document) concurrently.

In another embodiment, the DTC and its DTPU may be configured to store and/or express an LDTDP associated with a primary logical digital transaction document and its associated token(s), and one LDTDP associated with a secondary logical digital transaction document and its associated token(s). In yet another embodiment, the DTC and its DTPU may be configured to store and/or express one LDTDP associated with a primary logical digital transaction document and its associated token(s), and one or more LDTDP associated with secondary logical digital transaction documents and associated token(s) for each. The LDTDP associated with the primary logical digital transaction document and its associated token(s), in some embodiments, may be stored permanently on the DTC in its DTPU, with the one, or one or more, LDTDPs associated with secondary logical digital transaction documents and the associated token(s) for each being temporarily stored on the DTC in its DTPU. In yet other embodiments, the one, or one or more, LDTDPs associated with secondary logical digital transaction documents and the associated token(s) for each may be permanently stored and/or expressed on the DTC in its DTPU and referenced by a code stored on the DAD.

In yet other embodiments, the DAD may include an e-wallet, which can be configured to operate with one or more of the LDTDPs containing logical digital transaction documents and associated token(s) stored on the DAD. This arrangement can be used to top up funds where the associated digital transaction document is a debit card or a credit card. Further, the DAD may include functionality to allow a user to view transactions that are completed with the DTC (or by other means, such as online transactions) in real time. This may allow the user to monitor all transactions made by all LDTDPs associated with digital transaction documents in the apparatus (which may include a plurality of DTCs linked or linkable with the DAD) in, a single screen or with a single smartphone application. Further, the user could be shown the associated digital token that was used for a transaction. This may further allow the user to cancel, stop, pause or otherwise appropriately deal with one or more digital transaction documents if the user detects or perceives that one or more digital transaction documents have been misused or fraudulently used. The apparatus could also be adapted to allow the user to cancel, stop, pause or otherwise appropriately deal with one or more digital transaction documents on a token-by-token basis, so that only certain tokens associated with a document are disabled, but the document is still useable with other associated tokens. The user could also cancel, stop, pause or otherwise appropriately deal with one or more logical digital transaction documents if the user seeks to limit, for example, spending, or other financial or non-financial transactions occurring with one or more logical digital transaction documents. This may also be performed on a token-by-token basis.

In another embodiment, the DAD may be enabled to receive alerts for the user when a transaction, or a selected category or type of transaction, is conducted using the DTC. For example, the DAD may alert the user that an LDTDP containing a digital transaction document, such as a passport, has been used for identification at an airport. Further, the alerts can be implemented on a token-by-token basis. In another example, the DAD may alert the user that a credit card has been used to purchase services such as a taxi ride, not included in a list of authorized transaction categories, such as purchases of fuel and groceries, selected by the user.

In other embodiments, the DAD and/or the DTC may be configured to allow a user to classify transactions into categories. The categories could be predefined and/or defined by the user. The categorization could be configured in order to allow the user to monitor and/or limit transactions, such as spending with credit within that category. A category may be related to only one LDTDP and associated (logical) digital transaction document, or could be related to a number of LDTDPs and respective associated (logical) digital transaction documents. Tokens can also be used for categorization of transactions using the one LDTDP and associated digital transaction document.

In yet another embodiment, the DAD may be configured to allow the user to transfer funds to another user who has a DAD. The transfer may be limited to same or similar LDTDPs and associated (logical) digital transaction document types, and could be limited in amount. In a further embodiment, the DTC could be configured to transfer funds to another DTC (owned by the user or owned by another user), or to another DAD (owned by the user or another user).

Furthermore, in another embodiment, third parties, such as financial institutions, police, customs, government, employers, spouses, parents and other interested parties could be authorized and enabled to cancel, stop, pause or otherwise appropriately deal with (including temporary suspension) one or more LDTDPs containing logical digital transaction documents in the apparatus or selected token(s) associated with the document. This may be useful, for example, if a user has a gambling addiction, and prefers to have a third party monitor and prevent access to credit cards, debit cards, bank accounts or other kinds of financial logical digital transaction documents in order to prevent the user from excessive gambling. In the instance of an attempted fraudulent transaction and cancellation/re-issuance of a logical digital transaction document, the user may be provided with alerts advising the cancellation of a document and the availability of a replacement document for collection/download to a user's DAD and subsequent use to effect a transaction with a DTC adopting the personality of the newly issued (replacement) document.

In other embodiments, the DAD may be configured to store data representing loyalty points, frequent flyer points, or other associated transaction related documents, attached to a (logical) digital transaction document contained in an LDTDP, or plurality of (logical) digital transaction documents contained in respective LDTDPs. The DAD may also be enabled to update loyalty points, frequent flyer points and other associated transaction related documents during or after a transaction, or at other times. For example, loyalty points may be used during a transaction to reduce the cost of an item to be purchased using the DTC and the DAD. The DAD may also be enabled to add loyalty points, frequent flyer points and other associated transaction related documents if a user visits a particular shopping store, or is in a predetermined proximity of the store. In some embodiments, the loyalty points, frequent flyer points and other associated transaction related documents may be contained in an LDTDP as further data associated with the relevant (logical) digital transaction document and/or associated tokens.

In yet another embodiment, if the DTC includes an LDTDP containing a primary logical digital transaction document, for example, permanently stored and/or expressed on the DTC in the DTPU, the primary logical digital transaction document may be a false or fake logical digital transaction document, such that data copied from the DTC or DTPU where only the primary logical digital transaction document is stored on the DTC or DTPU will be useless for any digital transactions. Alternatively, the primary logical digital transaction document may be represented by a unique ID that is incomplete, expired or all zeros, such as a Null ID. For example, where the primary digital transaction document is a credit card, the PAN of the card could be incomplete, expired or all zeros. In this embodiment, only LDTDPs containing secondary logical digital transaction documents stored on the DTC and/or in the DTPU will be real and useable for a digital transaction when embodied on the DTC via the DTPU as a digital transaction document. Further, an LDTDP containing a secondary logical digital transaction document and its associated digital token(s) may be stored or embodied as a tokenized digital transaction document on the DTC and/or expressed in the DTPU for only a short period, for example, five minutes, in order to reduce the risk of theft of data representing the digital transaction document and token. This arrangement reduces the risk that an unauthorized user can emulate the associated digital transaction document and token. Alternatively, the LDTDP containing the primary logical digital transaction document stored on the DTC and/or expressed in the DTPU may comprise incomplete data, rendering the DTC/DTPU unusable for digital transactions until a user downloads and saves secondary data to the DTC/DTPU (along with associated token data), to render the primary logical digital transaction document complete and useable for digital transactions.

In yet another embodiment, each LDTDP or a sub-set of LDTDPs stored on a DAD may have a PIN associated therewith (or contained therein). The PIN may be a static PIN, or could be a dynamically generated PIN. In other embodiments, the PIN may be displayed on the user interface of the DAD. Access to the PIN to display on the screen of the DAD may be by secured methods, such as finger swipe or other such security methods such as those commonly implemented on smartphones. In another embodiment, the DAD may be configured to allow the user to update a PIN for a particular LDTDP or for a number of LDTDPs. In embodiments, PINs could also be associated with particular tokens for a document in an LDTDP, such that each token for the document has a different PIN.

In an embodiment, the method includes operating the activated DTC with the digital transaction device to perform the digital transaction.

In some embodiments, tokens are provided for an LDTDP associated with a primary logical digital transaction document before the DTC is issued to a user. The tokens can be sent to the DAD through a secure network so that a token can be selected for a transaction with the associated LDTDP for the logical digital transaction document (already stored on the DTC or in the DTPU at issuance) at the time of a transaction. Alternatively, the tokens associated with the primary document could be loaded onto the DTC or DTPU at issuance, with selection effected by the DAD at the time of a transaction. Secondary logical digital transaction documents (optionally contained in LDTDPs) may be issued to the user through a secure network means to the DAD after issuance of the DTC, and the associated digital tokens for each secondary document can be issued with the associated secondary document (also optionally contained in the respective LDTDPs).

In yet another embodiment, tokens contained in one or more LDTDPs can be a fixed or extendible pool, which are used in a cyclical manner, with a next token selected in order. Alternatively, tokens could be selected from the pool randomly (or pseudo-randomly). In a further embodiment, tokens could be one use only, with a pool of used or expired tokens replaced when every token in the pool has been used or expired. It is also possible that the pool of tokens is replenished in advance of every token being used or expired, for example, when there are ten unused or unexpired tokens remaining in the pool, the user could be alerted to the need for token replenishment. It will be understood that single use tokens can improve security for an associated digital transaction document (and its containing LDTDP), and for the transactions. In another embodiment, the user could choose when to replace tokens in the token pool. In this embodiment, the user could request a new pool or an extension of their existing pool of tokens from a token provider. The new tokens could be provided already contained in respective LDTDPs for storage in LDTDP storage memory.

In a further embodiment, a primary user of a given digital transaction document could assign tokens to a secondary user of that document. For example, a primary credit card holder could assign token(s) from a token pool to a subsidiary holder of that credit card. This may be used as a way to control the spending of the subsidiary credit card user to limits, amounts or categories of spending.

In yet other embodiments, where tokens are assigned for usage in only certain transaction types, a third party, such as a token issuer, government agency or other controller of token usage, has authority to allow issuance of only tokens for selected transaction types. In one example, the authority controlling issuance of tokens may only allow tokens to be issued for a credit card that are for non-gambling expenditure.

In some embodiments, the tokens are generated only by a third party provider who issues the tokens to users (optionally already contained in respective LDTDPs). The tokens may also be issued by another third party provider in other embodiments. Alternatively, in an embodiment, the tokens may be generated locally by the user, for example, by the DAD and stored into the LDTDP storage memory contained in LDTDPs. The locally generated tokens could be securely copied to a third party to be matched during a transaction to thereby authorize the transaction. A cryptogram may be created containing a token, along with one or more of the associated document's unique ID, expiry date, unique ID of the DAD, time, date, location, and various other random, pseudo-random or non-random inputs. A cryptogram may also be created using, for example, a public key from the DTC, a public key from the LDTDP (for example, if it is a credit card LDTDP), and/or a public key from the digital transaction device (for example, a POS/EFTPOS terminal). The cryptogram may also be created using public keys from other sources. A cryptogram created using one or more public keys will contain the one or more tokens, and other IDs and data.

Although various security and convenience benefits are evident, to a skilled person upon reading the specification, with one or more arrangements according to embodiments of the invention, to the present time there has not been a sufficiently effective, efficient, and/or secure means and/or method for adapting a DTPU (such as an EMVCo specified device) to embody different personalities as compared with the personality of the DTPU that was initially installed.

Since the certification process for a DTPU (such as an EMVCo specified device) is an extremely long and complicated process, it is particularly desirable to provide a Digital Transaction Card (DTC) that is operable to selectively assume the personality of a number of different digital transaction documents without requiring any change or modification to the hardware or essential operating firmware of a DTPU device that has already achieved certification for use in accordance with existing digital transaction systems. A Digital Transaction Card (DTC) that is operable to selectively assume the personality of a number of different digital transaction documents without requiring any change to the DTPU that has previously been certified for use in digital transaction networks, enables the development of a DTC that comprises the desirable features of selectively assuming the personality of one of a number of different digital transaction documents without the usual delay associated with obtaining certification of a new, or modified, DTPU that is operable to effect the additional functionality of the DTC that was not previously available.

In yet other embodiments, the apparatus (and associated method) may allow for a point-to-point secure connection to be established between the LDTDP storage memory and the secure record memory (secure element) of the DTPU on the DTC. This direct channel of communication allows for transfer of data directly from the storage memory to the secure record memory.

It will be appreciated that, whether the data is transferred from LDTDP storage to staging memory and thence to secure record memory, or data is transferred via a point-to-point connection directly from LDTDP storage memory to the secure record memory (secure element), the DAD may be used to operate the system to facilitate the data transfer, including establishing required links, connections and entering required data, such as the name or identification of a LDTDP, and entering authentication/authorization data, such as PINs. The DAD operates the system with assistance from the at least one program on the DTC.

The DTC may also include a processor or CPU for controlling operations external to the DTPU and/or for controlling reading/writing and other input/output operations with the DTPU via the DTPU system I/O. The DTC CPU may also handle security tasks external to the DTPU, and/or control the GUI. In some embodiments, the DTC may include firmware operated by the CPU of the DTC. The firmware may be operable to write data (for example, LDTDP data) to staging memory, such that, when the DTPU is activated, the DTPU copies the data in to secure record memory (secure element) in the DTPU. In embodiments, the firmware on the DTC CPU may be updateable, wherein the DTC is provided with means for enabling firmware updates. The updates may include firmware that extends functionality of the DTC and any programs and/or applications running thereon. The updates may allow for correction or amendment of existing firmware functions that have been identified as faulty or sub-optimal. Other firmware updates may be for improving or extending security, or secure functioning of the DTC. The ability to update firmware may be contrasted with, for example, existing credit or debit cards using EMV chips, where there is no ability or limited ability to update the EMV firmware. Presently, firmware is "updated" by replacement of a credit card or debit card when it expires. In the circumstances that the DTC has a relatively long operational life, for example, 5 years or more, updating firmware may present a useful functionality of the DTC.

In other embodiments, real-time state information and other data from the DTC is displayed on the user interface of the DAD, so as to provide a user with knowledge, for example, of whether a transaction using the DTC has been successful. The interface can also be used during (or alternatively, before the start of) a transaction to enter data required for a transaction, for example, entering a Personal Identification Number (PIN), or using other authentication means, including finger prints and retinal scans, for authorize and/or authentication of a transaction. The PIN may be a One-Time-PIN (OTP), useable for only one transaction or for a selected time period.

In some embodiments, the LDTDPs may be stored on the DAD in LDTDP storage memory, and at least one LDTDP can be selected via the interface of the DAD, then copied before or during a transaction to the DTC, so that the DTC, via its DTPU can take on the personality of the digital transaction document associated with the LDTDP transmitted to the DTC.

In an embodiment, selection is made via the user interface of the DAD, which may include selecting from a touch activated screen, for example, on a smartphone. The touch activated screen may operate by displaying lists, drop-down lists, or other screen designs, or may employ icons on the screen. The user interface may also be a simple display with buttons, for example, on a fob, or a key fob. Where the DAD is a PC or laptop, it may employ a screen and keyboard to provide a user interface. However, the DAD is generally preferred by users to be a portable device. On the DAD screen, a LDTDP may be represented symbolically with an icon relevant to the associated (logical) digital transaction document, or could use names or nicknames for the LDTDP. The names or nicknames could be assigned by the user, or a service provider.

For example, the document might be a MasterCard credit card, so that the LDTDP associated with the MasterCard is represented on the DAD screen by a MasterCard logo. Additionally, or alternatively, the LDTDP may be represented by a combination of icon and alphanumeric information. For example, where a MasterCard has one or more associated tokens, each token contained in a separate LDTDP, the LDTDP for each MasterCard token may be represented on the DAD screen by the MasterCard logo and at least a part of the respective token number.

In various embodiments, The DTC may also include a button, or a similar device, to activate linking with the DAD. In some embodiments, the respective transceivers for the DAD and the DTC may be suitable for Bluetooth™, Low Energy Bluetooth™, Wi-Fi, Near Field Communication (NFC), ANT+, or other types of contactless, or wireless communication transceivers. In other embodiments, the transceivers may require contact between the DAD and the DTC in order to transmit data, or in order to establish a link between the two.

In an embodiment, the DTC may be adapted to express a default "null" personality, wherein the data in place of a LDTDP containing a logical digital transaction document requiring unique identification could be a predetermined series of digits, for example, all zeros. In one example, where the logical digital transaction document represented by the LDTDP is a credit card, the unique identification may be the credit card PAN or an associated digital token, and setting the DTC back to expressing a null personality is performed by over-writing or replacing the PAN or the associated digital token with all zeros. This may occur by writing to the staging memory and copying into the secure record memory, or could be done by having the DTPU itself write into secure record memory (secure element).

Software Enhanced EMV Device

In an embodiment, additional software including data and/or instructions that define a personality is installed on an existing certified EMV device during runtime to enable the EMV device to adopt that personality.

In an embodiment one or more single-personality Applets (e.g., such as Java Applets) are installed on a personality section of an EMV device which is created at the time of initialization of the EMV device containing data and/or instructions defining a personality, that is, prior to issuance of the EMV device (which retains certification since the action is conducted by an approved/certified entity). In such an embodiment, the EMV device is operable to receive and execute commands from either a DAD or a DTC external processor, the commands being in accordance with the Global Platform Standard. As will be understood, an EMV device executing commands that accord with the Global Platform Standard remains within the certification parameters of the EMV device since Global Platform Commands are pre-approved since they constrain the actions that may be implemented by an EMV device executing such a command.

In another embodiment the one or more single-personality Applets are stored in a secure location in an external DTC processor, such as a Microcontroller Unit (MCU) for example, in a location secured by software (encrypted) or by hardware (secure element). In this embodiment, the EMV device contact plate must be secured so that third parties are unable to "listen in" (man in the middle attacks) to data that is transmitted between the external DTC processor and the EMV device for the purpose of monitoring same, and to further ensure that third parties cannot inject commands during a session involving communication between an EMV device and MCU. The external DTC processor once instructed sends and installs the selected file (e.g. the Applet with the selected personality) to the EMV device by use of GPS commands, and the EMV device executes the commands.

In another embodiment, additional software is incorporated into an existing certified EMV device to enable the EMV device to receive and install multiple personalities and further, implement an increased command set as compared with current devices. In particular, the increased command set enables the EMV device to receive and install data and/or instructions defining multiple personalities and modify the operational parameters and/or the status of the personalities by using Global Platform Commands that are usually only executed by authorised entities that issue EMV devices.

In an embodiment, a Multi-Personality Applet is installed onto an EMV device prior to issuance of the EMV device (which retains certification since the action is conducted by an approved/certified entity) and once issued and in use, the EMV device effects actions to install multiple personalities and to effect further actions upon, and with, the personalities stored on the EMV device.

In an embodiment, digital transactions are performed with digital transaction devices with a DTC having a DTPU and a DTC receiver, and a DAD having a DAD user interface, a DAD transmitter and the DAD having access to data pertaining to a plurality of DTC personalities, wherein the DAD and DTC are operable to transfer data from the DAD to the DTC, wherein the DTPU includes a software module having instruction code which, when executed, causes the DTPU to receive and implement instructions according with the Global Platform Standard (GPS), the DTPU software module operable to receive a plurality of GPS commands issued by the DAD responsive to user selection of a desired personality using the DAD user interface, thus causing the DTPU to adopt the user selected personality and upon completion of execution of the plurality of GPS commands, the DTC operable to subsequently effect transactions as the user selected personality.

In an embodiment, the user selected personality is communicated to the DTPU by the DAD. In another embodiment the DTPU seeks a data transfer from the DAD which includes the user selection.

Embodiments in which existing DTPU hardware is not modified to effect the functionality provided by the DTC in adopting one of many different personalities is beneficial since the use of an existing DTPU hardware is likely to require minimal re-certification (or perhaps avoid the need for re-certification entirely) by a certification authority of the DTPU.

In embodiments in which the existing software of a certified DTPU is modified to effect the functionality of a DTC operable to store and adopt one of many different personalities, any re-certification that is required is likely to be far less difficult and lengthy as compared with altering the firmware of an existing certified DTPU. Accordingly, use of Global Platform Standard (GPS) commands in the instance of an EMV device is beneficial since a DTC can be provided wherein only the EMV device software is enhanced as compared with an existing certified EMV device.

However, the issuance of GPS commands to effect functions in an EMV device requires the data transferred to effect those functions to be encrypted, or in some way isolated from the environment, to prevent eavesdropping or man-in-the-middle attacks by persons seeking to interfere with the legitimate transfer of data according to GPS commands. As will be understood by skilled readers, the use of GPS commands outside the confines of a secure issuing facility may require a secure session to be established for transmission of those commands in order to retain the secrecy of same. Irrespective of the need to retain secrecy, the establishment of a secure session ensures that the injection of commands that are not intended is avoided. Further, despite the absence of a single GPS command to effect a personality change, a sequence of GPS commands are issued during a secure session to effect a required change such as a user selected change to the personality of a DTC.

As will also be understood, encryption keys that are required to decrypt the parameters of a stored personality reside on the EMV device for each personality and in one embodiment, a further set of limited functionality encryption keys are available to unable changes to the status of stored personalities and a limited set of operational parameters.

Firmware Modified EMV Device

Although a modification to the essential operating firmware of a certified EMV device causes the device to lose its certification credentials, it remains possible to implement an embodiment of the invention with a firmware modification to an existing certified EMV device. Of course, once the firmware has been modified, re-certification of the device with the modified firmware is required before the device could be used.

In this embodiment, the firmware of an existing EMV device is modified to enable the EMV device to receive and execute an increased set of commands from an external network transaction device (such as an ATM or EFTPOS device (or a device initiating a network transaction device)) that enables the secure memory of the EMV device to be modified.

BRIEF DESCRIPTION OF THE DRAWINGS

For a better understanding of the invention, and to show how it may be performed, optional embodiments thereof will now be described by way of non-limiting examples only and with reference to the accompanying drawings in which.

DETAILED DESCRIPTION OF THE EMBODIMENT(S) OF THE INVENTION

Figure 1:
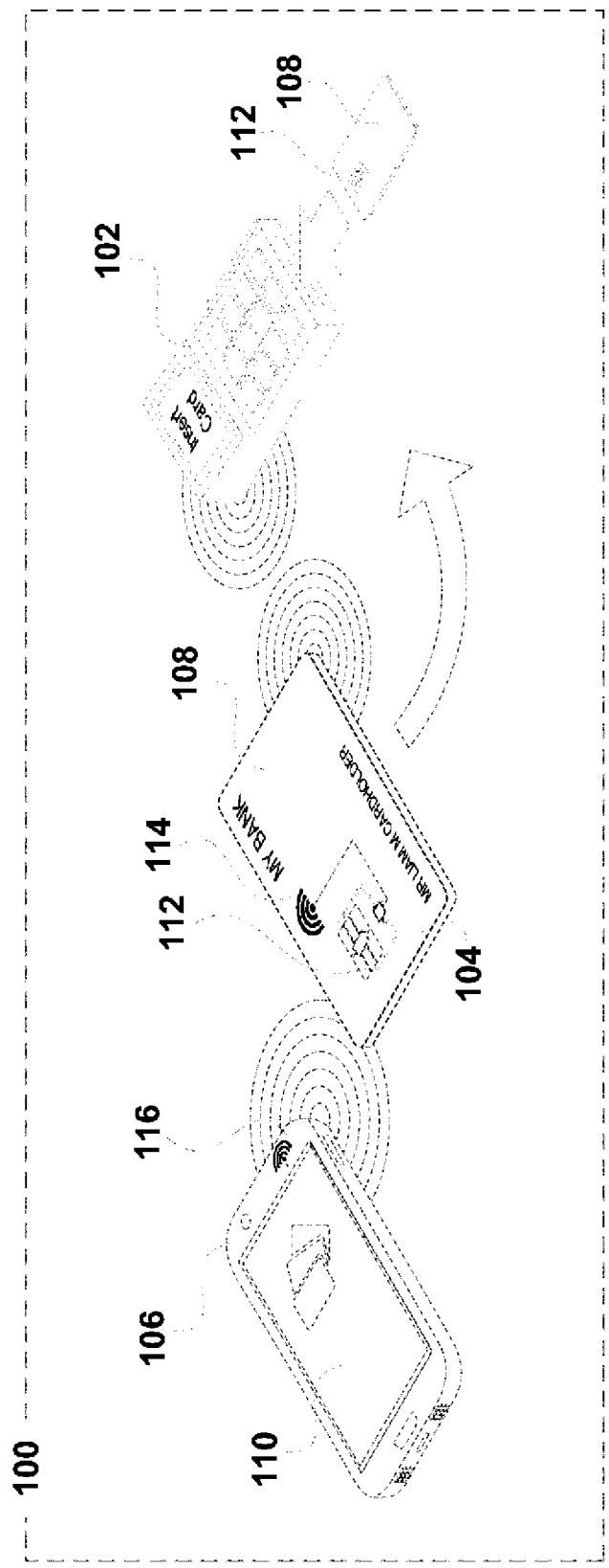
FIG. 1 is a diagrammatic representation of an apparatus in accordance with an embodiment of the invention, including an embodiment of a Digital Transaction Card (DTC) and an embodiment of a Data Assistance Device (DAD) in the form of a smartphone, wherein the apparatus is being used for a transaction with a digital transaction device, in this example, a Point of Sale/Electronic Funds Transfer at Point of Sales (POS/EFTPOS) terminal.

FIG. 1 details the primary components of an apparatus (100) according to an embodiment of the invention, including a Digital Transaction Card (DTC) (108), a Data Assistance Device (DAD) in the form of a smartphone (106) and a Digital Transaction Device (102), which in this example is a Point of Sale/Electronic Funds Transfer at Point of Sale (POS/EFTPOS) terminal (102). Such terminals (102) may be referred to herein as merchant terminals, and may engage with the DTC (108) according to a contactless close proximity communication capability according to ISO/IEC 14443 between a terminal transceiver (not shown) and a DTC transceiver (114). Terminal (102) may also engage with a smartphone transceiver (116) and communicate therewith in accordance with the ISO/IEC 14443 Communications protocol. It is also possible for terminals (102) to engage by physical contact with the DTC (108), or with a magnetic stripe on the DTC (108). In the embodiment shown, the terminal (102) requires insertion of the DTC (108) into the terminal (102) to engage by physical contact. In the embodiment of FIG. 1, the smartphone (106) wirelessly engages with the DTC (108) by NFC, whereas the DTC (108) wirelessly engages with the terminal (102) by communications according to ISO/IEC 14443 which is a sub-set of the NFC Communications format.

It will be understood that many types of smart devices, or computing devices, such as smartphones (106), are unable to interact with many types of POS/EFTPOS terminals (102) and Automatic Teller Machines (ATMs). In order to complete a transaction with such terminals, it is necessary to use a debit or credit card. However, debit or credit cards will each have a single "personality", or comprise the physical embodiment of only a single digital transaction document. For example, presently, a physical transaction card can only have the personality of a MasterCard or a Visa card, but cannot selectively and serially assume the personality of both a MasterCard and a Visa card, at different times.

In the embodiment shown in FIG. 1, the DTPU (104) on the DTC (108) is an EMV device (where EMV is an abbreviation for Europay, MasterCard, and Visa), or a device complying with one or more of the EMV Co specifications, which has been adapted to allow expression of a number of different personalities. Such current DTPUs or EMV devices may include Read Only Memory (ROM), Random Access Memory (RAM), and/or Electrically Erasable Programmable Read Only Memory (EEPROM). The DTPU (104) may contain other kinds of memory, and the DTPU (104) may include a Central Processing Unit (CPU) for controlling operations of the DTPU (104). The DTPU CPU may work in cooperation with a crypto-coprocessor which handles the tasks of encrypting and decrypting data, thus freeing the DTPU CPU to perform other processing tasks. Communications between the DTPU (104) and electrodes (112) on the surface of the DTC (108) are effected by a system Input/Output (system I/O) of the DTPU (104).

Similar to a standard EMV device, the DTPU (104) of the embodiment shown in FIG. 1 is located in a plastic credit card body using electrodes (112) for communicating externally. However, the DTPU (104) may also communicate externally with terminals (102) using a wireless transceiver.

In an embodiment in which the operating firmware of an EMV device is modified, the DTPU (104) EEPROM may be divided into two memory areas. In some embodiments, the division could be by partition (or virtual partition), by use of a suitable file structure, or by use of a suitable directory structure. In this example embodiment, part of the EEPROM is used as staging memory (staging area). During operation, the staging memory has at least one Logical Digital Transaction Document Packet (LDTDP) written into it from LDTDP storage memory. Another part of the EEPROM is used as the secure record memory (secure element). During operation, the at least one LDTDP is taken from staging memory, and written into the secure element, which is accessed by the DTPU CPU when the DTPU is activated to read the secure element. When the DTPU CPU accesses the LDTDP, the DTPU (104) is able to assume the personality represented by the LDTDPs, such that the DTC (108) can be used for transactions with that personality.

In other embodiments, instead of using a single EEPROM divided into two memory areas (staging and secure record memory areas), there may be provided two separate memory chips each containing one of a staging memory and a secure record memory. These memory devices (or chips) could be configured in the DTPU (104) to have no direct link, in order to increase security, particularly for the secure record memory, which should only be directly accessible by certain designated elements in the DTPU (104), such as the DTPU CPU.

In the DTC (108), in accordance with an embodiment of the invention, there may be located an external DTC CPU different from, and additional to, the DTPU CPU. The control of the DTPU (104) may be by control of the DTPU CPU. The external DTC CPU and the firmware associated therewith may allow data (including LDTDPs) to be communicated to the DTPU (104) through the system I/O. The external DTC CPU and firmware can be operated to instruct the DTPU CPU to copy data (for example, one or more LDTDPs) into the staging memory. The DTC CPU can also be operated to instruct the DTPU CPU to transfer the data in the staging memory to the secure record memory.

The data containing the LDTDPs can be stored in LDTDP storage memory, either in the smartphone (106) or on the DTC (108) itself in a memory separate from the memories in the DTPU (104). The arrangement depicted in FIG. 1 allows LDTDPs to be stored in LDTDP storage memory, and to be copied from LDTDP storage memory to staging memory. Copying from LDTDP storage memory to staging memory may be controlled by the external DTC CPU, which in turn controls operation of the DTPU CPU. The operation of the external DTC CPU may be controlled by the DAD (106), being operated by a user via the user DAD user interface 110.

In another step of an example operation, the data containing the one or more LDTDPs is loaded from staging memory into secure record memory of the DTPU (104).

In embodiments, a link is established between a smartphone (a DAD) (106) and a DTC (108), using strong encryption for the identification and transfer of data therebetween. The link may be unique to each pairing of a smartphone (106) with a DTC (108).

The external DTC processor (or DTC CPU) is typically activated only after securely identifying itself to the linked smartphone. The DTC processor on the DTC (108) controls the reading and re-reading of the DTPU (104), and updating of the DTPU (104) to express new personalities. In some embodiments, the external DTC CPU may be activated by pressing an on/off switch on the DTC (108). In other embodiments, the DTC CPU is activated (and powered) by the DAD (106).

In embodiments, after the smartphone (106) and DTC (108) are securely linked, the smartphone (106) uploads correctly formatted data (for example, an LDTDP) to the nominated secure storage area (for example, staging memory) by the external DTC CPU after meeting specific standards and passing various checks for compliance, and then transmits a command to the DTPU processor to do the following:

Check if the nominated storage area (staging memory) contains data (an LDTDP) in a specified format;

If the data meets a specified standard and passes various checks, the DTPU processor copies or moves the data to a specified area (secure record memory) within the DTPU;

The processor then sends a command to the DTPU (104) to read the data within the specified area (secure record memory) and act according to the data contained within that area, which may be stated as the DTPU (104) expressing the personality of the particular document represented in the LDTDPs in the secure record memory;

The DTPU processor may then be instructed to search for specific headers and other data identifiers within a range of parameters before acting on that data.

It will be understood by skilled readers that the DTPU (104) may be an EMV device constructed with an increased storage area, which is specifically instructed to check and/or monitor a secure storage area (this may be referred to as secure record memory or secure element). The EMV device may also accept commands from, for example, an external processor resident within the DTC (108).

In embodiments, the external DTC processor only transfers data into the memory area(s) of the DTPU (104), and once inside this memory area, the DTPU processor is responsible for further copying, reading, writing, and/or processing of the data. However, in other embodiments, the data may remain under the control of the external DTC processor, wherein the external DTC processor (CPU) may issue commands to the DTPU processor (CPU) to operate to copy, read, write, and/or process the data.

In another embodiment, the DTPU processor verifies data before transferring same to the secure location (secure record memory). Further, the DTPU processor after completing the check and verification of data instructs the EMV device to load the data, or update itself.

In various embodiments, all memory storage (LDTDP storage memory, staging memory, and secure record memory) may be located on the EMV device. Alternatively, some memory storage could be located on a chip outside the DTPU, but linked to the EMV device. The memory storage may be file based, using data files (electronic files) located in a Directory File (DF), with a root directory, or Master File (MF).

The firmware on the external DTC processor may be native firmware (using machine language), but could be interpreted code executed according to an interpreter based operating system, including Java card, MultOS, or Basic-Card. Because both the external DTC CPU and the DTPU CPU provide commands, the external DTC CPU would benefit from having the same firmware as the DTPU CPU, therefore allowing commands to be provided using the same format. In this regard, if and when updating firmware for the external DTC CPU, it can be beneficial to also update firmware for the DTPU CPU. In some embodiments, firmware for both the external DTC CPU and the DTPU CPU could be stored in the same location, accessible by both CPUs, therefore requiring only updates to one firmware repository. However, a single source of firmware may have security implications.

FIG. 1 details a DTC (108) which may form a communication link via a DTC transceiver (114) with a smartphone transceiver (116) of smartphone (106) to enable data transfer therebetween. In embodiments of the invention where the digital transaction document in respect of which a user seeks to conduct a transaction, the user may operate the user interface (110) of the smartphone (106) to select a particular digital document and activate that digital document in the DTC (108). Once the DTC (108) adopts the required personality and assumes the characteristics of the digital transaction document selected by the user operating their smartphone (106), the DTC (108) may then be used to conduct transactions with the DTC (108). In this regard, the DTC (108) operates with all of the characteristics of the selected digital transaction document which once activated as the document to be installed as the document to which the DTC pertains, the document becomes the personality of the DTC. In other words, once a DTC becomes the physical embodiment of a document, the document transitions to a "personality" of the DTC.

In particular, the DTC (108) with the selected personality of choice for a digital transaction document, may then be used to conduct transactions according to the existing infrastructure of a digital payment transaction network including Automatic Teller Machines (not shown), and/or a merchant terminal (102) as shown in FIG. 1 to effect a range of transactions.

In the case of using the DTC (108) with a selected digital transaction document as its personality, the merchant terminal (102) with which the DTC (108) communicates may be effected by use of any of the existing communication means between DTCs and merchant terminals and in FIG. 1. The example illustrated includes a transaction effected between the DTC (108) and a merchant terminal (102) by physical contact between the DTC (108) and the merchant terminal (102) which generally includes physical contact between an external contact plate (112) of a payment device incorporated in the DTC (108) and electrodes (not shown) resident within the merchant terminal (102).

Further examples of conducting a transaction between a DTC (108) and a merchant terminal (102) include the use of contactless close proximity communication capabilities of the DTC (108) and the merchant terminal (102) and in instances where the DTC (108) includes a magnetic stripe, using a magnetic stripe reader of the terminal (102) and the DTC (108) to effect the transaction.

The embodiment in FIG. 1 has been described above in terms of an embodiment including a firmware modified EMV device. Of course, skilled readers will appreciate that the same, or similar, improvements to the functioning of a DTC (108) can be achieved with an embodiment including a software enhanced EMV device which has the advantage of reduced complexity regarding any requirement to certify the device in view of any software enhancements.

Similarly, the embodiments described in FIGS. 2A, 2B and FIGS. 3A to 3D could be implemented with arrangements involving either a firmware modified EMV device or a software enhanced EMV device.

Figure 2A:
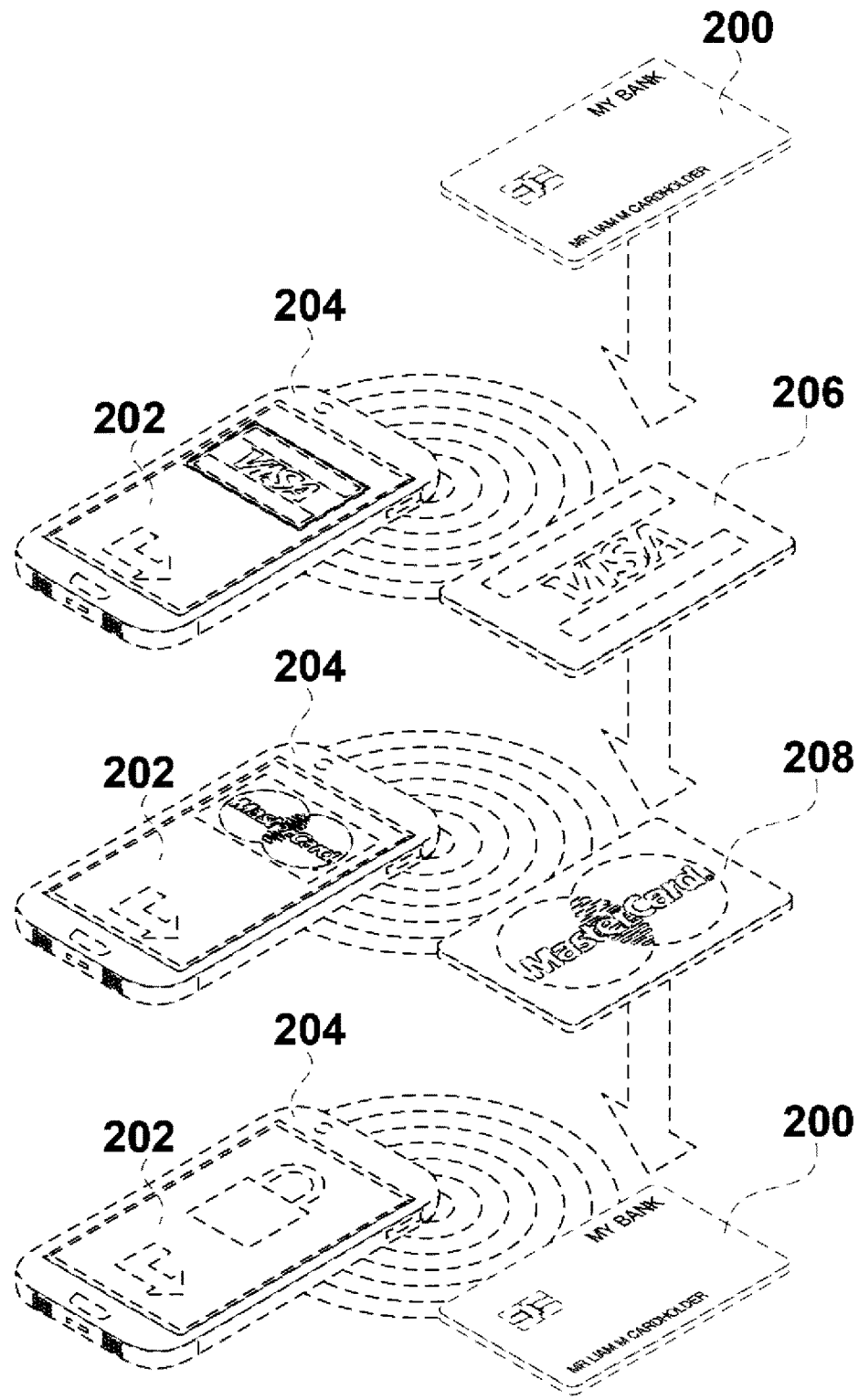
FIG. 2A is a diagrammatic representation of a DTC in communication with the DAD of FIG. 1 operating to select a digital transaction document by use of the DAD and selection of the personality of the DTC resulting from selection of the required personality on the DAD and communication of same to the DTC according to an embodiment.

With reference to FIG. 2A, a DTC in the form of a physical card (200) with associated DAD user interface (202) is diagrammatically illustrated stepping through a process of selecting a different personality for the DTC (200).

In the embodiment of FIG. 2A, the DTC (200) does not have a specific personality at the commencement of the process of selecting a personality. A user may operate a smartphone (204) and communicate with the DTC (200) in accordance with a contactless close proximity communication protocol in order to select the personality required of the DTC (200). In the particular example of FIG. 2A, the smartphone (204) has executed software to present available card personalities to a user who has selected a VISA card as the preferred personality of the DTC (200). In an embodiment, it may be necessary for the user to provide biometric authentication such as a fingerprint in order to operate the smartphone (204) to select a personality for the DTC (200).

Once the smartphone (204) communicates the user's selection of a VISA card as the personality that should be adopted by the DTC (200), the relevant selection and/or data is transferred from the smartphone (204) to the DTC (200) and upon receipt of the selection and/or data representing the LDTDP of a VISA card, the DTC adopts the personality of the VISA card (206). At a subsequent point in time, the user may prefer to change the personality of the DTC to a MasterCard and may operate software on their smartphone to select a MasterCard personality for the purpose of effecting a personality change in the DTC. With reference to FIG. 2A, the smartphone (204) has been operated to select a MasterCard personality and upon communicating the relevant selection and/or LDTDP data to the DTC (200), the DTC adopts a MasterCard personality and subsequent to which, the DTC (200) will operate as the consumers MasterCard (208).

Ultimately, once a consumer has completed conducting transactions with their DTC, they may prefer to render the DTC with a Null personality and with reference to FIG. 2A, the smartphone (204) is operated to identify that the consumer prefers to lock their DTC by imparting a Null personality to the DTC. Upon communication of the user's request, the smartphone (204) causes the DTC (200) to adopt a Null personality (200).

In the embodiment of FIG. 2A, the DTC (200, 206, 208) is a modified DTPU executing software that has been modified to allow/enable the DTC to adopt different personalities including a Null personality in accordance with commands transferred to the DTC by the DAD (204).

The communication between the DAD and DTC may be effected by the DAD processor communicating with a DTC external processor via respective transceivers (shown in FIG. 1 as smartphone transceiver (116) and DTC transceiver (114) respectively) and wherein the DTC external processor having received commands from the DAD, co-operatively communicates with the EMV device to cause the EMV device to adopt a required personality in accordance with the commands received by the DTC from the DAD.

Figure 2B:
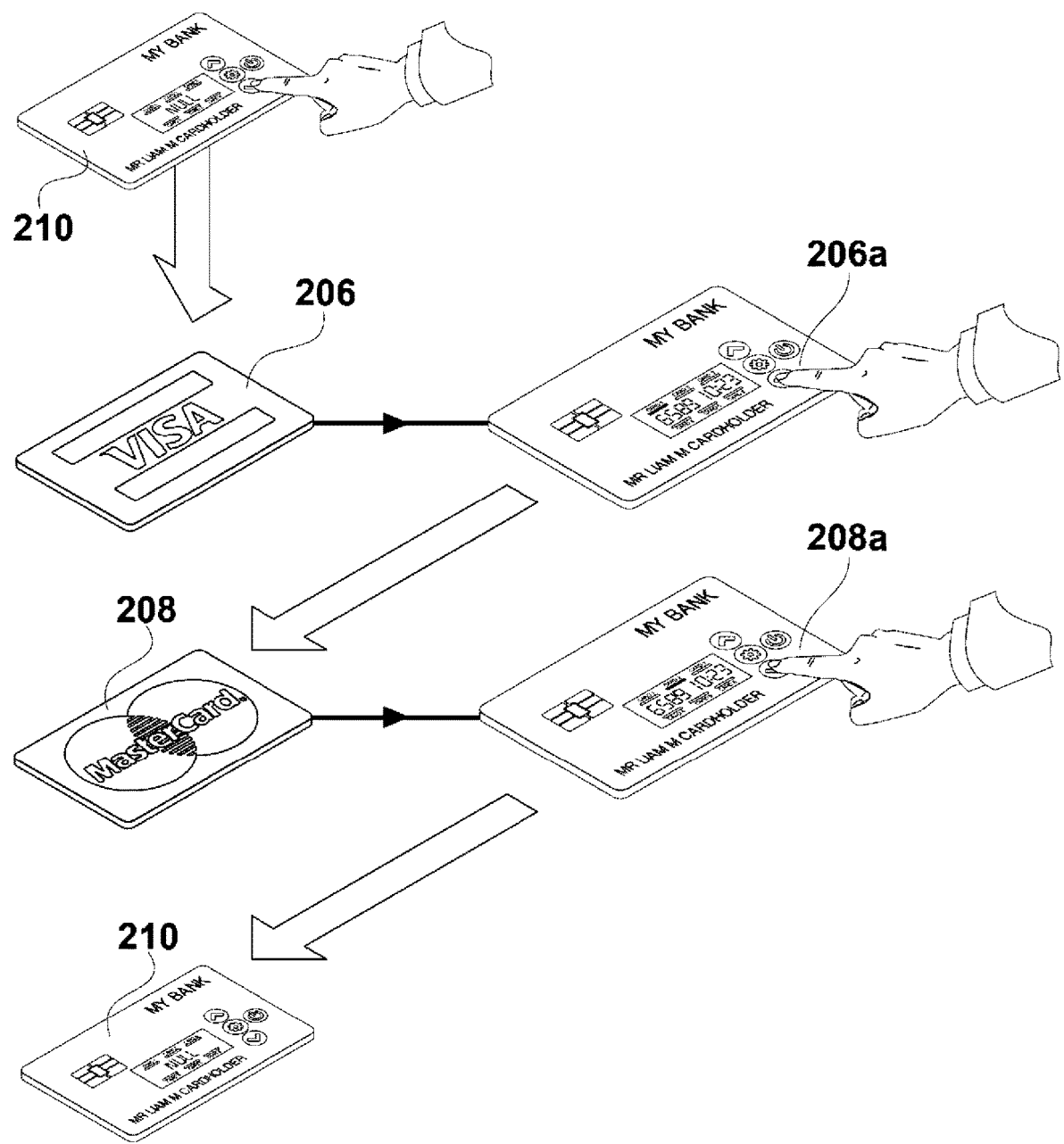
FIG. 2B is a diagrammatic representation of a DTC illustrating the selection of digital transaction documents by use of a DTC user interface which in the embodiment of FIG. 2B includes various touch activated switches and a display.

With reference to FIG. 2B, the same steps depicted in FIG. 2A are illustrated in FIG. 2B regarding the change of personality of a Digital Transaction Card. The reader will note that the DTC in FIG. 2B is a DTC with a Null personality (210) including a user interface, which is described in more detail below, particularly with reference to FIG. 3D. In the instance of the embodiment depicted in FIG. 2B, the request to change the personality of the DTC (210) is effected by the DTC user interface as compared with the DAD user interface (refer FIG. 2A). As for the DTC (200) in FIG. 2A, the Null personality DTC (210) in FIG. 2B transitions to a VISA card (206) by the user operating the user interface on the Null personality DTC (210) which includes scroll and enter keys and a display on the DTC.

When seeking to change the personality from a VISA card (206) to a MasterCard (208), the user operates the scroll keys of DTC (206a) observing the display which displays available personalities sequentially as the scroll keys are repeatedly depressed. Once a MasterCard personality is displayed, the user may depress the enter key and the DTC personality is altered accordingly. The DTC (208) can be changed to a Null personality again by the user operating the user interface of DTC (208a) to display and select a Null personality and effect same.

Figure 3A:
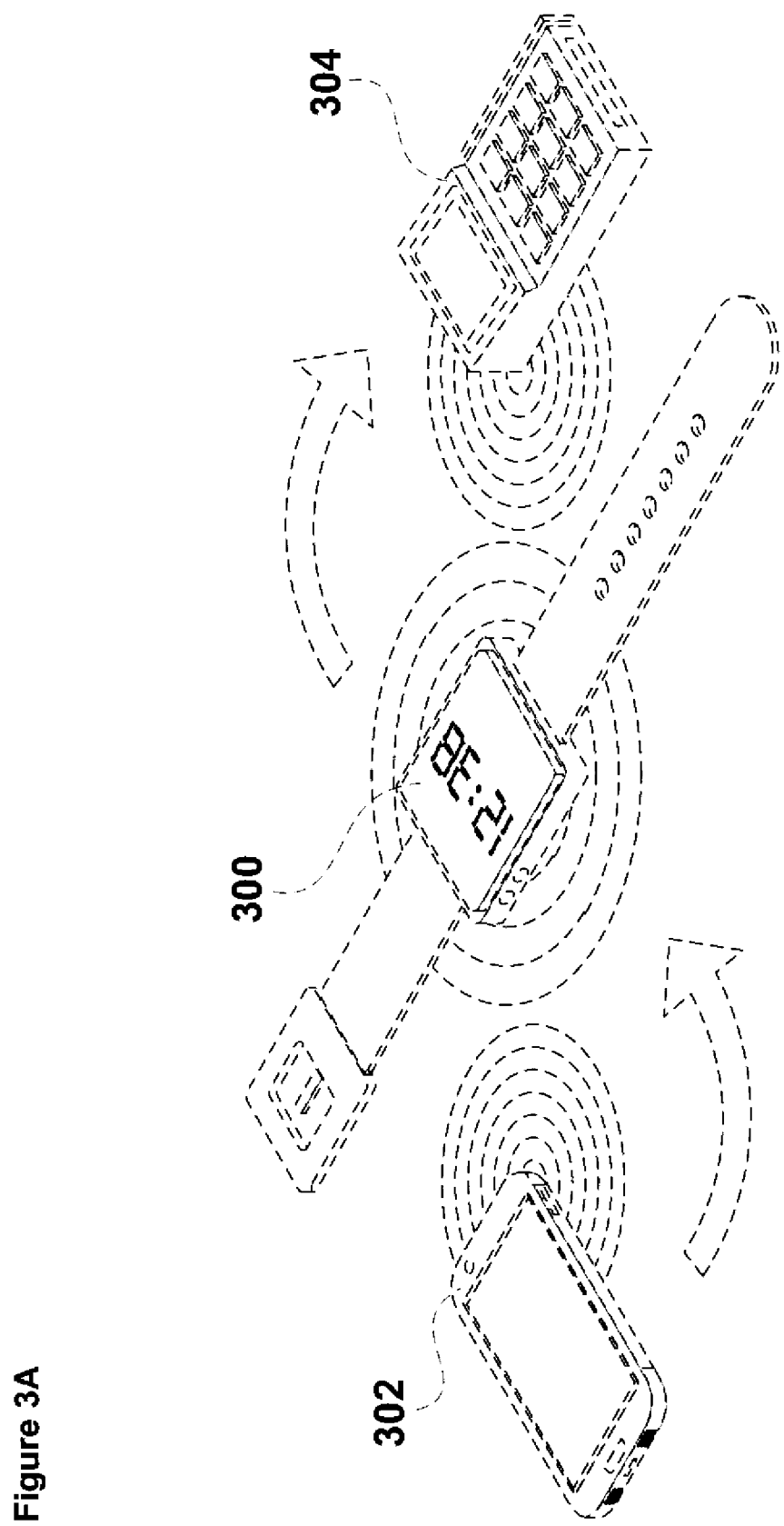
FIGS. 3A, 3B, 3C and 3D are diagrammatic representations of various embodiments of a DTC in the form of a watch, ring, smartphone protective case and a credit card body respectively, the credit card body of FIG. 3D depicted according to a minimum viable product embodiment, without interface embodiment and with interface embodiment respectively.

With reference to FIG. 3A, a DTC in the form of a wearable device (300) is illustrated along with a DAD in the form of a Smartphone (302) and a merchant terminal (304). In this particular embodiment, the wearable device (300) is a watch which also provides the function of displaying the current time and any other functions that are available according to the wearable device (300). Increasingly, wearable devices are being adopted by consumers to combine the functions of many individual items thereby reducing the complexity of conducting transactions since, once the functionality of a DTC is incorporated into a wearable device (300), it is no longer necessary to carry a separate DTC. Wearing the wearable device (300) enables the user to conduct transactions with the device that they would ordinarily wear. In the instance of FIG. 3A, the wearable device (300) is illustrated communicating with the smartphone (302) and a merchant terminal (304) via contactless close proximity communication. Of course, despite all three devices being illustrated in close proximity, skilled readers will understand that it is not necessary for the wearable device (300) to be in contactless close proximity communication with both a smartphone (302) and a merchant terminal (304) simultaneously and the communication between respective devices may occur separately at different times.

Figure 3B:
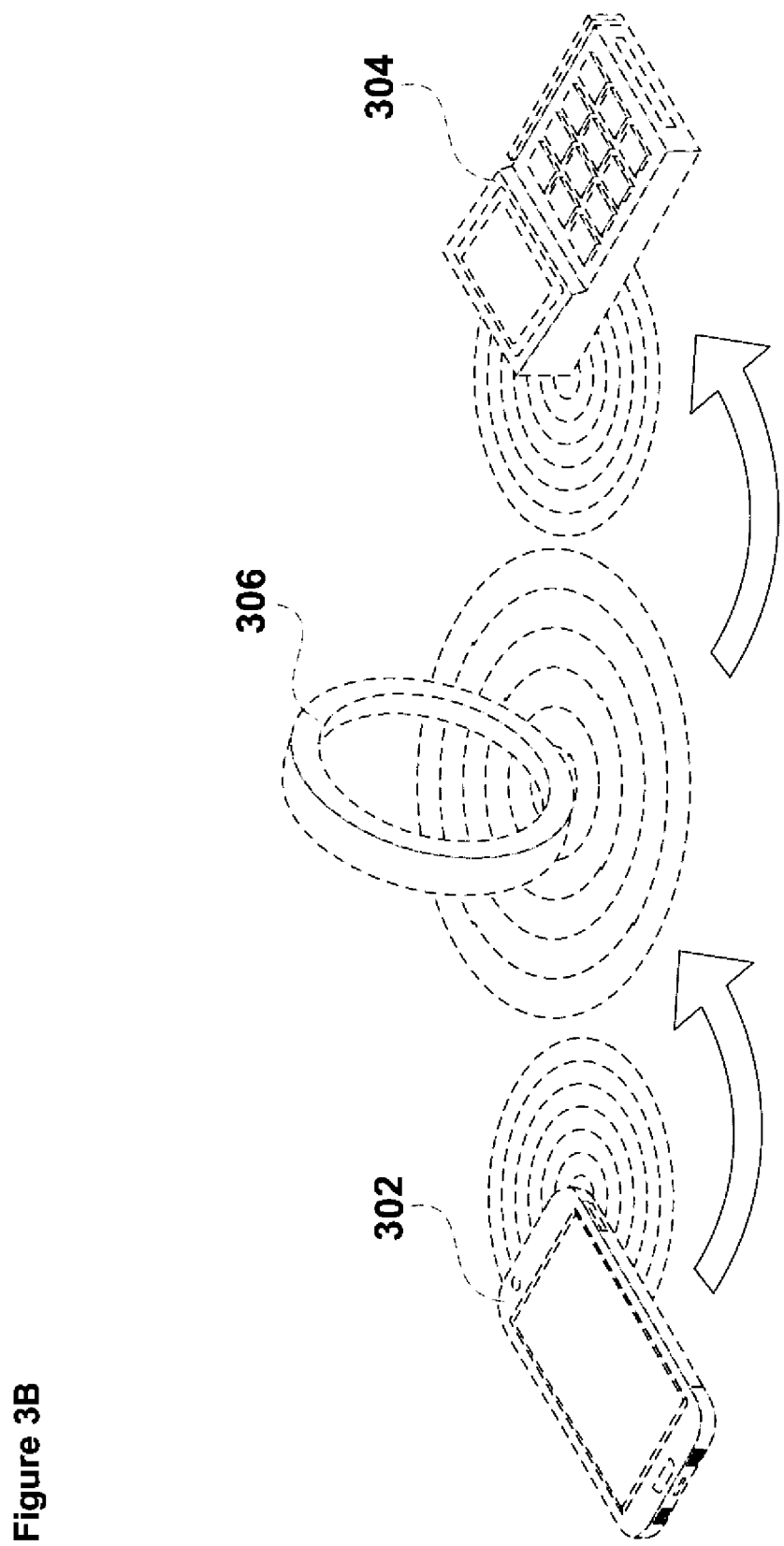

With reference to FIG. 3B, an alternative wearable device in the form of a ring (306) is detailed in contactless close proximity communication with a DAD in the form of a smartphone (302) and a merchant terminal (304). Once again, in the illustration in FIG. 3B, communication between the smartphone (302), the wearable device in the form of a ring (306) and a merchant terminal (304) all occur using contactless close proximity communication.

Figure 3C:
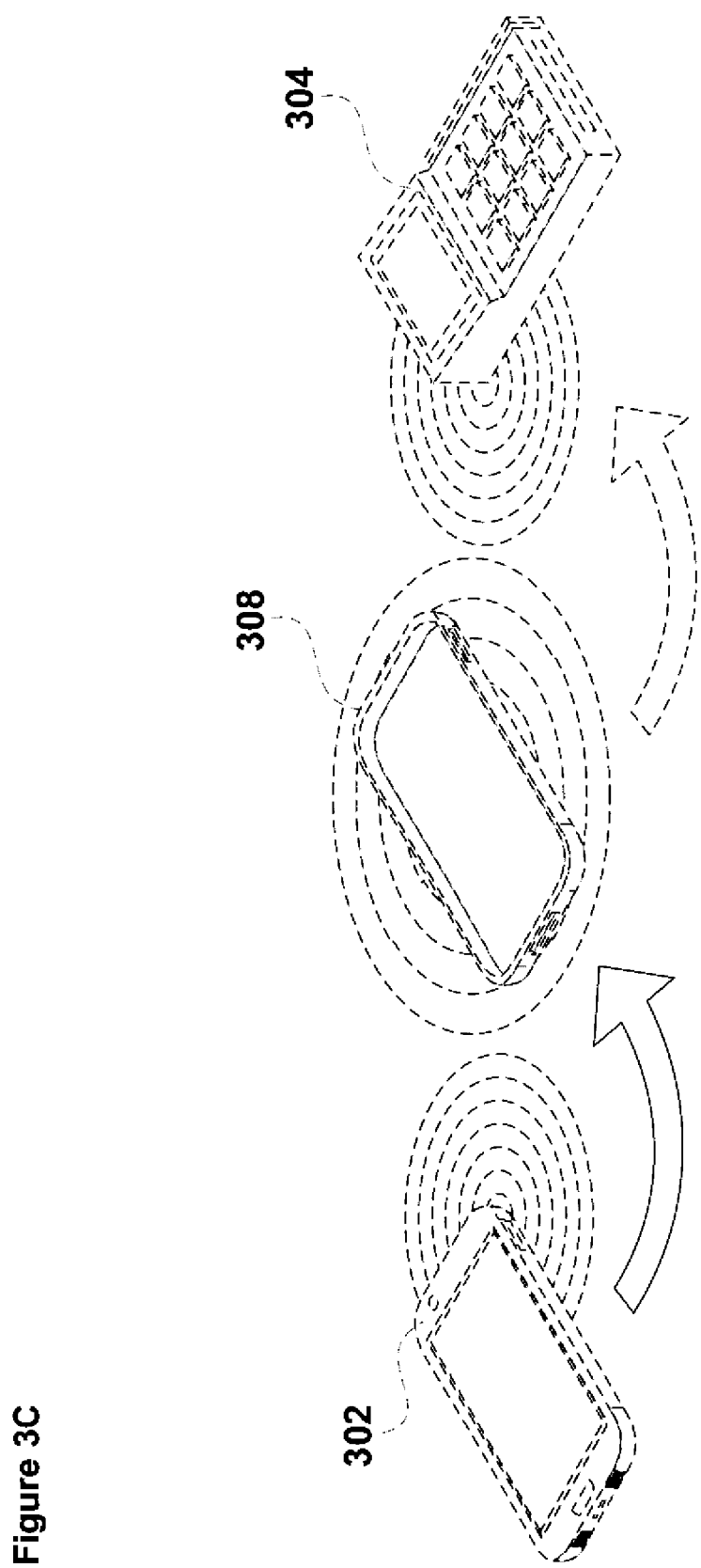

With reference to FIG. 3C, yet another embodiment is illustrated in which the DTC is provided in the form of a smartphone case (308). In this particular embodiment, a DAD in the form of a smartphone (302) communicates with a DTC in the form of smartphone case (308) which in turn communicates with a merchant terminal (304). All communications illustrated in FIG. 3C occur in accordance with contactless close proximity communication according to ISO/IEC 14443 and in this particular embodiment, rather than a wearable device, the DTC takes the form of another convenient device, namely, a smartphone case (308) since users regularly purchase cases for their smartphones in order to protect their smartphone from damage. Of course, in the embodiment of FIG. 3C, if a consumer were to user a DTC in the form of a smartphone case (308), and attach the case (308) to the smartphone (302), then the DAD in the form of the smartphone (302) and the DTC in the form of a smartphone case (308) are in the consumers possession at the same time.

Figure 3D:
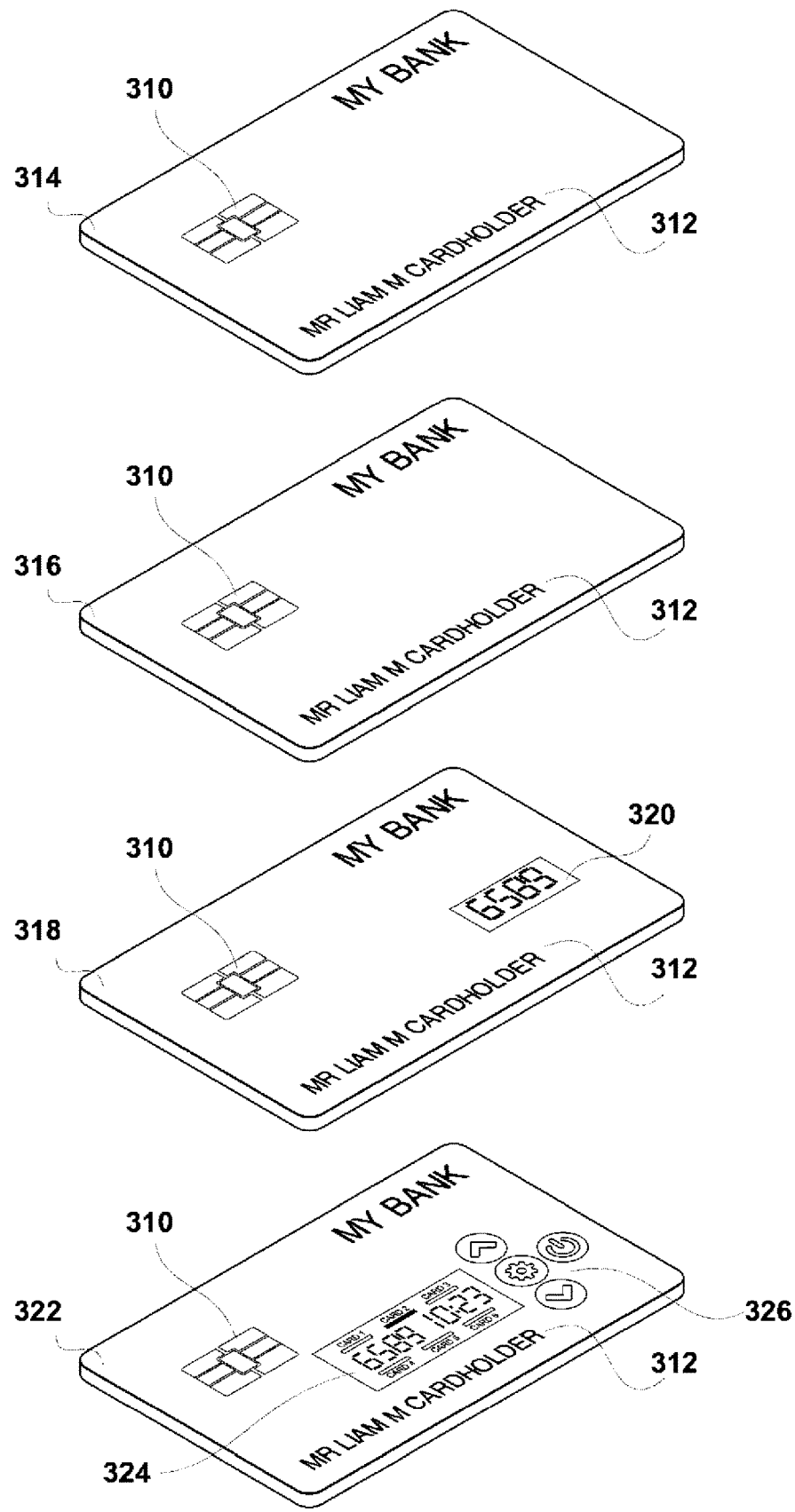

The reader will appreciate that the DTC may be configured in a number of different ways, and there is a range of possible DTC embodiments from a DTC having minimal (or limited) functionality/connectivity but will be less expensive to produce and less prone to failure, to a DTC having maximum functionality and including features that assist user interaction and will therefore be considered more "user friendly" but will be more expensive to produce and will be more likely prone to failure. FIG. 3D provides diagrammatic representations of four DTCs which have a credit card profile whereby each includes an EMV device (310) and an optional printed identification (312), which in the embodiment shown is the card owner's name, and whose features of functionality/connectivity represent significant differences in user experience with respect to digital transactions.

For example, the uppermost DTC (314) that is depicted in FIG. 3D represents a card having minimal functionality/connectivity and includes an EMV device (310) that is either firmware-modified software-enhanced to enable NFC wireless connectivity between the EMV device and a DAD (302) and to change the personality of the DTC (314), but excludes an external DTC processor (referred to as an MCU), Bluetooth connectivity and any form of display or scroll/enter keys. In one particular embodiment, DTC (314) that is configured with minimal functionality/connectivity can be issued to a user such that the EMV device (310) has pre-loaded multiple personalities. More commonly, after the DTC (314) is delivered to the user, the DAD (302) may be used to transfer one of multiple personalities onto the EMV device (310) or a number of personalities for simultaneous storage by the EMV device (310).

The second DTC (316) that is depicted also represents a card having minimal functionality/connectivity including an EMV device (310) that is either firmware-modified or software enhanced to enable wireless connectivity between the EMV device and a DAD (302), such as Bluetooth and/or NFC, to change the personality of the DTC (316). The DTC (316) also includes an MCU (not shown in FIG. 3D). A DTC (316) that is configured with relatively minimal functionality/connectivity but including an MCU can be issued to a user with the EMV device (310) having access to data performing to multiple personalities. Alternatively, after the DTC (316) is delivered to the user, the DAD (302) may be used to transfer one of multiple personalities onto the EMV device (310) or a number of personalities for simultaneous storage by the EMV device (310).

The third DTC (318) that is depicted in FIG. 3D represents a medium functionality/connectivity card including an EMV device (310) that is either firmware-modified or software enhanced to enable wireless connectivity between the EMV device (310) and a DAD (302), such as Bluetooth and/or NFC, and to change the personality of the DTC (318). The DTC (318) also includes a display (320) which may be in the form of a simplified 4-digit alphanumeric interface for displaying information, including but not limited to, the selected personality loaded (or previously stored) on the card, a unique ID or abbreviation of the selected personality, an expiry date for the document, a temporary PIN number, a PAN number or part thereof, and/or a name of the card owner. A DTC (318) that is configured with mid-range functionality/connectivity can be issued to a user such that the EMV device (310) has access to data pertaining to multiple personalities. Alternatively, after the DTC (318) is delivered to the user, the DAD (302) may be used to transfer one of multiple personalities onto the EMV device (310), or a number of personalities for simultaneous storage by the EMV device (310).

The fourth DTC (322) that is depicted in FIG. 3D represents a card having a high level of functionality/connectivity and includes an EMV device (310) that is either firmware-modified or software-enhanced to enable NFC or Bluetooth wireless connectivity between the EMV device (310) and a DAD (302) and to transfer multiple personalities onto the EMV device (310) after delivery of the card. The DTC (322) also includes a more comprehensive display (324) and scroll/enter keys (326) which enable user input, including input effecting selection of a stored personality. The skilled addressee will appreciate that the inclusion of a user interface on the card enables the DTC (322) to be used even when a DAD (302) such as a user's smartphone is not present, for example, if the DAD is not being carried by the user or has a discharged battery.

As previously described, whilst it is possible to implement embodiments with hardware and firmware that is adapted to enable a DTC comprising a DTPU to adopt one of many available personalities, it is preferable to achieve the results with an existing, certified DTPU, such as a device certified in accordance with the EMVCo specifications, without requiring any alteration to the DTPU or any essential operating firmware. As will be appreciated by skilled readers, avoiding the requirement to certify a newly developed DTPU has the benefit of avoiding a substantial cost associated with the certification process and avoids the substantial delay also associated with such a process.

Devices such as EMV devices operating with an operating system such as the MULTOS or JavaCard systems allow the secure execution of application software that is installed within the EMV subsystem. EMV subsystems are considered sufficiently secure to allow third party software to be installed and operated within the EMV subsystem subsequent to reissuance of an EMV device since the operating system will prevent any inappropriate alteration of the EMV device secure memory.

Accordingly, by installing application software in the EMV system that operates to receive commands that are already available and defined according to the current EMV subsystem, additional functionality beyond that provided by standard DTCs can be achieved. In the embodiment(s) described in FIG. 4 onwards, the DTPU is implemented in the form of a software-enhanced EMV device.

Figure 4A:
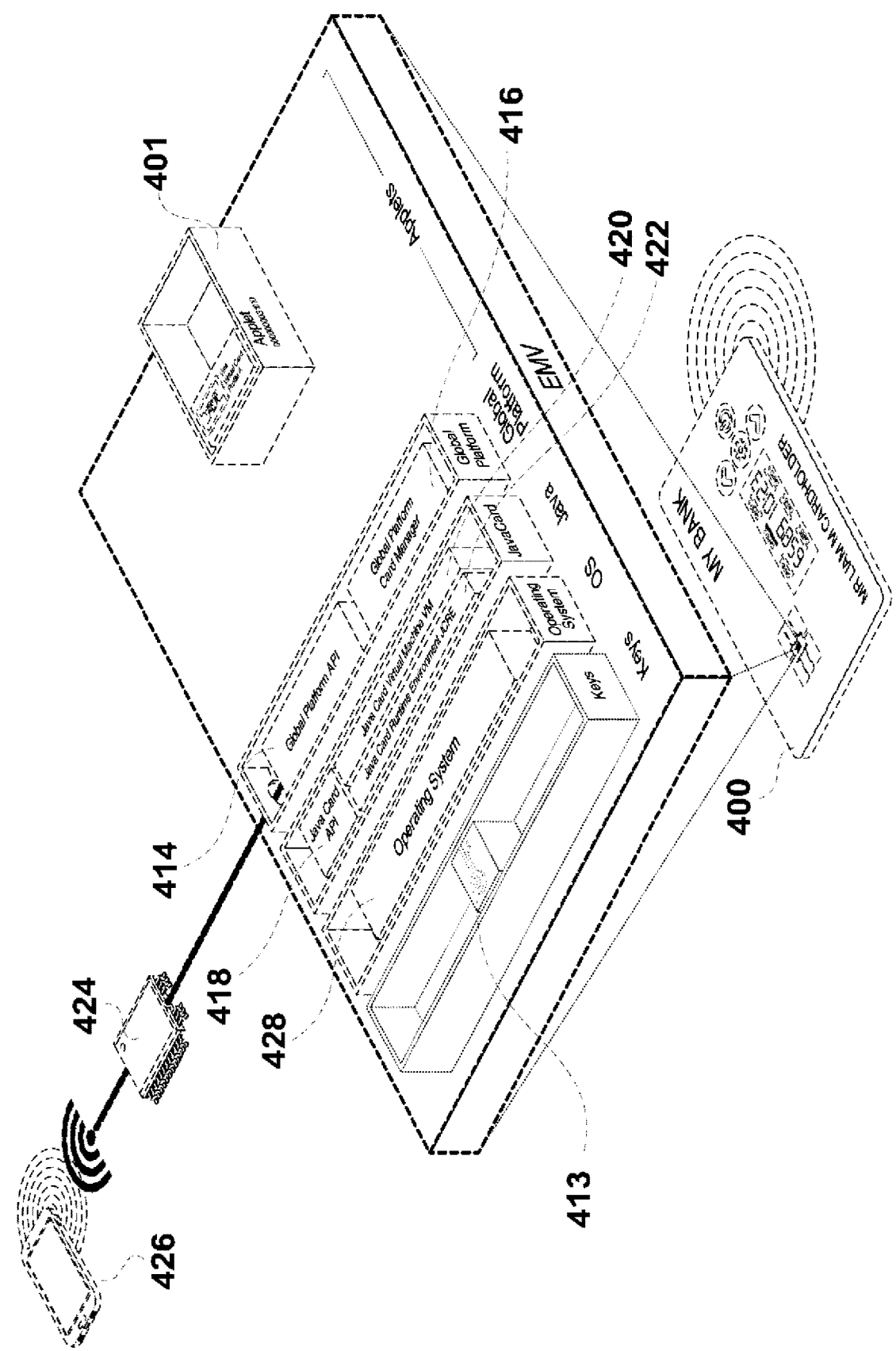
FIG. 4A is a diagrammatic representation of the elements in a software enhanced DTPU according to an embodiment of the invention involving single-personality applets.
Figure 4B:
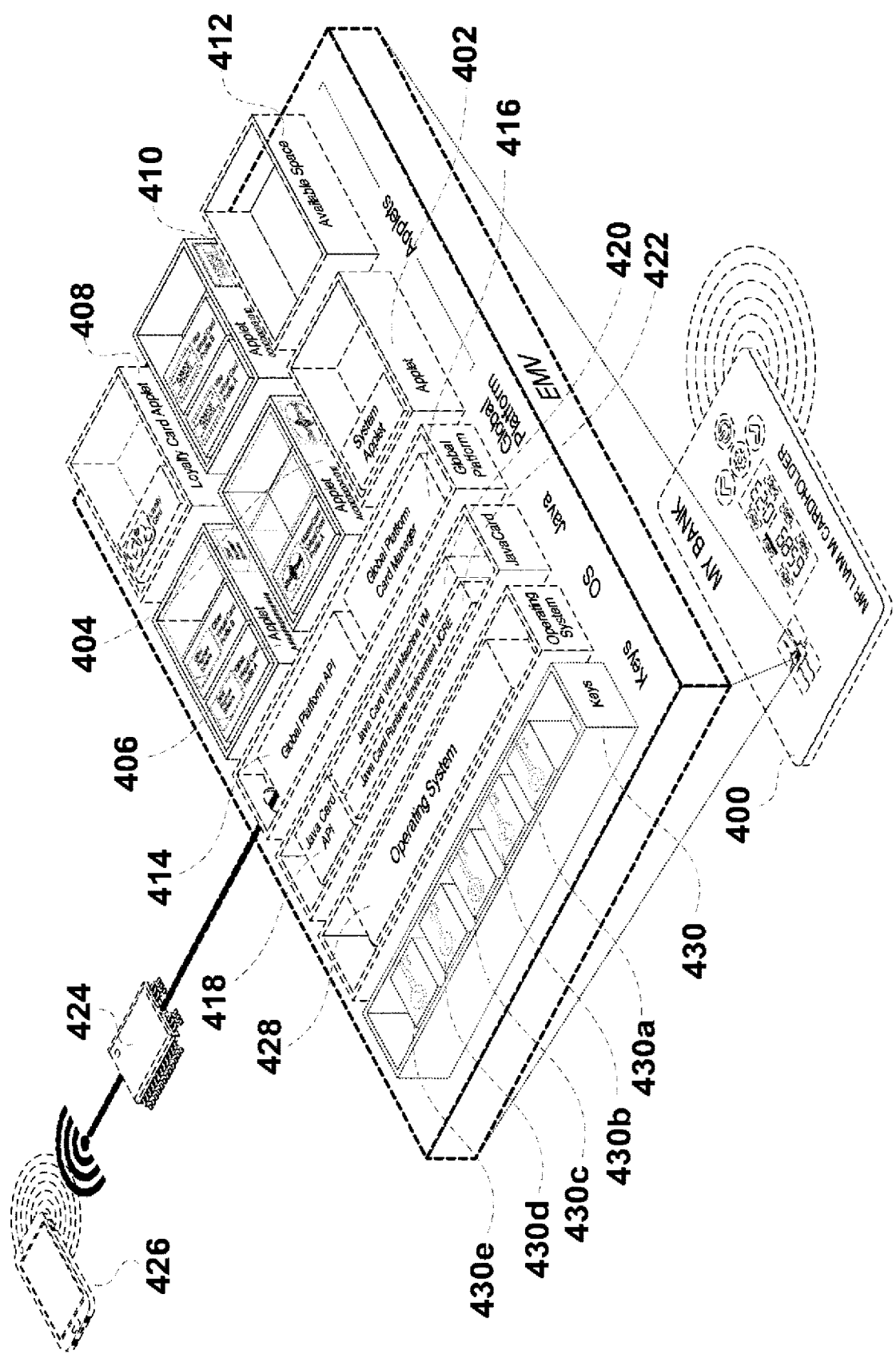
FIG. 4B is a diagrammatic representation of the elements in a software enhanced DTPU according to an embodiment of the invention involving multi-personality applets.

Also depicted in FIGS. 4A and 4B, is a Global Platform API (414) and a Global Platform Card Manager (416). The Global Platform Standard (GPS) is a standard that enables an open and interoperable infrastructure for smart cards, devices and systems that simplifies development, deployment and management of computer instruction code and the functionality provided by same. The GPS specification has been adopted by most banking institutions for loading of cryptographic data onto smart cards. The standard establishes mechanisms and policies that enable secure channel communication with credentials. Further, the specification represents a standard for managing the infrastructure of a smart card. Management, in this regard, includes installation, removal of applications and additional management tasks to be effected for a card. The primary authority for management of card data is the card issuer who generally has full control of the card contents but may grant other institutions access to administer their own software applications. Management is generally achieved by applying cryptographic protocols which authenticate and encipher the relevant processes.

The Global Platform API (414) provides an interface to the functionality provided by the Global Platform Standard and in the embodiment depicted in FIGS. 4A and 4B, the Global Platform API is used to load, configure and select different card personalities for the DTC (400) to effect digital transactions in accordance with that particular selected personality. The Global Platform API (414) is defined as part of the Global Platform Card specification. The Global Platform Card Manager (416) is the central controlling entity in the DTC (400). It includes three separate entities, namely, the Global Platform environment, the issuer's security domain and the card holder verification method services.

The DTC (400) also includes a DTC external processor (424) which effects functions on the DTC (400). In particular, the DTC external processor (424) depicted as a microcontroller unit (MCU), which communicates with the EMV device and this communication arrangement enables the DTC external processor (424), in accordance with commands received by the DAD (426), to update the digital transaction document personalities and the applications residing within the EMV device.

The EMV device operating system (428) is hardware specific firmware that provides the basic functionality for the EMV device such as secure access to on-card memory storage, authentication and encryption. The operating system (428) includes a sequence of instruction code that resides in non-volatile memory in the EMV device.

With reference to FIGS. 4A and 4B, a DTC (400) is depicted according to two embodiments and the individual components of the EMV device within the DTC (400) have been expanded and appear above the DTC (400).

The EMV device of the DTC (400) in FIG. 4A includes a single-personality applet (401) whilst the EMV device of the DTC (400) in FIG. 4B includes a number of applets (402, 404, 406, 408, 410 and 412).

In the example of FIG. 4A, the applet (401) contains data and/or instructions defining a single digital transaction document (personality) and is an applet that has been received and installed by the EMV device. A plurality of single-personality applets may be stored either in a personality section (secure holding position) on the EMV device that may be created at the time of initialisation of the EMV device, or in a secure location of an external processor (424) associated with the DTC (400) which is depicted in some Figures as a microcontroller unit (MCU). In the example depicted in FIG. 4A, the single-personality applet (401) that has been selected and installed onto the EMV device defines a Visa Card personality (401). By ensuring that there is only one stored applet on the EMV device, only one personality is available to be adopted by the DTC (400) and read by a digital network transaction device. Accordingly, by assuming that applets safely define a single personality, there is no requirement to accommodate a plurality of concurrently stored applets on the EMV device.

When multiple single-personality applets are stored in the MCU, Global Platform Standard (GPS) command(s) are sent to the EMV device, for example from a DAD (426) or the MCU, to install the relevant single-personality applet (401) onto the EMV device along with the appropriate command(s) to overwrite any previously installed applet thus changing the personality of the DTC to the personality associated with the applet (401). In this embodiment, the applet could be stored in the MCU secure memory, i.e. secured by hardware (secure element) or secured by software (encryption). The EMV contact plate (not shown in FIG. 4) shall also be secured during any transaction between the EMV device and the MCU to ensure third parties are unable to "listen in" (man in the middle attacks) or inject commands.

When the multiple single-personality applets are stored in a personality section of the EMV device, GPS command(s) are sent to the EMV device, for example from a DAD (426) or the MCU, to transfer the relevant single-personality applet (401) from the secure element of the EMV device and install same thus effecting change to the personality of the DTC to the personality associated with the installed applet (401). In yet another embodiment, the multiple single-personality applets are stored in a DAD (426) and individual applets along with commands are transferred to the MCU (424) of the DTC for subsequent transmission to the EMV device.

The commands sent from the DTC external processor to the EMV device may be a set of commands that obscure the GPS commands such as "make card 2 primary", whereby the external DTC processor sends "make card 2 primary" to the EMV device, and the EMV device executes the command by decoding the command and obtaining the GPS commands that will have the effect of making the DTC adopt the personality of card 2.

Each single-personality applet (401) that is stored for subsequent selection and transfer to the EMV device has an associated encryption key (413) used to decrypt the contents of the applet defining the individual personality thus allowing access and/or amendment to parameters pertaining to the individual personality. The function of keys is described in more detail below with respect to the embodiment of FIG. 4B.

In the embodiment of FIG. 4A, in order to change the DTC personality, the Applet that contains the personality in the EMV device may be replaced with a newly selected Applet for installation (overwriting the existing Applet). Alternatively, the Applet that contains the active personality may be deleted and a newly selected Applet installed on the EMV device such that the personality contained in the newly selected Applet will become the personality of the DTC.

If there is a preference to concurrently store applets containing one or more personalities in the EMV device, a single applet of the plurality of applets will need to be activated, or made primary, in order to ensure that only one particular personality defined by an applet is read by a network digital transaction device. The reader will appreciate that FIG. 4B depicts an EMV device that concurrently stores a plurality of multiple-personality applets (404, 406, 408, 410 and 412) in the EMV device of FIG. 4B.

In the example of FIG. 4B, the applets (404, 406, 408, 410 and 412) may contain data defining one or more digital transaction documents, for example, as depicted in FIG. 4B, there is an applet defining a MasterCard account (404), an applet defining two "other card personalities" (406), an applet defining a loyalty card personality (408), an applet defining two separate Visa card personalities (410) and available space for a further applet that may define one or more additional personalities (412). The applet (402) is a system applet which is installed prior to issuance of the DTC. In the embodiment of FIG. 4B, the system applet is a modified Payment Proximity System Environment (PPSE) applet which is installed prior to issuance of the EMV device by an authorised issuing entity. The PPSE applet determines the system environment that the EMV device operates within and an enhanced version of the PPSE applet is installed at the time of issuance of the DTC that allows the EMV device to store more than one personality at a time.

All of the applets (402, 404, 406, 408 and 410) reside within the secure memory of the EMV device of the DTC (400) and in the embodiment depicted in FIG. 4B, the applets are implemented with Java code and contain the necessary data and/or Java code instructions to define the one or more personalities for a particular payment Card Association Scheme.

In the embodiment of FIG. 4B, because the applets containing multiple personalities are stored concurrently on the EMV device, the EMV device of the DTC (400) also contains a "secure vault" (430) of cryptographic keys wherein each key is specific to each applet. The keys (430a to 430e) are used to decrypt the contents of individual personalities within an applet to access and/or amend parameters pertaining to the individual personality. The installation and storage of multiple applets simultaneously on an EMV device causes the potential for a digital transaction device to adopt a personality other than the intended personality of the DTC at any one time. Accordingly, in an embodiment, operational parameters of the multiple personalities are accessed and amended to ensure that only a single personality can be recognised by transaction devices. Once the data pertaining to an individual personality stored in an applet is decrypted, it is possible to amend parameters such as the order of the personality within the EMV device, whether the personality is active or inactive, whether the personality is primary or secondary, or any of the operational parameters that affect the processing of a digital transaction such as expiry date, CVV, CVV2 and/or the PAN of the personality. The actions available once a personality is decrypted with its associated key (430a to 430e), comprise full administration rights to effect a change to any operational parameter.

In an embodiment, two or more sets of keys may be jointly issued to the DTC for each personality, including for example a first set of keys (430a to 430e) as shown in FIG. 4, for which full administration rights are available, and a second (or subset) of keys (not shown) for which limited administration rights are available. In an embodiment, the limited administration rights available in respect of the second set (or subset) of keys only allow amendment to the status of the personality and amendment of a restricted set of operational parameters that are used during a digital transaction. The status of a personality includes the order of the personality within the EMV device, whether the personality is active or inactive, whether the personality is primary or secondary or any other parameter that is not used during a transaction.

The second set of limited administration keys (not shown) may be stored in the microcontroller unit (MCU) shown in FIGS. 5A, 5B, 6A, 6B, 6C and 8A to 8F and described further below, or stored within the EMV device, such as in one or more of the available spaces for an applet (412) depicted in FIG. 4B. An applet which stores the second set of keys is referred to herein as a Key Management Applet, and such an applet may be installed at the time of initialization of the Digital Transaction Card (DTC). It is possible to store the limited administration keys within another device such as the DAD, however, any transfer of the limited administration keys to the EMV device would necessarily require the transmission to be within a secure session.

With reference to FIGS. 8A to 8F, if keys are stored in the MCU (802), a contact plate associated with the EMV device, such as the external contact plate (804), and described further below, must be isolated so that no-one can "listen in" (man in the middle attacks) when commands are sent from the MCU (802) to the EMV device to monitor the communications, or to inject commands to alter the intended purpose of the transmitted commands.

Referring again to FIG. 4B, if the subset of limited administration keys are stored within the EMV device, such as a Key Management Applet in available space (412), the MCU to EMV security requirements may be reduced since commands from the MCU to the EMV device are protected by the encapsulation of the DTC and as such, may be encoded (for example, make card 3 primary), and any Global platform commands used to effect a new personality remain internal within the EMV device. For example, if the MCU (424) contains a known numbering of personalities and sends a command "make card 3 primary", the EMV device can issue commands internally to effect the required action, including Global Platform commands, to (1) make all cards inactive, (2) change the order of cards to make card 3 primary, and/or (3) make card 3 active. For example, if there are six possible personalities stored within the EMV device, six sets of commands may be issued to the relevant applet(s) that store data defining the personalities to deactivate and activate personalities as required.

In an embodiment where the MCU to EMV link is secure, encrypted commands are issued from the MCU to the EMV device but continue to invoke multiple Global Platform commands within the EMV device once the command from the MCU is decrypted by the EMV device. This arrangement reduces the quantity and complexity of encrypting and decrypting tasks to effect functions, which in turn, also reduces the overall power usage of the DTC and the time required to effect an action such as a request to change the personality of the DTC.

In this regard, the MCU sends formatted messages to the System I/O of the EMV device and the Operating System and Java Runtime Environment direct the message to the appropriate applet. In this embodiment, the MCU emulates an EFTPOS and/or ATM network transaction terminal internally on the DTC to effect communications confirming with commands recognised by the EMC device. Whilst the EMV device will receive and execute recognised GPS commands, there is no single command that will ensure that the correct personality is recognised by all network transaction devices. In this regard, network terminals software can interpret the personality stored on a physical card containing multiple personalities in different ways and may not always adopt the personality marked with the "primary" status. Accordingly, to ensure that a terminal properly interprets and adopts only one of a number of personalities stored in the EMV device, only the desired personality should be marked as active and primary, all other personalities should have a status of "inactive". Therefore, according to this embodiment, a number of GPS commands that are usually only used by an entity authorised to issue cards are issued to the EMV device to amend the status of each and every personality stored on the EMV device to ensure that the user selected personality is recognised by any network terminal device in which the DTC may be used to effect a transaction.

Figure 5A:
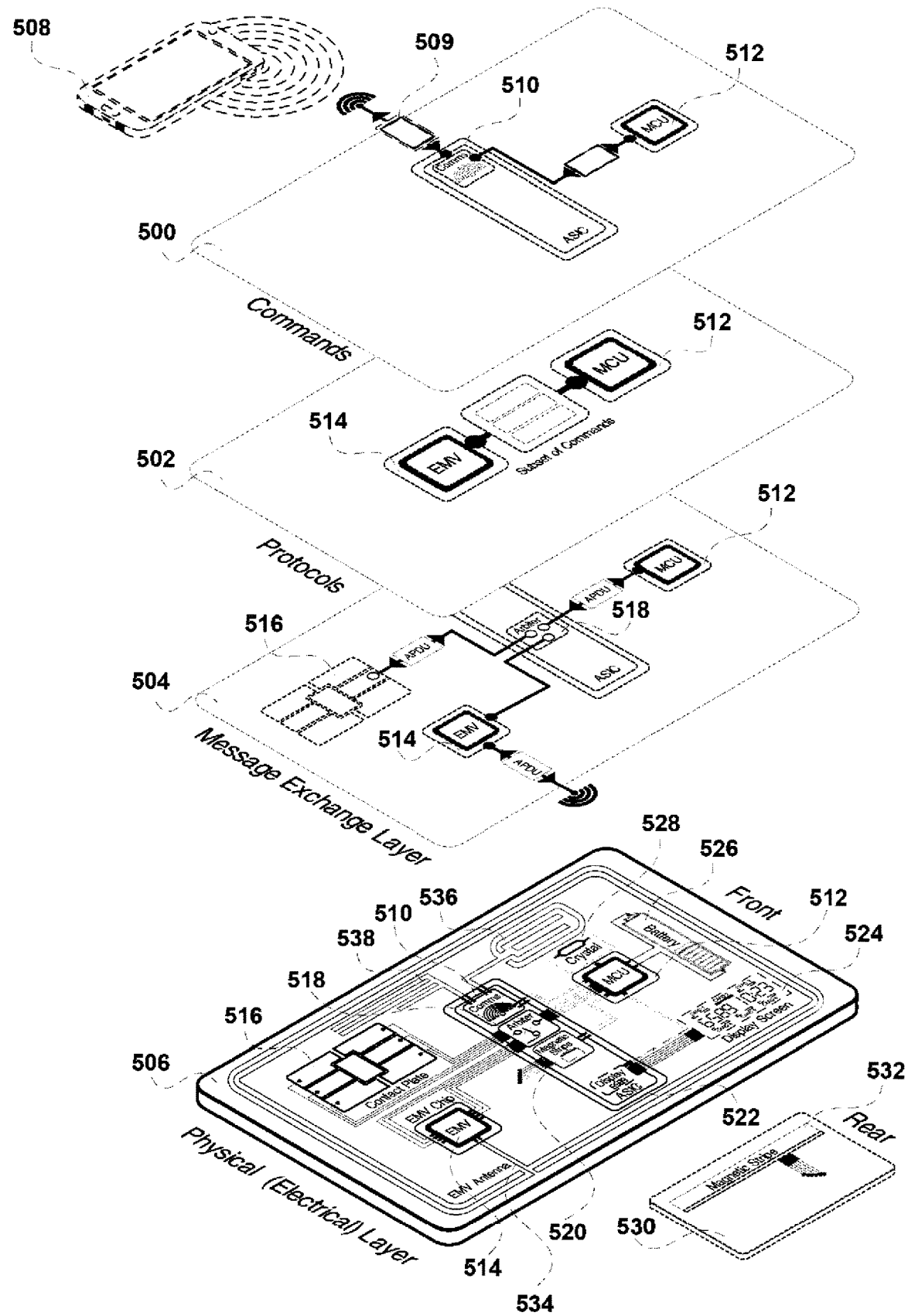
FIG. 5A is an abstract diagrammatic representation of a digital transaction card (DTC) according to an embodiment of the invention in which the DTC has been separated into four abstract layers for the purpose of explaining the functionality that occurs in each of the four defined abstract layers when receiving commands from a DAD to effect changes to the DTC personality.

FIG. 5A depicts a DTC subdivided into four separate layers, namely, commands (500), protocols (502), a Message Exchange Layer (504) and a physical (electrical) layer (506).

A mobile device (508) is also illustrated in FIG. 5A that communicates data and commands to the DTC via a wireless protocol such as NFC or Bluetooth where those commands and data are received by a transceiver (509). The transceiver (509) converts wireless signals transmitted from the mobile device (508) to signals for reception by a communications module (510) embodied within an Application Specific Integrated Circuit (ASIC). The communications module (510) subsequently transfers commands and data decoded from the transmission of the mobile device (508) to the MCU (512) and interprets those commands and data. In an embodiment, the proprietary commands transmitted from the mobile device (508) to the DTC by way of the transceiver (509) and ultimately passed through to the MCU (512), are encrypted to protect the data and security of the DTC.

According to the protocol layer (502), the MCU (512) communicates according to established protocols with the EMV device (514). In the embodiment of FIG. 5A, the MCU (512) uses a subset of the Global Platform Standard commands that are usually only used by authorised entities who issue credit cards with EMV devices. The subset of commands is issued to the EMV device (514) as required according to the function requested by the mobile device (508). Application Protocol Data Units (APDUs) are used to communicate with the EMV device (514) and the APDUs are also defined in the Global Platform Standard. In order to effect a change of card personality of the DTC, the MCU (512) communicates with the EMV device (514) using the subset Global Platform Standard.

With reference to the message exchange layer (504), this layer communicates messages between either a merchant terminal and the EMV device (514) or the MCU (512) and the EMV device (514). The messages for this communication are APDUs. There are two primary categories for APDUs, namely, command APDUs and response APDUs. Effectively, APDU commands are the messaging protocol for communicating with an EMV device (514). The message exchange layer (504) also depicts the external contacts (516) of an EMV device (514). Further, the message exchange layer (504) also depicts an arbitration device (518) which arbitrates communication between the MCU (195) and the EMV device (514) or alternatively, communication that may occur between the EMV contacts (516) and the EMV device (514). As will be appreciated by skilled readers, communication between the EMV device contacts (516) and the EMV device (514) will occur when the DTC is used in a merchant terminal a "dipping mode" wherein the DTC is inserted into the merchant terminal and contacts within the merchant terminal directly engage with the EMV contacts (516). In this instance, communication between the EMV contacts (516) and the EMV device (514) must be effected without any interference in the communication attempted by another device such as the MCU (512). However, in instances where communication between the MCU (512) and the EMV device (514) is required, the arbitration device (518) effectively disconnects the communication path between the EMV contacts (516) and the EMV device (514) such that communication may be effected between the MCU (512) and the EMV device (514) without interference from any device making contact with the EMV contacts (516). As depicted in FIG. 5A, communication between the MCU (512) and the EMV contacts (516) and the EMV device (514) is effected by APDUs in the embodiment of FIG. 5A. An APDU contains a mandatory four byte header defining the command and from zero to sixty four kb of data. A response APDU may be sent by the EMV device (514) back to a merchant terminal or the MCU (512) and contains from zero to 64 kilobytes of data and two mandatory status bytes.

With reference to the physical (electrical) layer (506), various additional components of the DTC are depicted including a dynamic magnetic stripe module (520), a display driver (522) and a corresponding display screen (524), a battery (526) and a crystal (528) that provides an oscillator that is used to determine the clock signal for all of the electronic devices on the DTC.

Also depicted in FIG. 5A is a diagrammatic representation of the rear side of a DTC (530) including a dynamic magnetic stripe (532).

Additional elements are also depicted in the physical (electrical) layer (506) including an EMV device antenna (534), an NFC antenna (536) connected to the communications module (510) and a Bluetooth antenna (538) also connected to the communication module (510).

Figure 5B:
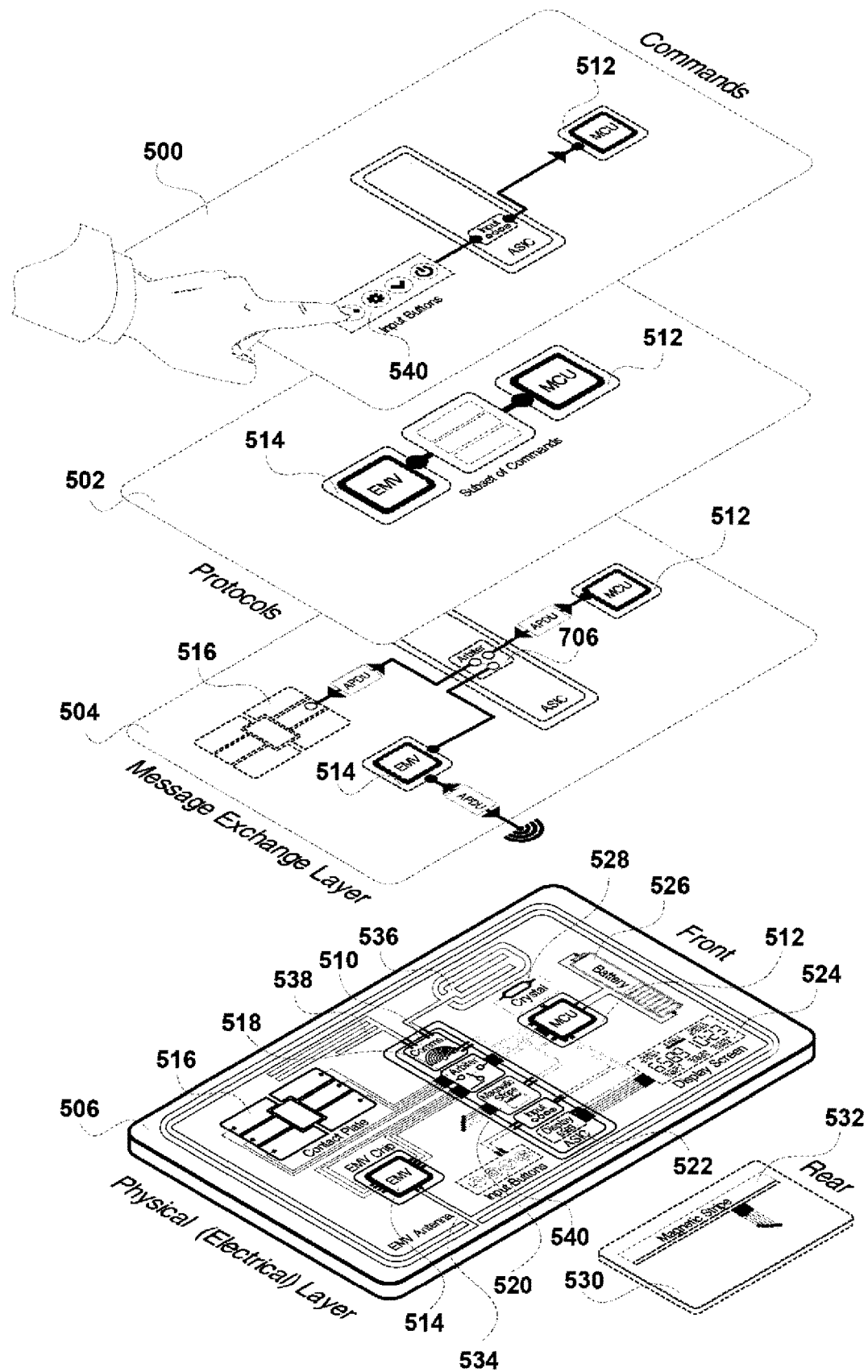
FIG. 5B is an abstract diagrammatic representation of a digital transaction card (DTC) according to an embodiment of the invention in which the DTC has been separated into four abstract layers for the purpose of explaining the functionality that occurs in each of the four defined abstract layers when receiving commands from a DAD to effect changes to the DTC personality.

With reference to FIG. 5B, the same abstract layers as depicted in FIG. 5A are illustrated in FIG. 5B although the embodiment illustrated in FIG. 5B is an embodiment including DTC scroll/enter keys (540) that a user operates to effect functions including changes to the DTC personality. In a preferred embodiment, the DTC scroll/enter keys (540) includes touch sensitive buttons that may be activated by simply touching a button or pad on the DTC and may be used to scroll through various options including available DTC personalities, and may also be used to power the DTC on or off.

Figure 5C:
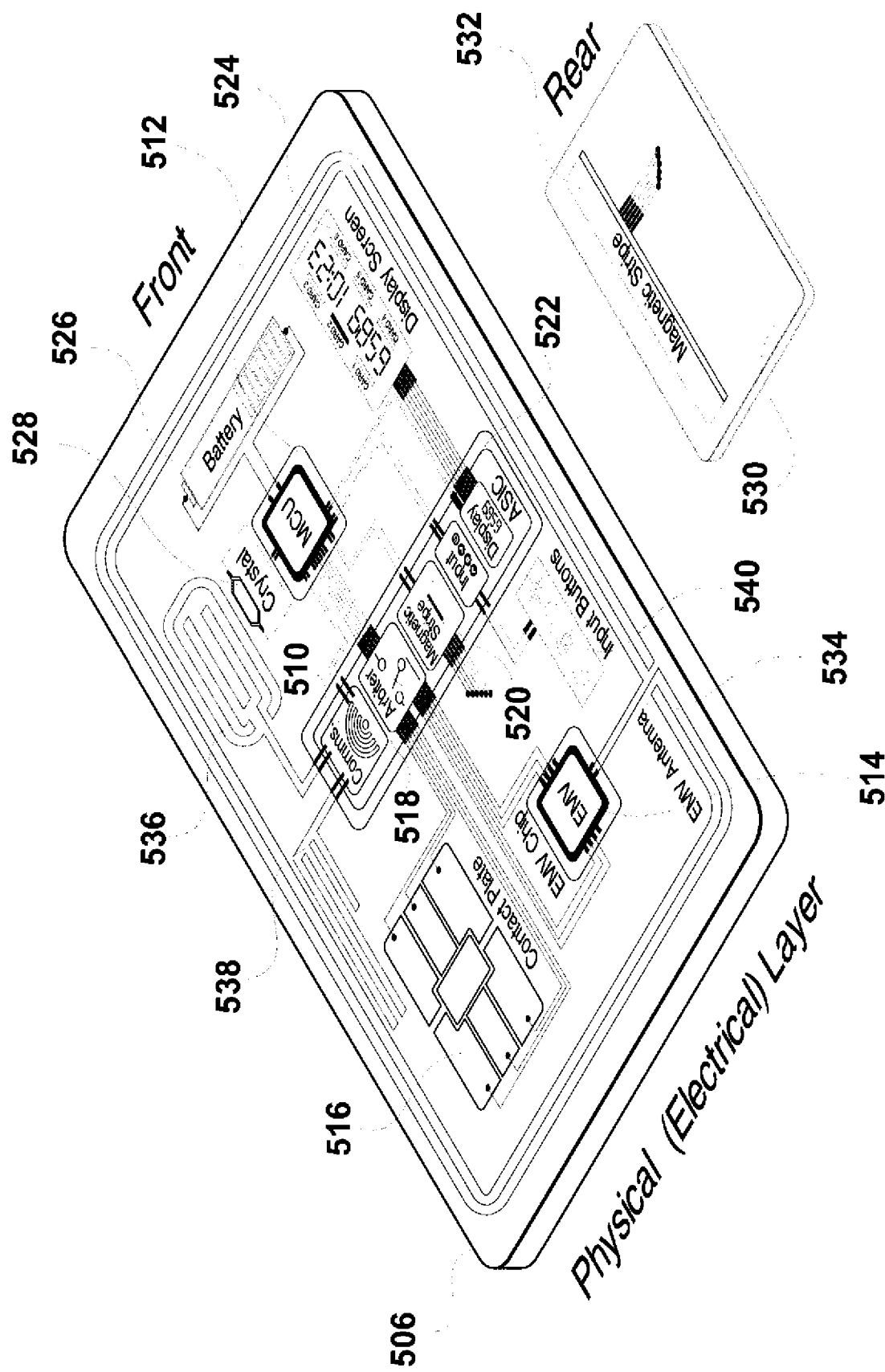
FIG. 5C is an expanded representation of the Physical (Electrical) Layer of FIGS. 5A and 5B.

With reference to FIG. 5C, an enlarged version of the Physical (Electrical) Layer (506) of FIGS. 5A and 5B is detailed for the purpose of more clearly illustrating the individual elements of the Physical (Electrical) Layer.

Figure 6A:
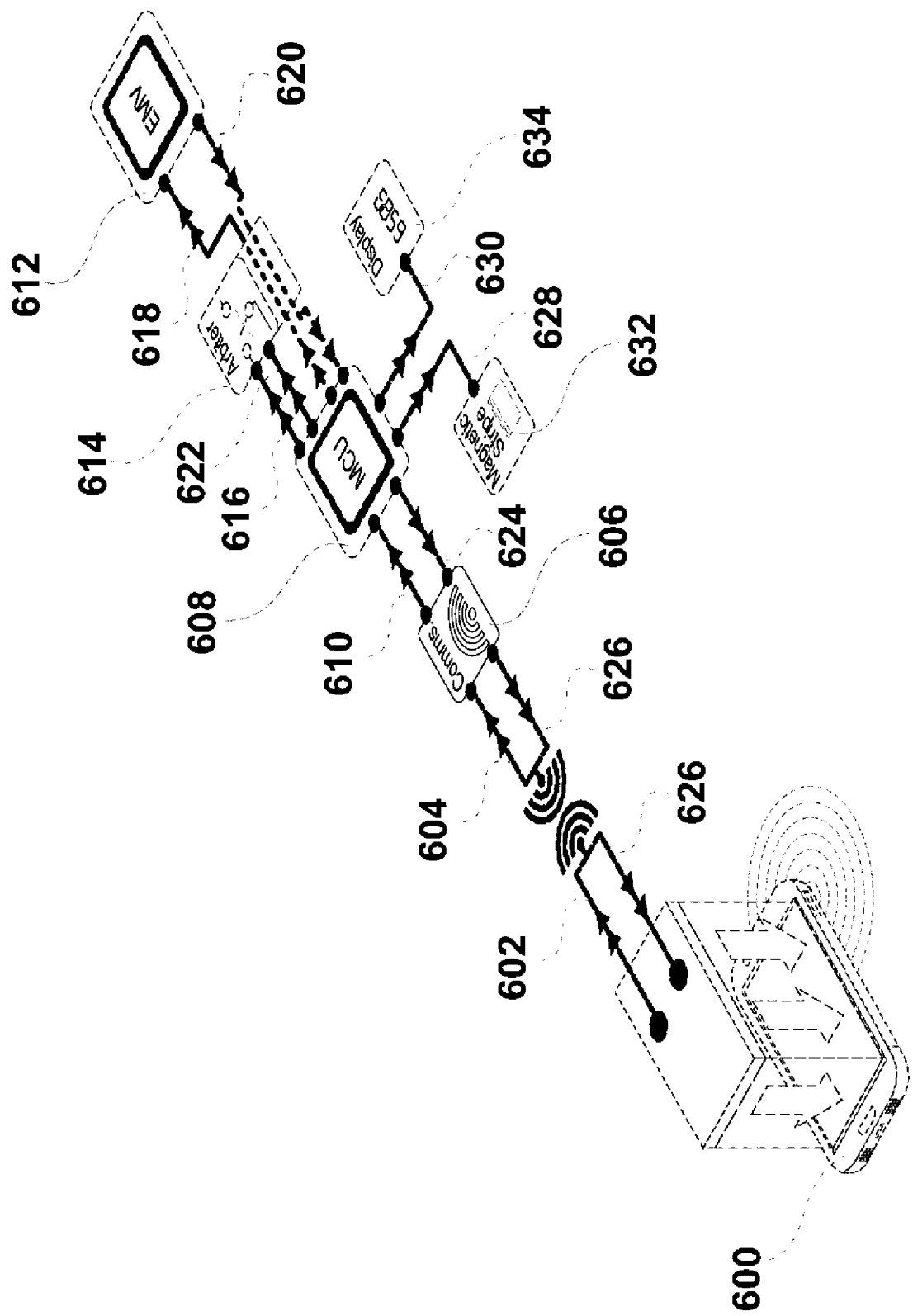
FIG. 6A provides a diagrammatic representation of data flows between individual elements of a Digital Transaction Card (DTC) according to an embodiment of the invention when effecting a DTC personality change from a DAD; the Figures collectively providing diagrammatic support for an explanation of an exemplary data flow and interactions between individual elements on the Physical (Electrical) Layer of a DTC according to an embodiment of the invention.

FIG. 6A details the data flow between devices as a result of the issuance of a command from a user's mobile device and receipt of data from the DTC to the users mobile device. In particular, FIG. 6A provides a diagrammatic representation of a DTC according to an embodiment of the invention and is effectively a repetition of the diagrammatic representation of FIG. 5C with the addition of a mobile device (600). Overlaid on the diagrammatic representation is a series of arrowed line segments depicting the flow of data as it occurs to, and from, the mobile device (600) and individual elements contained within the DTC as depicted in FIG. 5C.

With reference to FIG. 6A, in the instance of a user issuing a command from their mobile device (600) to the DTC, the command and/or data associated with same, is communicated along data flow 602 and in the example depicted in FIG. 6A, is communicated wirelessly to the DTC either by NFC or Bluetooth wireless capability. The DTC receives the command issued by the mobile device (600) and indicated by the data flow (602) and receives the command and/or data as depicted by data flow (604) at the communications module (606). The communications module (606) having converted the command and/or data received (604), passes a signal to the MCU (608) along data flow path 610 for processing by the MCU (608).

In the event that the data received by the MCU (608) depicted by data flow (610) represents a command requiring the MCU (608) to communicate with the EMV device (612), then the MCU (608) transmits a signal to the arbitration device (614) depicted by data flow (616) to activate the arbitration device (614) to isolate the normal connection between the EMV device contacts and the EMV device (612). Further, in addition to isolating the normal communication between the EMV device contacts and the EMV device (612), the arbitration device (614) activates connection between the MCU (608) and the EMV device (612).

Once the arbitration device (614) has been activated to enable communication between the MCU (608) and the EMV device (612), the MCU (608) transfers data as depicted by data flow (618) to the EMV device (612). In the instance of the command issued by the mobile device (600) to effect a change in personality of the DTC, the EMV device (612) upon receiving and altering the EMV device (612) personality, in accordance with data provided as depicted by data flow (618), the EMV device (612) provides a return signal as depicted by data flow (620) to the MCU (608) confirming that the change in personality of the EMV device (612) has been effected. Once required communication between the EMV device (612) and the MCU (608) has been completed, the arbitration device (614) may restore communication between the EMV device (612) and the EMV device contacts.

At this point in time, the MCU (608) transmits a further signal to the arbitration device (614) to restore the normal communication between the EMV device contacts and the EMV device (612) and at the same time isolating the communication path between the MCU (608) and the EMV device (612). This signal is depicted in FIG. 6A as the data flow (622).

At this stage, the MCU (608) generates and transmits a signal to the communications module (606) as depicted by data flow (624), said signal being a signal confirming the alteration of the EMV device (612) personality according to the instruction initiated at the user's mobile device (600). The communications module (606) upon receiving the signal (624) converts the signal for wireless transmission to the mobile device (600), the wireless signal depicted as data flow (626).

The user's mobile device (600) receives the wirelessly transmitted signal (626) and upon conversion of that wireless signal, the user's mobile device (600) internally processes the signal (626) and provides a visual indication to the user on the user interface of the mobile device (600) confirming the requested change in personality of the EMV device (612) and that the DTC will now operate according to the personality of the card requested by the user. FIG. 6A further depicts data flow (628) and (630) from the MCU (608) to each of the dynamic magnetic stripe (632) and display (634) respectively for the purpose of conforming the parameters of the dynamic magnetic stripe with those that define the user selected personality and to display information relevant to the selected personality such as, for example, a default name for the selected personality (e.g. VISA, MasterCard, AMEX etc.) or a user defined name for the selected personality (e.g. Personal Account card, Business Account Card etc.).

Figure 6B:
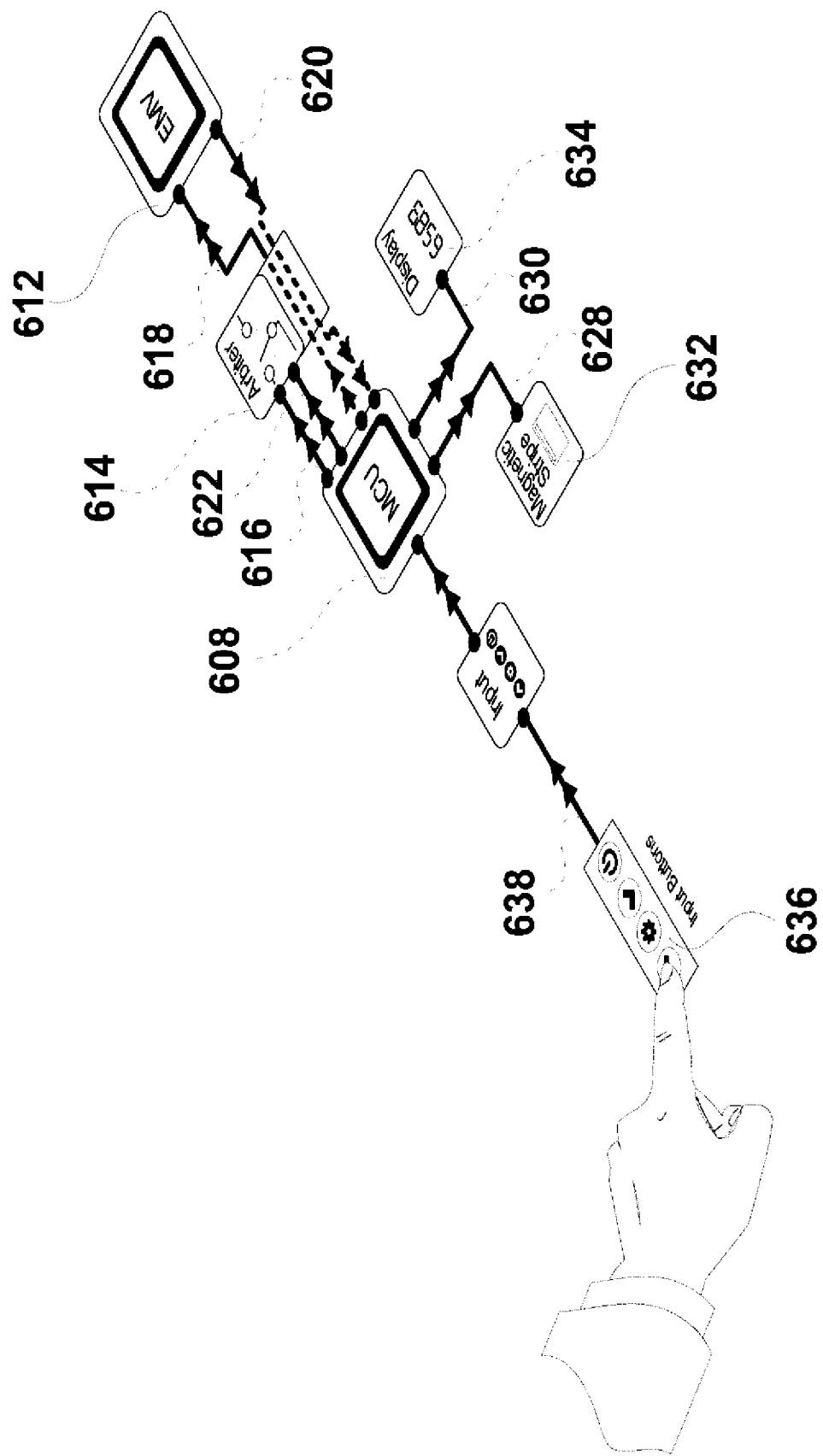
FIG. 6B provides a diagrammatic representation of data flows between individual elements of a Digital Transaction Card (DTC) according to an embodiment of the invention when effecting a DTC personality change by use of the DTC interface, the Figures collectively providing diagrammatic support for an explanation of an exemplary data flow and interactions between individual elements on the Physical (Electrical) Layer of a DTC according to an embodiment of the invention.

With reference to FIG. 6B, a data flow is illustrated as for FIG. 6A although, in the embodiment depicted in FIG. 6B, the request to select a particular DTC personality is effected by operation of the DTC scroll/enter keys (636), the signal from the scroll/enter keys (636) to the MCU (608) depicted as data flow (638). Of course, as will be recognised by skilled readers, a particular advantage of the embodiment depicted in FIG. 6B, wherein the DTC comprises DTC scroll/enter keys (636) to effect a change in DTC personality, it is not necessary to have a smart phone (600) in close proximity nor wireless communication capabilities such as NFC or Bluetooth on either the smart phone (600) or the DTC.

Figure 7:
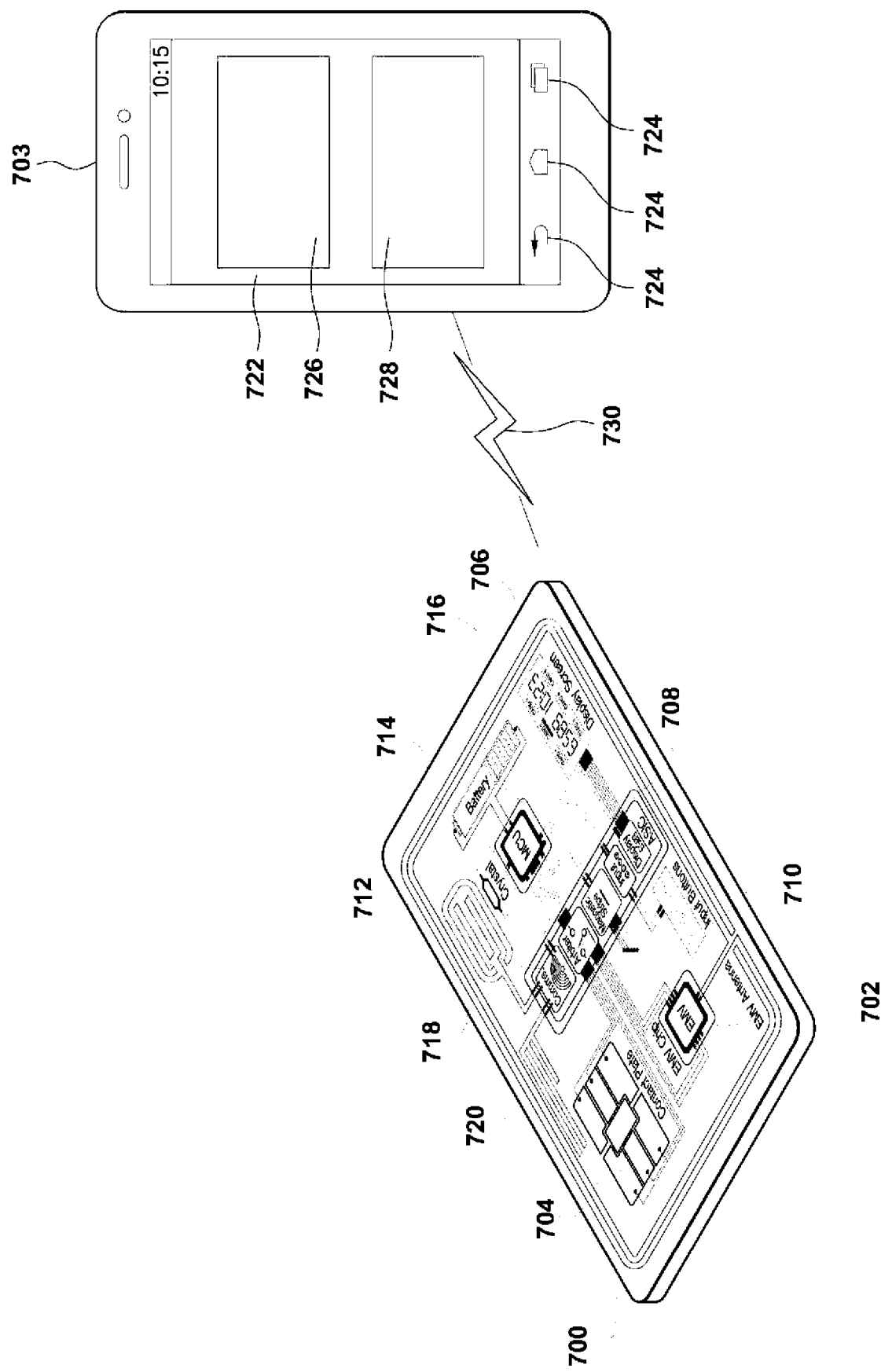
FIG. 7 is a diagrammatic representation of a Data Assistance Device (DAD), in this embodiment a smartphone, wherein the DAD is linked with a DTC.

FIG. 7 illustrates an example embodiment of a Digital Transaction Card (DTC) (700) including a DTPU in the form of an EMV device (702) complying with one or more EMVCo specifications, the EMV or EMVCo specified device constructed so as to allow for some functions to be externally (or remotely) controlled by a Data Assistance Device (DAD) (703) during emulation. The DTC (700) also includes EMV contacts (704) on the surface of the DTC for contact with a digital transaction device, such as a EFTPOS or POS terminal, which allows for insertion of the DTC (700) into a slot presently used for digital transaction documents such as credit cards and debit cards.

The DTC (700) may also include a user interface in the form of a display screen (706) controlled by a corresponding display driver (708), and scroll/enter keys (710). The display (706) may display simple alphanumeric information, such as card numbers (or unique IDs for other types of digital transaction documents), error messages and the like. The display (706) could also be an electronic paper display, for example, an E-Ink display, as such displays do not require power to retain a display of information.

The DTC (700) further includes a communication module including a communication antenna (712). The communication module and communication antenna (712) are used for communications with the DAD (703) during a linking process, and for communicating with the DAD (703) while linked so that the DAD can externally control applications and/or programs running on the DTC (700) during emulation. It will be appreciated by a skilled person that the communications means and communications protocols for linking between the DTC (700) and the DAD (703) may be the same as those used for emulation control of the DTC (700) by the DAD (703) via the applications and/or programs running on the DTC. In other embodiments, it is possible that the communication means and protocol for linking the DTC (700) with the DAD (703) may be different from the communication means and protocols used for control of the DTC applications and/or programs by the DAD (703) during emulation.

The DTC (700) also includes a battery (714) which is used for powering the operations of an external processor (716), which in the embodiment shown is an MCU, and other components on the DTC such as the communications module and antenna (712), the display (706), and the display driver (708). In some embodiments, rather than having a battery, it is possible to have a capacitor or some other energy storage device. In yet other embodiments, the power supply could be provided by a combination of a battery and a capacitor, and could be a re-chargeable battery.

The DTC external processor (e.g. MCU) (716) operates with firmware which may be stored in a separate memory and accessed by the MCU (716) when the DTC (700) is operated. The firmware may be the same firmware that operates on the EMV device (702), or could be a different firmware with at least some compatibility.

The firmware on the DTC (700) controls operation of various components such as the communication module (712), the display driver (708), and may also control various functions of the EMV device (702).

The DTC (700) also includes an NFC antenna (718) connected to the communications module (712) and a Bluetooth antenna (720) also connected to the communication module (712), used for contactless or swiping card transactions, such as Tap and Go, Pay Pass and other similar transactions using transaction cards and terminals where the card does not need to be inserted into a slot in the terminal. In other embodiments, the DAD (e.g. smartphone) may be provided with a communication means such as Near Field Communication (NFC) or Bluetooth. If so, then it would be possible to communicate between the DAD and DTC using the NFC antenna (718) and the Bluetooth antenna (720).

However, it will be appreciated by the skilled person that if the DAD (e.g. smartphone) is not so equipped, then, instead of an NFC and/or Bluetooth antenna, a two-way communication device may be required in the DTC. In this regard, the communication module may also be suitable for two-way communication, rather than being a "passive" device.

The scroll/enter keys (710) may be used to switch on and switch off the DTC (700), respectively, before and after a digital transaction. In some embodiments, the scroll/enter keys (710) may also be a control for activating the DTC (700), so as to enable the EMV device (702) to read data from a secure element or secure record memory such that the EMV device (702), and therefore the DTC (700), exhibit the personality of a selected digital transaction document.

The DTC (700) may also include one or more programs or applications, which could be stored in DTC memory along with the aforementioned firmware. The applications and/or programs can be controlled by the DAD (703), which when linked with the DTC (700), externally controls the applications and/or programs to operate on the DTC (700). The application and/or programs running on the DTC (700) and controlled by the DAD (703) can be used for operating, for example, digital transactions with a digital transaction device, such as an EFTPOS terminal, a POS terminal, or an ATM.

Additionally, the DTC external processor (e.g. MCU (716)) is connected via electrodes to the CPU associated with the EMV device (702), wherein those electrode connections mimic the electrode connections between the CPU associated with the EMV device (702) and the external (surface) electrodes (704) of the DTC (700). The mimicked connections enable emulation of one or more functions of a digital transaction device (e.g. POS or EFTPOS or ATM terminal) on the card, the emulation controlled and monitored using the DAD (703).

In the embodiment shown, the smartphone (703) includes a touch screen (722) which allows a user to operate functions on the smartphone (703) by swiping or tapping the screen (722). The smartphone (703) also includes buttons (724), which may be soft buttons displayed at the bottom of the screen (as exemplified in FIG. 7) and operated by tapping and/or swiping, or could be physical buttons operated by pressing.

The smartphone screen (722) may be divided into two areas and in this example, first area (726) displays information relevant to the control of the DTC (700) by the DAD (703) during emulation. The information shown in screen section (726) may include state information of the DTC, data on the DTC, transaction information from the DTC, and may include information regarding operation of one or more applications and/or programs running on the DTC (700) and controlled by the DAD (703).

A second screen area (728) may be used to display a soft keyboard or soft keypad for operation via the touch screen on the DAD (703), and for entering information and for controlling operation of the one or more programs and/or applications running on the DTC (700). In some embodiments, the screen area could display an image (or representative image) of the digital transaction device being used during the digital transaction. The image (or representative image) may be an active image, wherein keys depicted in the image can be operational via the touch screen, and wherein the operation of the keys is one example of emulation in accordance with the present invention. It will be appreciated that, in embodiments, it is possible to display one image selected from images of many different types of digital transaction devices during a transaction, such as POS or EFTPOS terminals, ATMs and other types of transaction devices. The keypad can be operated by a user to control the DTC, for example, to enable a digital transaction with such digital transaction devices. It is to be understood that the information described above as being displayed in a second screen area (728) could equally well be displayed in the first screen area and there is no requirement that there be more than one screen area.

The DTC (700) and DAD (703) are shown as being linked by the lightning bolt symbol (730). While linked, the DAD (703) is able to control operation of the DTC (700), via control of the applications and/or programs running on the DTC (700), but may also have control of other components or other operations of the DTC (700), apart from controlling the applications and/or programs.

The DAD (e.g. smartphone) (703) after securely connecting to the DTC (700) sends a code to the MCU (716) that activates a remote access connection which allows applications and/or programs to be run locally on the DTC (700), whilst graphical (keyboard and screen) information is displayed on the smartphone (703).

During this remote access connection, data from the connected smartphone (703) can be uploaded to the card (700) via one or more of the following exemplary methods:
key combination;
links within one of the applications and/or programs running on the DTC (700), controlled by the DAD (703); and
one of the applications and/or programs configures a link between a secure element (or storage area, for example, a Logical Digital Transaction Document Packet (LDTDP) storage area) on the smartphone (703) to the DTC secure element, and transfers data between the two locations—this method being a type of point-to-point secure connection between the two memory areas on the DAD (703) and the DTC (700).

In embodiments, the DTC external processor (e.g. MCU) is typically activated only after securely identifying itself to the linked smartphone. The external processor on the DTC controls the reading and re-reading of the DTPU, and updating of the DTPU to express new personalities of different transaction documents.

With reference to FIGS. 8A to 8F, various embodiments are described for effecting operable communication between an EMV device (800) and a MCU (802) and an EMV device (800). In particular, FIGS. 8A to 8F inclusive provide additional detail, as compared with previous figures, regarding the connections between an external contact plate (804) that is provided to effect communication between transaction devices (such as EPTPOS terminals and ATM machines) and the EMV device (800) and the connection(s) between the external contact plate (804) and the internal contact plate (806) that is presently included in most, if not all, digital transaction cards that include an EMV device.

In this regard, the provision of an external contact plate (804) and an internal contact plate (806) is an artefact of the manufacturing process for digital transaction cards that include an EMV device (800). In embodiments of the present invention that include both an external contact plate (804) and an internal contact plate (806), the opportunity exists to route electrical connections between the external contact plate (804) and the internal contact plate (806) in an arrangement other than a direct one to one connection between corresponding electrodes of the external contact plate (804) and the internal contact plate (806).

Figure 8A:
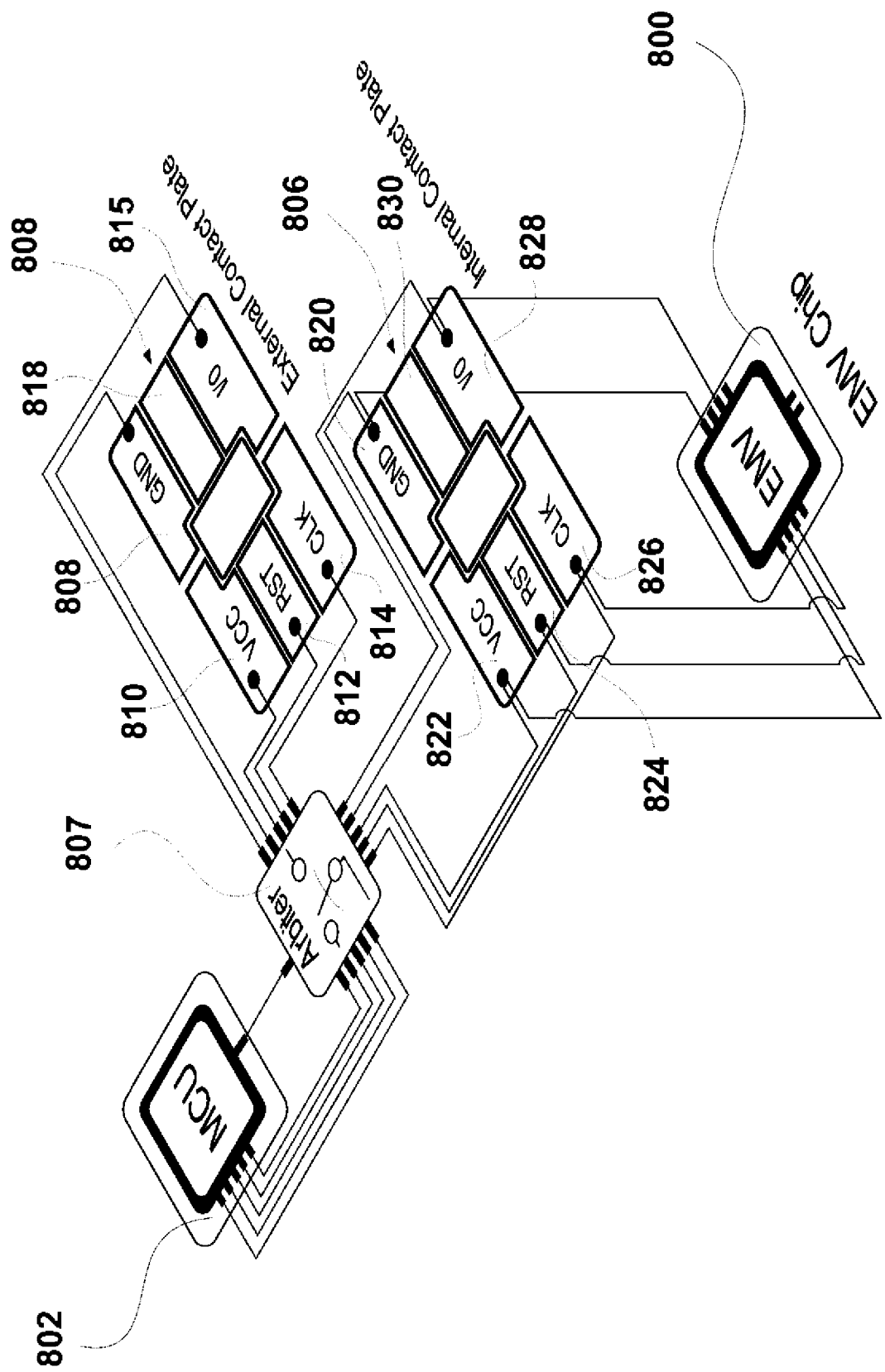
FIG. 8A is a diagrammatic representation of a configuration, according to one embodiment, for effecting communication between an MCU device and an EMV device where the communication lines between the EMV external contacts plate are switched.

With specific reference to FIG. 8A, an embodiment is diagrammatically depicted in which the electrical connections accessible to digital transaction devices by way of the external contact plate (804) are connected to an arbitration device (807) and depending upon the state of the arbitration device (807), individual electrodes of the external contact plate (804) may be electrically connected by the arbitration device (807) to their counterpart electrodes of the internal contact plate (806).

In order to provide a direct connection between counterpart electrodes of the external contact plates (804) and the internal contact plates (806), the arbitration device (807) operates to connect electrodes identified as GND (808), Vcc (810), RST (812), CLK (814), I/O (816) and the blank terminal (818) such that all are connected respectively to their counterpart connection of the internal contact plate (806) such that the aforementioned electrodes of the external contact plates (804) would be connected respectively to GND (820), Vcc (822), RST (824), CLK (826), I/O (828) and blank terminal (830).

Accordingly, when in an appropriate state, the arbitration device (807) would operate to connect the individual electrodes of the external contact plate (804) directly to their counterpart terminal of the internal contact plate (806) which in turn are connected to the appropriate connection points of the EMV device (800) to enable the EMV Device (800) to operate with digital transaction devices. In this configuration, the EMV device (800) would operate normally with digital transaction devices interfacing with individual electrodes of the external contact plate (804) and any electrical signals applied to any one of the external contact plate (804) electrodes, namely, GND (808), Vcc (810), RST (812), CLK (814), I/O (816) and blank terminal (818) would pass through the external contact plate (804) electrode through the arbitration device (807) and pass directly to the counterpart electrode of the internal contact plate (806) namely, GND (820), Vcc (822), RST (824), CLK (826), I/O (828) and blank terminal (830).

However, in instances where communication between an MCU (802) and the EMV device (800) is required, the arbitration device (807) adopts an alternative state and connects the data and control signal lines of the MCU (802) through the arbitration device (807) to the individual electrodes of the internal contact plate (806) which in turn are connected to the appropriate I/O and control lines of the EMV device (800). Accordingly, the arbitration device (807) in the embodiment graphically represented in FIG. 8A acts as a collection of single pole double throw switches to either connect the MCU (802) to the electrodes of the internal contact plate (806) and thus the relevant connections with the EMV device (800) or alternatively, when switched to its alternate mode, the arbitration device (807) disconnects any connection between the MCU (802) and the EMV device (800) and connects the external contact plate (804) electrodes to the counterpart electrodes of the internal contact plates (806) which in turn are connected to the appropriate connections of the EMV device (800).

Operationally, when implementing the embodiment depicted in FIG. 8A, any communication between the MCU (802) and the EMV device (800) would need to occur at a time that the user of the digital transaction card did not require, or attempt, a transaction with a digital transaction device such that signals were applied to the electrodes of the external contact plate (804). Of course, in the event that a digital transaction was either prevented, or terminated, as a result of the arbitration device (807) switching to an alternate state such that connection between the external contact plate (804) electrodes and the relevant connection points of the EMV device (800) were no longer present, the digital transaction would likely terminate and would fail to execute. Whilst such an outcome may be acceptable to a financial institution with which the user was attempting to conduct a digital transaction, it is unlikely that users would consider such an interruption acceptable and it is preferable that the arbitration device (807) were unable to interrupt communications with a digital transaction device that is communicating with the EMV device (800). Further, any potential interruption to data flow in the "transaction path" of devices can lead to a requirement for the device, or component, to require re-certification. As previously described, the process of re-certification of a component for operation in an electronic digital transaction network can be time consuming and expensive and is preferably avoided.

Figure 8B:
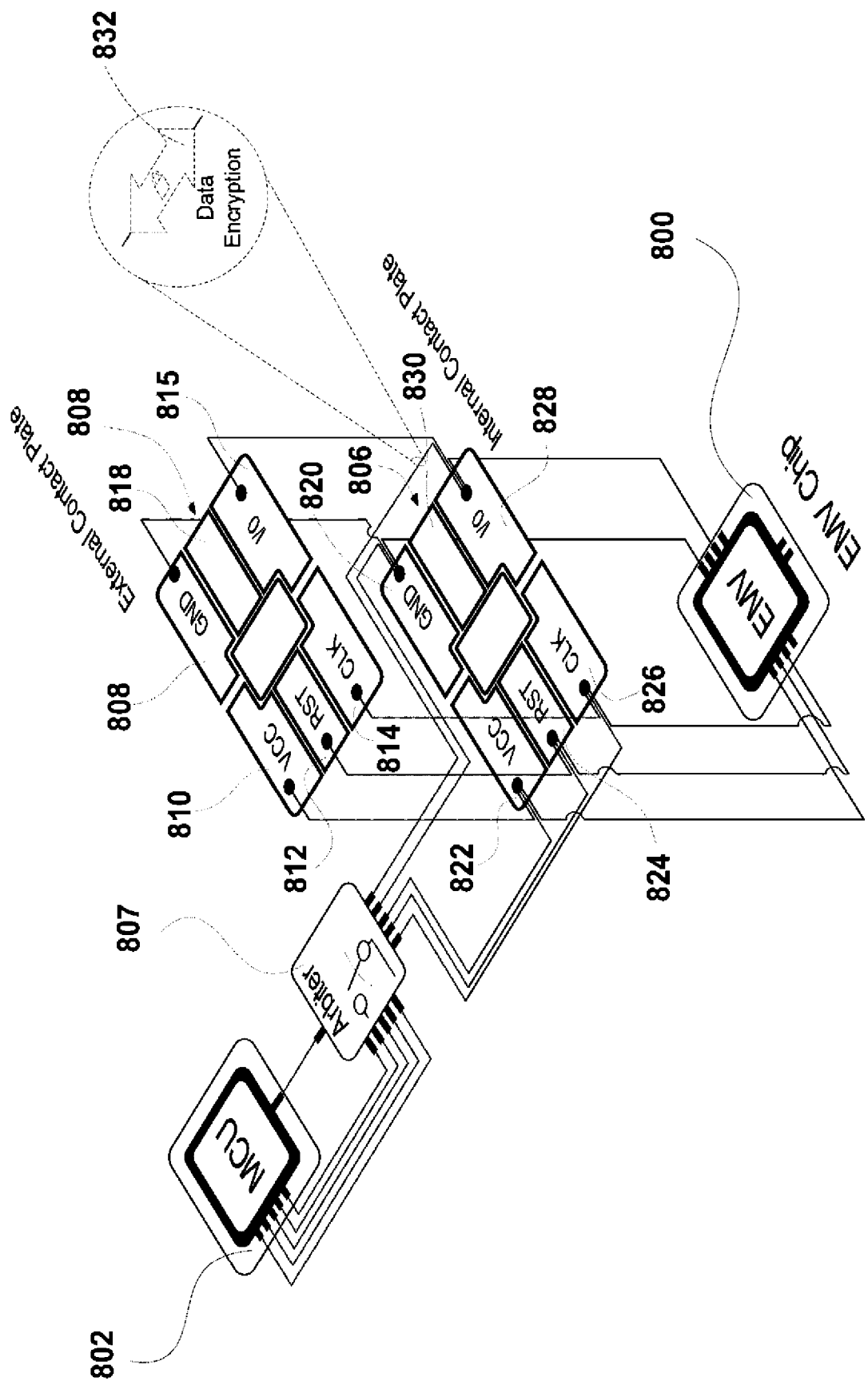
FIG. 8B is a diagrammatic representation of a configuration, according to one embodiment for effecting communication between an MCU device and an EMV device in which the data bus extending between the MCU device and the EMV device is switched, whereas the data and control lines extending from the EMV external contacts plate are connected directly to the EMV internal contacts plate and the EMV device and are not switched.

With reference to FIG. 8B, an alternative to the embodiment depicted in FIG. 8B is diagrammatically represented in which the arbitration device (807) solely controls the connection of the MCU (802) with relevant electrodes of the internal contact plates (806) and thus relevant signal connection points of the EMV device (800). In this particular embodiment, the external contact plate (804) electrodes remain directly connected to their counterpart electrodes of the internal contact plate (806) at all times and remain connected irrespective of the state of the arbitration device (807). In this particular embodiment, the arbitration device (807) acts as a series of single pole single throw switches since it is only operable to connect single lines from the MCU (802) to electrodes of the internal contact plate (806) and thus signal connection points of the EMV device (800). Of course, in the instance of the embodiment of FIG. 8B, it is necessary to consider the possibility of electrical signals being applied to the electrodes of the external contact plate (804) during periods in which the arbitration device (807) has connected the MCU (802) to the EMV device (800). It will be understood by skilled readers that it is possible to employ various hardware configurations to ensure that electrical signals that could potentially damage a device are prevented from reaching the device. In an embodiment, appropriate hardware elements are employed to divert inappropriate signal energy applied to electrodes of the external contact plate such that they are prevented from transmission to the EMV device (800) and the arbitration device (807) or the MCU (802). An additional issue to consider is the potential for communications between the MCU (802) and the EMV device (800) to be monitored, and/or interfered with, as a result of connecting a device to the external control plate (804) and in this instance, it is expected that embodiments configured in accordance with the arrangement depicted in FIG. 8A would encrypt (832) any communications between the MCU (802) and the EMV device (800) to thwart any attempt to monitor, or interfere with, such communications by accessing the signals passing between the MCU (802) and the EMV device (800) from the external contact plate (804) electrodes.

Figure 8C:
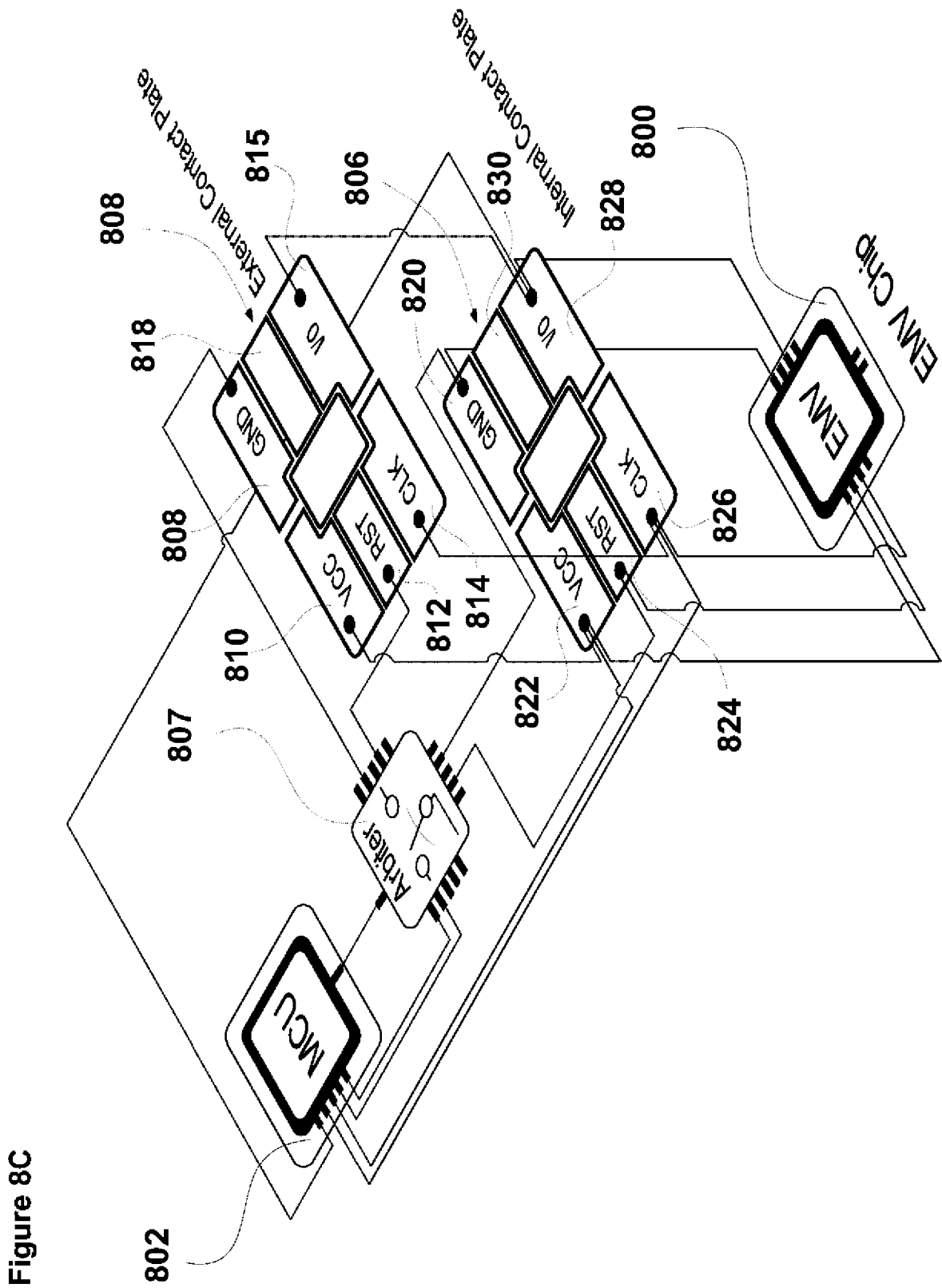
FIG. 8C is a diagrammatic representation of an alternative configuration, according to an embodiment, for effecting communication between an MCU device and an EMV device in which selected control lines between the EMV external contact plate and the EMV device are switched and similarly, only selected data and control lines between the MCU device and the EMV device are switched.

With reference to FIG. 8C, an alternative arrangement is depicted regarding electrical connection of the MCU (802) and the EMV device (800) wherein the arbitration device (807) connects and/or disconnects selective electrodes of the external contact plate (804) with the internal contact plate (806). As depicted in FIG. 8C, the electrodes GND (808), and RST (812) are connected to the arbitration device (807) and the arbitration device (807) is operable to connect those electrodes of the external contact plate (804) with their counterpart electrodes in the internal contact plate (806), namely, GND (820) and RST (824). Accordingly, the electrodes that are not connected to the arbitration device (807) of the external contact plate (804) include electrodes Vcc (810), CLK (812) and I/O (816). These particular electrodes are directly connected to their counterpart electrodes in the internal contact plates (806), namely, Vcc (822), CLK (826) and I/O (828) and remain connected at all times.

Similarly, in the embodiment of FIG. 8C, only selected electrical connection points of the MCU (802) are connected to the arbitration device (807) for switchable connection to electrodes of the internal contact plate (806). According to the embodiment depicted in FIG. 8C, the MCU (802) has permanent connections with various electrodes of the external contact plate (804), namely GND (808), Vcc (810, 822) and CLK (814, 826). Similarly, the I/O electrode of the external contact plate (804) and the internal contact plate (806) are permanently connected to each other and the serial I/O communication connection point of the MCU (802). The embodiment depicted in FIG. 8C has the advantage of reducing attempts to monitor communications between the MCU (802) and the EMV device (800) by accessing electrodes of the external contact plate (804) but suffers the disadvantage that some parts of the transaction flow are interrupted by a switchable device, namely, the arbitration device (807) and hence, re-certification of the device embodied in the DTC may be required.

Figure 8D:
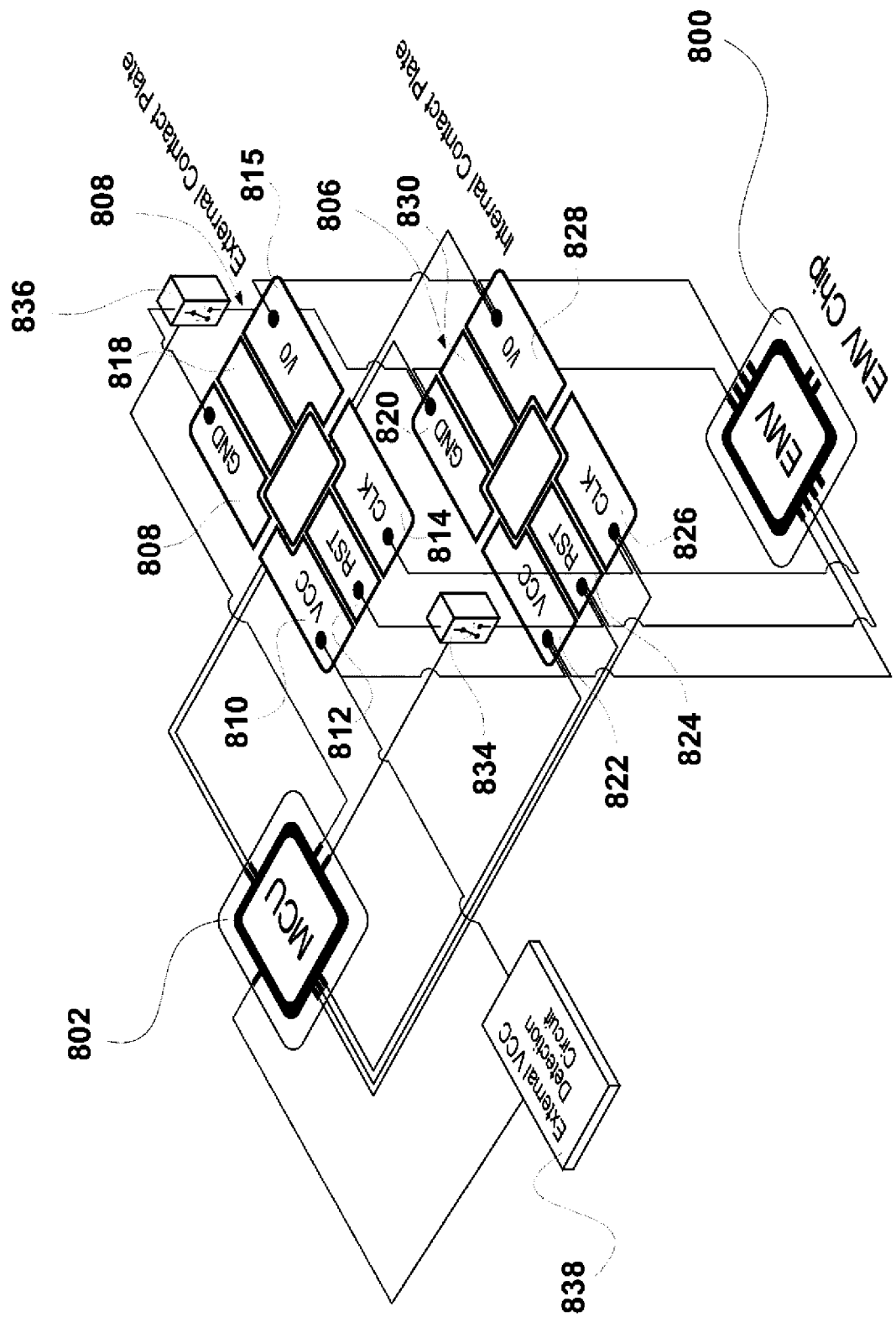
FIG. 8D is a diagrammatic representation of a further alternative configuration, according to an embodiment, for effecting communication between an MCU device and an EMV device including an external Vcc detection circuit which determines the switching of control lines between the EMV external contact plate and the EMV device and/or corresponding control lines between the MCU device and the EMV device.

With reference to FIG. 8D, a further alternative embodiment is depicted wherein the embodiment includes an external Vcc detection circuit (838) which acts to detect the presence of electrical power connected to external contact plate electrode Vcc (810) which would indicate the connection of the external contact plate with a digital transaction device for the purpose of conducting a digital transaction. In this embodiment, the external contact plate electrode Vcc (810) is connected to the MCU (802) through an external Vcc detection circuit such that the MCU (802) can receive a signal confirming that electrical power has been applied to external contact plate electrode (810) thus indicating the insertion of the digital transaction card into a digital transaction device (e.g. an EFTPOS terminal or an ATM). In this embodiment, selected electrodes of the external contact plate, namely, the GND (808) electrode and the RST (812) electrode are connected to independent switchable devices (834 and 836) which can connect those electrodes to either the MCU (802) or their counterpart electrodes in the internal contact plate, namely, GND (820) electrode and RST (824) electrode respectively. This embodiment has the advantage of providing MCU (802) with a signal from the external Vcc detection circuit (838) indicating that the user has elected to conduct a digital transaction and hence, the MCU (802) can cease its communication with the EMV device (800) in order to allow a digital transaction to be completed by the user and subsequently resuming communication between MCU (802) and the EMV device (800) upon detection of the absence of electrical power connected to the Vcc (810) electrode of the external contact plate (804). It will be recognised by skilled readers that a Vcc Detection Circuit could be used in any embodiment to provide an indication to the MCU that power has been applied to the Vcc electrode thus indicating insertion of the DTC into a transaction device.

Figure 8E:
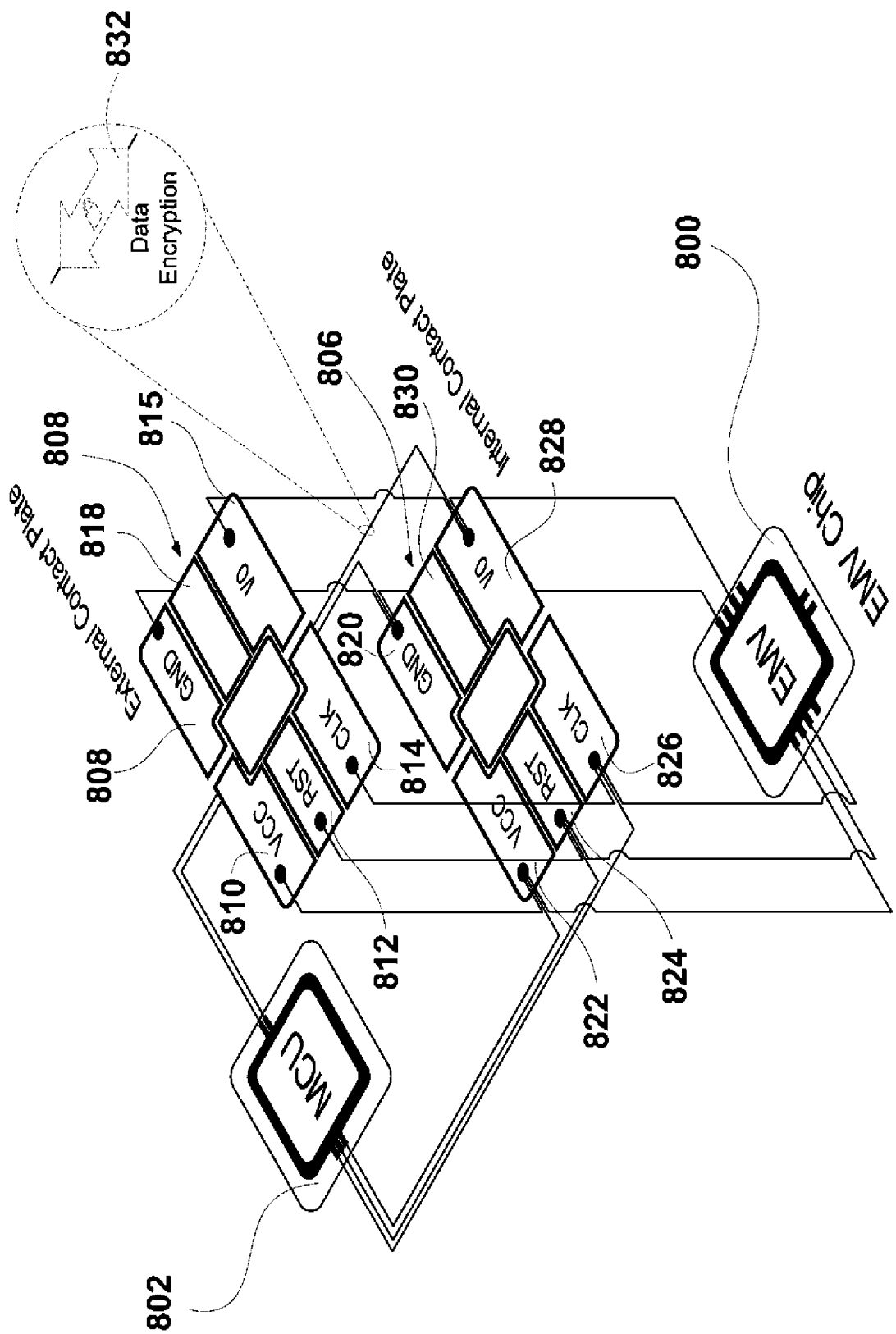
FIG. 8E is a diagrammatic representation of yet a further alternative embodiment for effecting communication between an MCU device and an EMV device in which none of the data and/or control lines between the MCU device and the EMV device are switched and further, none of the data and/or control lines between the EMV external contact plate and the EMV device are switched.

In yet a further embodiment, FIG. 8E depicts a configuration wherein the external contact plate (804) electrodes are directly and permanently connected to their counterpart electrodes of the internal contact plate (806) and at the same time are permanently connected to appropriate signal lines of the MCU (802) and the EMV device (800). In this particular configuration, the electrodes of the external control plate (804) and internal contact plate (806) are permanently connected with both the MCU (802) and the EMV device (800) thereby requiring any communication between the MCU (802) and EMV device (800) to be encrypted (832) to thwart any attempt to monitor, or interfere with, communications between the two device by accessing the electrodes of the external contact plate (804). Whilst this particular embodiment has the disadvantage of requiring encryption of all communications between the MCU (802) and the EMV device (800), it does embody the advantage of avoiding any interruption to the existing transaction flow that would occur with a EMV device (800) when taking part in a digital transaction and hence should avoid any need to re-certify the EMV device when incorporated in a Digital. Transaction Card with communication effected between the MCU (802) and the EMV device (800) according to the embodiment depicted in FIG. 8E.

Figure 8F:
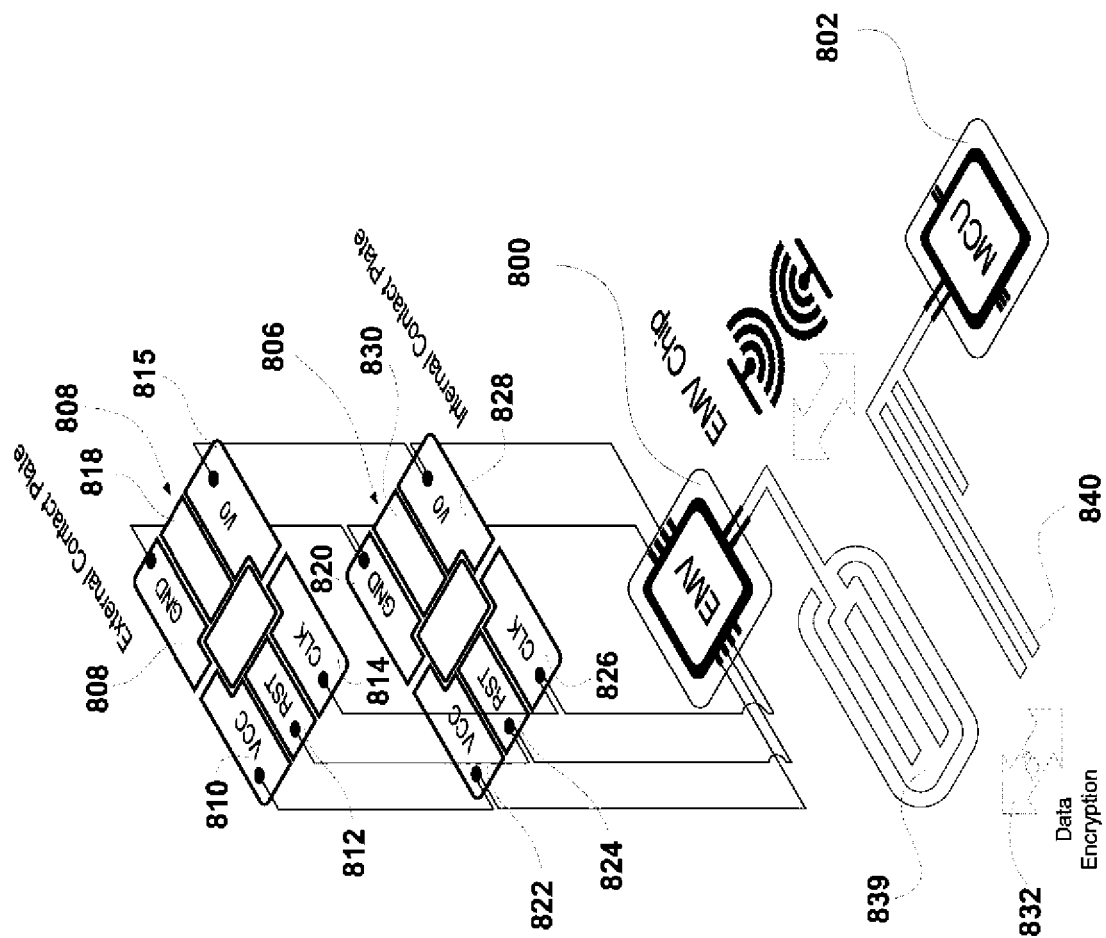
FIG. 8F is a diagrammatic representation of an alternative embodiment in which the configuration for effecting communication between an MCU device and an EMV device relies upon communication between the MCU device and the EMV device by means of separate antennas connected to the MCU device and the EMV device respectively, thereby enabling communication between the MCU device and the EMV device without the MCU device requiring use of any of the data and/or signal lines connected between the EMV external contacts plate and the EMV device.

With reference to FIG. 8F, a further alternative embodiment for effecting communication between an MCU (802) and EMV device (800) is depicted. In this particular embodiment, the individual electrodes of the external contact plate (804) are directly and permanently connected to their counterpart electrodes of the internal contact plate (806) which in turn are permanently connected to the relevant electrical connection points of the EMV device (800). However, in order to effect communication between the MCU (802) and the EMV device (800), each device is provided with its own antenna, namely, EMV device antenna (839) and MCU controller antenna (840). In the embodiment of FIG. 8F, both the EMV device (800) and the MCU (802) have their own RF communications circuitry incorporated into the respective device such that each device can communicate wirelessly. In an embodiment, the EMV device (800) and the MCU (802) are equipped with RF communication circuitry that can be electrically attached to an antenna and can communicate in accordance with the NFC communications protocol. In this instance, the EMV device (800) and MCU (802) effectively communicate with each other by NFC communications conducted on the digital transaction card.

Of course, in the embodiment of FIG. 8F, it is necessary to encrypt (832) any communication between the EMV device (800) and the MCU (802) in order to avoid external third parties monitoring those communications by use of an NFC receiving device but as for various of the aforementioned embodiments, the embodiment of FIG. 8F has the advantage that there is no potential interruption to the transaction flow that would usually occur between an external contact plate and an EMV device. Hence, re-certification would likely be avoided with such an embodiment for effecting communications between an EMV device (800) and an MCU (802) incorporated in a Digital Transaction Card.

When seeking to develop a Digital Transaction Card that is operable with an existing digital transaction network infrastructure, it is preferable that the Digital Transaction Card is operable to communicate with devices already present within an existing network infrastructure according to the communication capabilities and protocols recognised and established for devices in that network. In this regard, merchant terminals, and other devices such as Automatic Teller Machines, that presently exist in established digital transaction networks provide communication facilities between credit cards and devices according to the standards developed for Near Field Communications, physical contact with the EMV device contacts of a credit card and by swiping and reading the magnetic stripe on the rear face of a credit card. Accordingly, when seeking to provide a Digital Transaction Card operable with an existing transaction network yet including additional functionality, it is preferable to provide a Digital Transaction Card that is operable with an existing digital transaction network according to the current protocol standards and interfaces. As a result, it is preferred to provide a DTC that also has the capability to be used with a merchant terminal that relies upon the use of the magnetic stripe and as a result, in an embodiment of the invention, the DTC is provided with a dynamic magnetic stripe that is controlled by the magnetic stripe component (632) as depicted in FIGS. 6A and 6B.

In this regard, since the DTC according to an embodiment of the invention is operable to adopt any one of a number of personalities that may be selected and activated by a user, the magnetic stripe on the rear face of the Digital Transaction Card requires a magnetic stripe that may be configured according to the personality of the Digital Transaction Card at any particular point in time. Accordingly, the MCU (608) is provided with a data connection with the magnetic stripe component (632) as depicted in FIGS. 6A and 6B and is operable to configure the magnetic stripe on the rear face of the Digital Transaction Card such that it accords with the magnetic stripe relevant to the personality of the Digital Transaction Card at any particular point in time.

Further, since the Digital Transaction Card according to the embodiment of the invention depicted in the Figures may include a display, the MCU (608) is provided with direct connection with the display module (634) as depicted in FIGS. 6A and 6B which drives the display (634) that can be used to provide information to a user of the Digital Transaction Card independently of the user's mobile device (600).

A Digital Transaction Card according to an embodiment of the invention provides a user with the ability to combine various Digital Transaction Cards onto a single card with the ability to select and activate any one of the various personalities that are stored on the card at any particular point in time for the purpose of effecting a transaction. Further, according to the embodiments depicted herein, the Digital Transaction Card is operable according to all of the available protocols and interfaces that presently exist in established digital transaction networks and therefore, a Digital Transaction Card according to an embodiment described in the present specification can be used with existing digital transaction networks anywhere in the world. This is particularly important for countries in which the installed digital transaction network includes devices that have yet to be upgraded to communicate with Digital Transaction Cards according to NFC capabilities and may be restricted to either direct physical contact with the EMV device contact plate or use of the magnetic stripe which may be prevalent in countries that are considered to fall within the category of "developing nations." Further, even in "developed nations" wherein the existing digital transaction network infrastructure includes many terminals that have NFC communication capabilities, many consumers have not yet elected to adopt the E-Wallet services offered by many commercial operators since their mobile phone or smartphone device does not have NFC communication capabilities. In order to use the presently offered E-Wallet commercial services, it is necessary to implement those services on a smartphone that includes NFC communication facilities. Of course, a Digital Transaction Card according to an embodiment described in the present specification may communicate with any device that incorporates a Bluetooth communications facility which includes many older generation smartphones and hence, according to an embodiment of the invention, a user may select and activate a particular personality for a Digital Transaction Card by selecting and activating that personality on their smartphone equipped solely with Bluetooth communication facilities and communicate that command to a Digital Transaction Card according to established Bluetooth communication protocols. Having selected and activated a particular personality for their Digital Transaction Card using Bluetooth communication facilities, the Digital Transaction Card may be used to effect a transaction with an existing digital transaction network according to any of the currently available protocols and interfaces including magnetic stripe and physical contact with the EMV device contact plate.

TABLE 1 is a chart of the aforementioned DTC embodiments (314, 316, 318 and 322) depicted in FIG. 3D when the EMV device associated with the DTC is software-enhanced detailing the combination of features in each embodiment. It will be understood that this listing of embodiments represents only a selection of possible embodiments and does not represent an exhaustive list of all possible embodiments. In the TABLE 1 below, the tick ✓ symbol signifies that a feature is present, and the cross x symbol signifies that a feature is not present.

TABLE 1

| | Software-Enhanced (Java EMV with applet) | | | | | | |
|---|---|---|---|---|---|---|---|
| Embodiment | EMV Device having Modified Contactless Comms Capability | MCU | MCU with NFC Comms Capability | MCU with Bluetooth Comms Capability | Battery | Card Display | Scroll/ Enter Keys |
| 314 | ✓ | x | x | x | x | x | x |
| 316 | x | ✓ | ✓ | x | ✓ | x | x |
| 318 | x | ✓ | ✓ | ✓ | ✓ | ✓ 4/8 Active Matrix | x |
| 322 | x | ✓ | ✓ | ✓ | ✓ | ✓ 4/8 Active Matrix | ✓ |

In the first embodiment in TABLE 1, the DTC (314) requires the use of a Data Assistance Device (DAD) with a modified NFC capability such as a smartphone to communicate data and commands to an applet associated with the EMV device that can establish a secure session between the NFC-enabled DAD and the DTC via a contactless interface. In this regard, the DAD requires an application that establishes a secure session with the DTC. Data sent via the secure session includes APDU packets containing commands, for example Global Platform Commands, or APDU packets containing commands that authorize a management applet on the EMV device to send Global Platform Commands to applets containing card personalities. The commands sent to the management applet may include a sequence of commands to install a new personality or to change an operational parameter or status of an existing personality. DTC (314) further requires software encryption to isolate the EMV external contact plate, as described above with reference to FIGS. 8A to 8F. The DTC (314) is limited to use with an NFC-enabled phone, but has the advantage of low cost and low propensity to fail since the DTC does not include an MCU, display or scroll/enter keys.

DTC (316) also requires the use of a Data Assistance Device (DAD), such as a smartphone, to communicate data and commands to an applet associated with the EMV device that can establish a secure session between the NFC-enabled DAD and the DTC via a contactless interface. The difference between DTCs (314) and (316) is that DTC (316) includes an MCU that can accept wireless communication (e.g. NFC), and can accept a secure session between the DAD and the DTC containing the MCU. The application on the DAD creates a secure session with the MCU within the DTC and data sent via the secure session includes APDU packets containing commands, for example Global Platform Commands, where the MCU forwards the commands to the EMV applet. DTC (316) may further include software encryption to isolate the EMV external contact plate, but also allows hardware encryption involving physical isolation of the EMV contact plate as described above with reference to FIGS. 8A to 8F. The advantages of using DTC (316) include low to medium cost and low propensity to fail, and includes an MCU that can assist data transfer with a DAD.

DTC (318) also requires the use of a Data Assistance Device (DAD), such as a smartphone, to communicate data and commands to an applet associated with the EMV device that can establish a secure session between an NFC or Bluetooth enabled DAD and the DTC via a contactless interface. DTC (318) includes an MCU that can accept wireless communication (e.g. Bluetooth and NFC), and can accept a secure session between the DAD and the DTC containing the MCU. The application on the DAD creates a secure session to the MCU within the DTC and data sent via the secure session includes APDU packets containing commands, for example Global Platform Commands, where the MCU forwards the commands to the EMV applet. In addition, DTC (318) is configured to accept commands that authorize the MCU to send APDU packets containing commands, for example Global Platform Commands, to amend parameters pertaining to a personality. DTC (318) may further include software encryption to isolate the EMV external contact plate, or hardware encryption involving physical isolation of the EMV contact plate as described above with reference to FIGS. 8A-8F. The advantages of using DTC (318) include medium cost, medium propensity to fail, and is not limited to use with an NFC-enabled DAD, but in view of DTC (318) including an MCU and display (320) there is a higher cost associated with production of DTC (318) as compared with DTC (314) and (316).

When using DTC (322), the skilled addressee will understand that the use of a DAD such as a smartphone is not necessarily required, but may be used, to change the personality of the card. In any event, the DAD is necessary to initially set up the card and download/store multiple personalities, but subsequent to the initial setup, the card itself may be used to change the operational parameters of a card's personality using the scroll/enter keys (326). The DTC (322) contains an applet, and an MCU that can accept wireless communication (e.g. Bluetooth or NFC), a secure session between the DAD and the DTC containing the MCU (i.e. during the initial setup), and a secure session between the MCU and the EMV for subsequent amendments to the parameters of a personality involving transfer of data between the MCU and EMV (applet or management applet). The MCU is programmed to accept commands from a local interface, which may for example include the scroll/enter keys (326), and convert the keystrokes into commands. The application on the DAD creates a secure session with the MCU within the DTC during the initial setup of the DTC (322) and data sent via the secure session includes APDU packets containing commands, for example Global Platform Commands, where the MCU is authorised to forward the commands onto the EMV applet. In an alternative embodiment, data that is sent via the secure session will consist of commands that authorize the MCU to send APDU packets containing commands to a management applet on the EMV device. The Management applet then sends commands (for example global platform commands) to effect an amendment to an operational parameters or status to the appropriate applet. When the scroll/enter keys (326) are used to change the personality of the DTC (322), transmission is authorized by the local interface that authorizes the MCU to send APDU packets containing authorization commands to either the Management app or Global Platform Commands to the applet containing the card personality/personalities. DTC (322) may further include software encryption to isolate the EMV external contact plate, or hardware encryption involving physical isolation of the EMV contact plate as described above with reference to FIGS. 8A-8F.

DTC (322) has the advantage of locally selecting one from many multiple concurrent personalities stored on the card with no risk of discovery of card details during updates or changes (i.e. changes to status/updates) since card details are not transmitted. In addition, less time is required to effect updates or changes (i.e. changes to status/updates), minimal amounts of data is required to be transferred to effect a change in personality, and the ability to change DTC personalities without the use of a DAD. However, DTC (322) has a higher production cost and due to its complexity may have a higher propensity to fail.

Table 2 is a chart of the abovementioned DTC embodiments (314, 316, 318 and 322) when the EMV device associated with the DTC is firmware-modified, detailing the combination of features that are present in each embodiment. Again, the ✓ symbol signifies that a feature is present, and the x symbol signifies that a feature is not present, and it is to be understood that this listing of embodiments represents only a selection of possible embodiments that may be configured with differing combinations of features and is not intended to represent an exhaustive listing.

Association Scheme, and the presence of an MCU that can assist secure data transfer from the DAD and does not require the use of an EMV device having modified contactless communications capability.

DTC (318) in TABLE 2 also requires the use of a Data Assistance Device (DAD), such as a smartphone, to communicate data to a firmware-modified EMV device that can

TABLE 2

Firmware-Modified EMV Device

| Embodiment | EMV Device having Modified Contactless Comms Capability | Multiple Personalities for Single Card Association Scheme | Multiple Personalities for Multiple Card Association Schemes | MCU with NFC Comms Capability | MCU with Bluetooth Comms Capability | Card Display | Scroll/Enter Keys |
|---|---|---|---|---|---|---|---|
| 314 | ✓ | ✓ | x | x | x | x | x |
| 316 | x | x | x | ✓ | x | x | x |
| 318 | x | ✓ | ✓ | ✓ | ✓ | ✓ 4/8 Active Matrix | x |
| 322 | x | ✓ | ✓ | ✓ | ✓ | ✓ 4/8 Active Matrix | ✓ |

In the first embodiment in TABLE 2, the DTC (314) requires the use of a Data Assistance Device (DAD) with a modified NFC capability such as a smartphone to communicate data to an EMV device that is firmware-modified. As previously described, a firmware-modified EMV device has an external DTC CPU that includes firmware that is operable to write data (for example, LDTDP data) to staging memory, such that, when the DTPU is activated, the DTPU copies the data to secure record memory (secure element) in the DTPU in a manner that causes the DTC to adopt a particular card personality or assist in conducting a digital transaction in some other way. Data relating to each personality may be stored in memory associated with the DAD, wherein communications between the DAD and DTC may be in the form of a command to download and copy the data into the secure element for the purpose of updating the personality of the DTC. The firmware-modified DTC (314) is limited to use with an NFC-enabled DAD and use of an EMV device having modified contactless communications capability in order to securely receive data received from the NFC-enabled DAD, but has the advantage of being able to adopt multiple personalities for a single Card Association Scheme and low cost and low propensity to fail since the DTC (314) does not include an MCU, display or scroll/enter keys.

The firmware-modified DTC (316) also requires the use of a Data Assistance Device (DAD), such as a smartphone, to communicate data to an EMV device that is firmware-modified as described above. The difference between DTCs (314) and (316) is that DTC (316) includes an MCU that can store data relating to multiple personalities (and/or data that may be relevant to changing some other digital transaction parameter) rather than storing same in the DAD memory, and can accept a secure session between a DAD with wireless connectivity (either NFC or Bluetooth) and the DTC containing the MCU which also has wireless connectivity (either NFC or Bluetooth). The advantages of using the firmware-modified DTC (316) include low cost and low propensity to fail, there being no requirement for an NFC-enabled DAD (in that the MCU can accept communication with a phone that is solely Bluetooth-enabled, for example), the ability to adopt multiple personalities for a single Card Association Scheme, and the presence of an MCU that can assist secure data transfer from the DAD and does not require the use of an EMV device having modified contactless communications capability.

DTC (318) in TABLE 2 also requires the use of a Data Assistance Device (DAD), such as a smartphone, to communicate data to a firmware-modified EMV device that can establish a secure session between a DAD with wireless connectivity (NFC and/or Bluetooth) and the DTC via a contactless interface. DTC (318) includes an MCU that can accept wireless communication from both NFC and Bluetooth-enabled DADs, and can thereby establish a secure session between a majority of phones and the DTC containing the MCU. The advantages of using DTC (318) include low-to-medium cost, low-to-medium propensity to fail, and there being no requirement to use solely an NFC-enabled DAD, but in view of DTC (318) including an MCU and display (320) there is a higher cost associated with production of DTC (318) as compared with DTC (314) and (316).

When using the DTC (322) described in TABLE 2, the skilled addressee will understand that the use of a DAD such as a smartphone is not necessarily required, but may be used, to change the personality of the card or to assist in some other way in conducting a digital transaction. In any event, the DAD is necessary to initially set up the card and download/store multiple personalities in the MCU, but subsequent to the initial setup, the card itself may be used to change the operational parameters of a card's personality or to assist the digital transaction in some other way using the scroll/enter keys (326). An MCU is used to accept wireless communication (both Bluetooth and NFC) from the DAD during an initial setup, and is further programmed to accept commands from a local interface, which may for example include the scroll/enter keys (326), and convert the keystrokes into commands. When the scroll/enter keys (326) are used to change the personality of the DTC (322) or to perform some other task that assists the digital transaction, transmission is authorized by the local interface that authorizes the MCU to select stored data and copy same to the secure element.

DTC (322) has the advantage of locally selecting one from many multiple concurrent personalities stored on the card with no risk of discovery of card details during updates or changes (i.e. changes to status/updates) since card details are not transmitted. Further advantages include reduced time to effect updates or changes (i.e. changes to status/updates), minimal amounts of data being required to be transferred to effect a change in personality, and the ability to change DTC personalities without the use of a DAD. However, DTC (322) has a higher production cost and due to its complexity may have a higher propensity to fail.

The reference to any prior art in this specification is not, and should not be taken as, an acknowledgement or any suggestion that the prior art forms part of the common general knowledge.

Throughout this specification and claims which follow, unless the context requires otherwise, the word "comprise", and variations such as "comprises" and "comprising", will be understood to mean the inclusion of a stated integer or step, or group of integers or steps, but not the exclusion of any other integer or step or group of integers or steps.

It will be understood by persons skilled in the relevant field of technology that numerous variations and/or modifications may be made to the invention as detailed in the embodiments without departing from the spirit or scope of the invention as broadly described. The present embodiments are therefore to be considered in all aspects as illustrative and not restrictive.

The claims defining the invention are as follows:

1. Digital transaction apparatus including:
   a Data Assistance Device (DAD), including:
      a user interface that is operable to at least select data, and
      a DAD transmitter;
   a Digital Transaction Card (DTC), including:
      a Digital Transaction Processing Unit (DTPU), and
      a DTC receiver,
   wherein the DAD and DTC are operable to transfer data from the DAD to the DTC and when subsequently using the DTC to effect a digital transaction, the DTC operates in accordance with data selected and transferred from the DAD to the DTC,
   wherein the DTPU is configured to enable data communication with a digital transaction device during a digital transaction,
   wherein the digital transaction device comprises one or more of a Point of Sale (POS) device, an Electronic Funds Transfer at Point of Sale (EFTPOS) device, and an Automatic Teller Machine (ATM),
   wherein the DTPU is operable to receive and execute one or more commands that emulate commands received from the digital transaction device, and
   wherein the one or more emulating commands are received by the DTPU from the DTC and/or the DAD.

2. Digital transaction apparatus according to claim 1, wherein the emulation is of one or more functions that would otherwise be enacted with the DTC in operation with the digital transaction device.

3. Digital transaction apparatus according to claim 1, wherein the transferred data includes data pertaining to one or more selectable personalities.

4. Digital transaction apparatus according to claim 1, wherein the selected and transferred data includes one or more instructions.

5. Digital transaction apparatus according to claim 4, wherein the one or more instructions include instructions to change a current personality of the DTC to a personality selected from a plurality of selectable personalities.

6. Digital transaction apparatus according to claim 3, wherein data pertaining to the plurality of selectable personalities is stored on the DAD, and changing the current personality of the DTC to the selected personality includes:
   receiving, by the DAD and by operation of the DAD user interface, the instruction to change the current personality of the DTC to the selected personality;
   transmitting, by the DAD transceiver to the DTC transceiver, data related to the selected personality; and
   implementing, in the DTC, a change from the current personality to the selected personality in accordance with the data such that when the DTC operates with a digital transaction device to effect the digital transaction, the digital transaction device recognises the selected personality.

7. Digital transaction apparatus according to claim 3, wherein data related to the plurality of selectable personalities is stored on the DTC, and changing the current personality of the DTC to the selected personality includes:
   receiving, by the DAD, and by operation of the DAD user interface, the instruction to change the current personality of the DTC to the selected personality;
   transmitting, by the DAD transceiver to the DTC transceiver, the instruction to change the current personality of the DTC to the selected personality; and
   implementing, in the DTC, a change from the current personality to the selected personality in accordance with the instruction such that when the DTC operates with a digital transaction device to effect the digital transaction, the digital transaction device recognises the selected personality.

8. Digital transaction apparatus according to claim 1, wherein the DTC includes a user interface.

9. Digital transaction apparatus according to claim 3, wherein the selected data transferred from the DAD to the DTC including data pertaining to the plurality of selectable personalities and stored on the DTC are individually selectable by operation of the DTC user interface.

10. Digital transaction apparatus according to claim 9, wherein changing a current personality of the DTC to the selected personality includes:
    receiving, by operation of the DTC user interface, one or more instructions to change the current personality of the DTC to the selected personality; and
    implementing, in the DTC, a change from the current personality to the selected personality in accordance with the one or more instructions such that when the DTC operates with a digital transaction device to effect the digital transaction, the digital transaction device recognises the selected personality.

11. Digital transaction apparatus according to claim 8, wherein the DTC scroll keys enable user selection of a personality from the plurality of personalities and the display indicates the selectable personality.

12. Digital transaction apparatus according to claim 1, wherein the DTC external processor is for receiving and storing transferred data.

13. Digital transaction apparatus according to claim 1, wherein the DTC includes a display for displaying information.

14. Digital transaction apparatus according to claim 1, wherein the DTPU is an EMV device operating in accordance with firmware wherein the firmware has been modified to enable the EMV device to receive and execute an expanded set of commands that, when executed, allows the writing of data to a secure memory element of the EMV device.

15. Digital transaction apparatus according to claim 1, wherein the DTPU is an EMV device including a software module having instruction code which, when executed, causes the EMV device to receive and execute commands according to the Global Platform Standard Command set including commands to install an Applet displaying a credit card personality.

16. Digital transaction apparatus according to claim 14, wherein a digital transaction device interfaces with the EMV device by physical connection with contact terminals of the EMV device, or by contactless connection (ISO 14443 Standard), or by interaction between a magnetic stripe reader associated with the digital transaction device and a magnetic stripe of the DTC.

17. Digital transaction apparatus according to claim 16, wherein the DTC is a wearable device including a watch, a wrist band, a ring or an item of jewelry.

18. A Digital Transaction Card (DTC) including:
a Digital Transaction Processing Unit (DTPU); and
a DTC receiver that is operable to receive user-selected data from a transmitter associated with a Data Assistance Device (DAD), wherein the user-selected data that is received causes the DTC to operate in accordance with the user-selected data when the DTC is subsequently used to effect a digital transaction, and
wherein the DTPU is configured to enable data communication with a digital transaction device during a digital transaction,
wherein the digital transaction device comprises one or more of a Point of Sale (POS) device, an Electronic Funds Transfer at Point of Sale (EFTPOS) device, and an Automatic Teller Machine (ATM),
wherein the DTPU is operable to receive and execute commands that emulate one or more commands received from the digital transaction device, and
wherein the one or more emulating commands are received by the DTPU from the DTC and/or the DAD.

19. A digital transaction method including:
selecting data, by a user interface of a Data Assistance Device (DAD);
transferring the selected data by a DAD transmitter associated with the DAD to a receiver associated with a Digital Transaction Card (DTC) having a Digital Transaction Processing Unit (DTPU); and
effecting, by the DTC, a digital transaction with a digital transaction device wherein the DTC operates in accordance with the data selected and transferred from the DAD to the DTC,
wherein the DTPU is configured to enable data communication with a digital transaction device during a digital transaction,
wherein the digital transaction device comprises one or more of a Point of Sale (POS) device, an Electronic Funds Transfer at Point of Sale (EFTPOS) device, and an Automatic Teller Machine (ATM),
wherein the DTPU is operable to receive and execute commands that emulate one or more commands received from the digital transaction device and
wherein the one or more emulating commands are received by the DTPU from the DTC and/or the DAD.

20. A computer-readable medium storing one or more instructions that, when executed by one or more processors associated with a Digital Transaction Card (DTC), cause the one or more processors to:
receive user selected data, from a Data Assistance Device (DAD); and
subsequently effect a digital transaction with a digital transaction device wherein the DTC operates in accordance with the user selected data,
wherein the DTC includes a Digital Transaction Processing Unit (DTPU) configured to enable data communication with a digital transaction device during a digital transaction,
wherein the digital transaction device comprises one or more of a Point of Sale (POS) device, an Electronic Funds Transfer at Point of Sale (EFTPOS) device, and an Automatic Teller Machine (ATM),
wherein the DTPU is operable to receive and execute commands that emulate commands received from the digital transaction device and
wherein the one or more emulating commands are received by the DTPU from the DTC and/or the DAD.

* * * * *